United States Patent
Muto et al.

(10) Patent No.: US 9,215,643 B2
(45) Date of Patent: Dec. 15, 2015

(54) ROUTE SELECTING DEVICE AND MOBILE RADIO COMMUNICATION SYSTEM

(75) Inventors: Yuta Muto, Yokohama (JP); Koji Watanabe, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 927 days.

(21) Appl. No.: 13/388,633

(22) PCT Filed: Sep. 4, 2009

(86) PCT No.: PCT/JP2009/065514
§ 371 (c)(1),
(2), (4) Date: Feb. 2, 2012

(87) PCT Pub. No.: WO2011/027464
PCT Pub. Date: Mar. 10, 2011

(65) Prior Publication Data

US 2012/0243460 A1 Sep. 27, 2012

(51) Int. Cl.
| | |
|---|---|
| *H04W 40/04* | (2009.01) |
| *H04L 12/707* | (2013.01) |
| *H04W 8/22* | (2009.01) |
| *H04W 8/26* | (2009.01) |
| *H04W 28/10* | (2009.01) |
| *H04W 72/00* | (2009.01) |
| *H04W 88/08* | (2009.01) |

(52) U.S. Cl.
CPC ............... *H04W 40/04* (2013.01); *H04L 45/22* (2013.01); *H04L 45/24* (2013.01); *H04W 8/22* (2013.01); *H04W 8/26* (2013.01); *H04W 28/10* (2013.01); *H04W 72/00* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 6,205,335 | B1 | 3/2001 | Furusawa et al. |
| 2006/0089144 | A1* | 4/2006 | Kim et al. ............ 455/439 |
| 2006/0285505 | A1 | 12/2006 | Cho et al. |
| 2008/0132240 | A1* | 6/2008 | Baek et al. ........... 455/442 |
| 2008/0205325 | A1* | 8/2008 | Lu et al. ............... 370/320 |

(Continued)

FOREIGN PATENT DOCUMENTS

| | | |
|---|---|---|
| JP | 04-207599 A | 7/1992 |
| JP | 11-275623 A | 10/1999 |

(Continued)

OTHER PUBLICATIONS

3GPP TS 23.401 V8.4.0 (Dec. 2008), Technical Specification, Release 8.

*Primary Examiner* — Chirag Shah
*Assistant Examiner* — Suk Jin Kang
(74) *Attorney, Agent, or Firm* — Mattingly & Malur, PC

(57) ABSTRACT

A mobile radio communication system having one or more relay stations and base stations, a gateway, an external device having a route selection function, and a policy control device which selects a main route and a sub route on the basis of residual resources in a radio communication device. The mobile station connected to one radio communication device can select another radio communication device having a large amount of residual resources as a new access point when the one radio communication device cannot be used, to prevent shortage of the radio resources. Also, it is possible to enable a process of selecting the radio communication device as a new access point to be omitted when switching one route to another by determining a sub route as the new access point when a main route is disconnected in advance, to shorten a service disconnection time.

20 Claims, 94 Drawing Sheets

(56) References Cited

U.S. PATENT DOCUMENTS

| | | | |
|---|---|---|---|
| 2008/0268846 A1* | 10/2008 | Shaheen | 455/436 |
| 2009/0252133 A1* | 10/2009 | Watanabe et al. | 370/338 |
| 2010/0208653 A1* | 8/2010 | Morinaga et al. | 370/328 |
| 2011/0243096 A1* | 10/2011 | Brandt et al. | 370/331 |
| 2013/0005343 A1* | 1/2013 | Kim et al. | 455/438 |
| 2013/0058299 A1* | 3/2013 | Watanabe et al. | 370/329 |
| 2014/0003393 A1* | 1/2014 | Shaheen | 370/331 |
| 2014/0295853 A1* | 10/2014 | Ulupinar et al. | 455/442 |

FOREIGN PATENT DOCUMENTS

| | | |
|---|---|---|
| JP | 2001-109980 A | 4/2001 |
| JP | 2003-219460 A | 7/2003 |
| JP | 2006-352894 A | 12/2006 |

\* cited by examiner

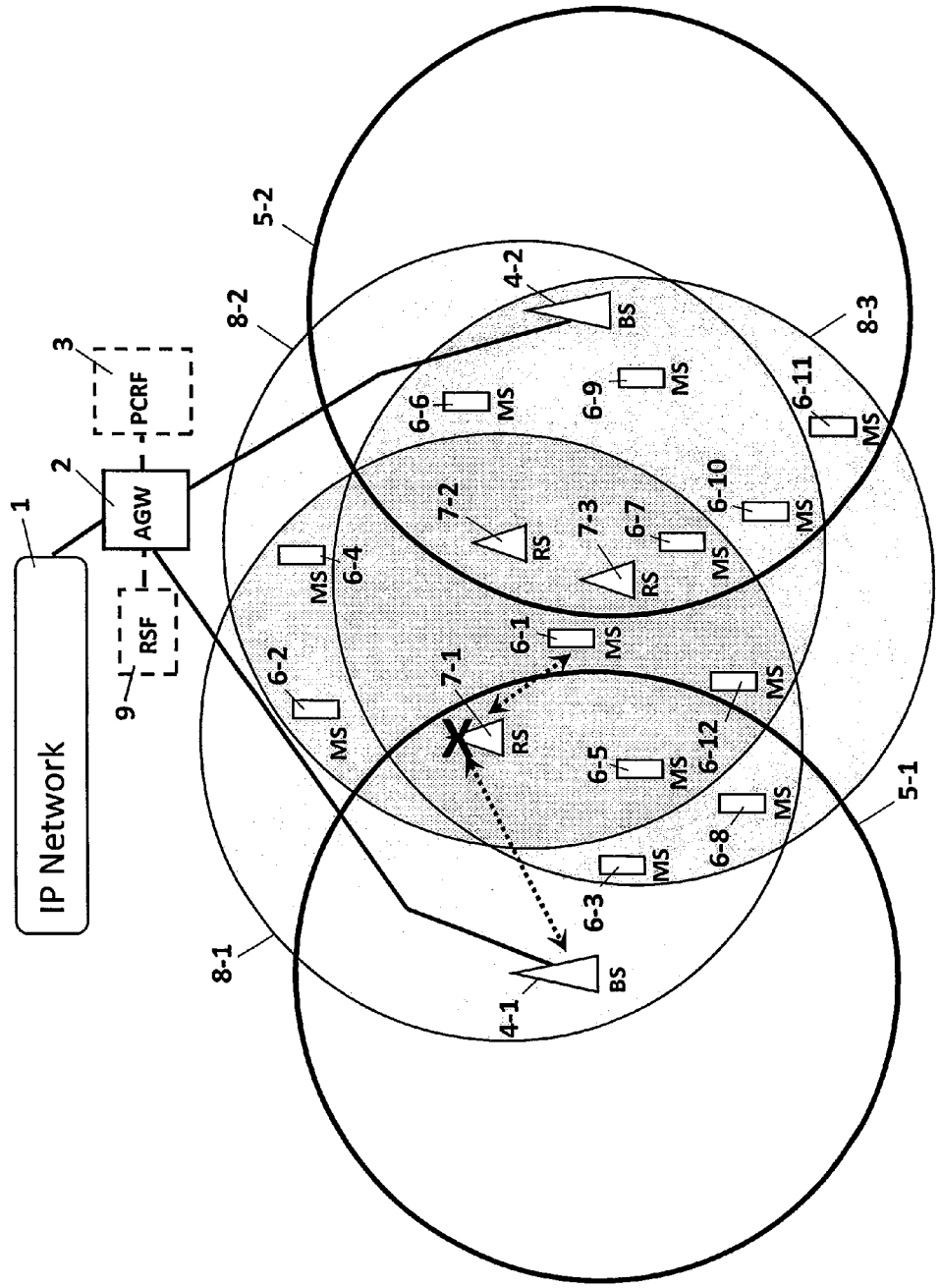

| main BSID | MSID | sub BSID | $r_{MS}$ | $\Sigma r_{MSmain}$ | $r_{BSmax}$ | $R_{rmain}$ |
|---|---|---|---|---|---|---|
| BS4-1 | MS6-2 | BS4-2 | 2 | 5 | 18 | 3.6 |
| | MS6-3 | BS4-3 | 2 | | | |
| | MS6-4 | BS4-2 | 1 | | | |
| BS4-2 | MS6-5 | BS4-1 | 2 | 4 | 12 | 3.0 |
| | MS6-6 | BS4-3 | 1 | | | |
| | MS6-7 | BS4-1 | 1 | | | |
| BS4-3 | MS6-8 | BS4-1 | 2 | 8 | 16 | 2.0 |
| | MS6-9 | BS4-2 | 1 | | | |
| | MS6-10 | BS4-2 | 3 | | | |
| | MS6-11 | – | 1 | | | |
| | MS6-12 | BS4-1 | 1 | | | |
| ⋮ | ⋮ | ⋮ | ⋮ | ⋮ | ⋮ | ⋮ |

Columns: T11a, T12a, T13a, T14a, T15a, T16a, T17a

FIG.5a

| main BSID | MSID | sub BSID | $r_{MS}$ | $\Sigma r_{MSmain}$ | $r_{BSmax}$ | $R_{rmain}$ |
|---|---|---|---|---|---|---|
| BS4-1 | MS6-1 | BS4-2 | 1 | 6 | 18 | 3.0 |
|  | MS6-2 | BS4-2 | 2 |  |  |  |
|  | MS6-3 | BS4-3 | 2 |  |  |  |
|  | MS6-4 | BS4-2 | 1 |  |  |  |
| BS4-2 | MS6-5 | BS4-1 | 2 | 4 | 12 | 3.0 |
|  | MS6-6 | BS4-3 | 1 |  |  |  |
|  | MS6-7 | BS4-1 | 1 |  |  |  |
| BS4-3 | MS6-8 | BS4-1 | 2 | 8 | 16 | 2.0 |
|  | MS6-9 | BS4-2 | 1 |  |  |  |
|  | MS6-10 | BS4-2 | 3 |  |  |  |
|  | MS6-11 | – | 1 |  |  |  |
|  | MS6-12 | BS4-1 | 1 |  |  |  |
| ⋮ | ⋮ | ⋮ | ⋮ | ⋮ | ⋮ | ⋮ |

Columns: T11b, T12b, T13b, T14b, T15b, T16b, T17b

FIG.5b

| main BSID | MSID | sub BSID | $r_{MS}$ | $\Sigma r_{MSmain}$ | $r_{BSmax}$ | $R_{rmain}$ | $r_{MSnew}$ |
|---|---|---|---|---|---|---|---|
| BS4-1 | MS6-2 | BS4-2 | 2 | 5 | 18 | 3.0 | |
| | MS6-3 | BS4-3 | 2 | | | | |
| | MS6-4 | BS4-2 | 1 | | | | |
| BS4-2 | MS6-5 | BS4-1 | 2 | 4 | 12 | 2.4 | |
| | MS6-6 | BS4-3 | 1 | | | | |
| | MS6-7 | BS4-1 | 1 | | | | 1 |
| BS4-3 | MS6-8 | BS4-1 | 2 | 8 | 16 | 1.8 | |
| | MS6-9 | BS4-2 | 1 | | | | |
| | MS6-10 | BS4-2 | 3 | | | | |
| | MS6-11 | – | 1 | | | | |
| | MS6-12 | BS4-1 | 1 | | | | |

Columns: T21, T22, T23, T24, T25, T26, T27, T28

FIG.6

| T31 | T32 | T33 | T34 | T35 | T36 | T37 |
|---|---|---|---|---|---|---|
| main BSID | sub BSID | $\Sigma r_{MSmain}$ | $\Sigma r_{MSsub}$ | $r_{BSmax}$ | $R_{rsub}$ | $r_{MSnew}$ |
| BS4-1 | BS4-2 | 4 | 3 | 12 | 1.50 | 1 |
|  | BS4-3 | 8 | 2 | 16 | 1.45 |  |

FIG.7

| T41 | T42 | T43 | T44 | T45 | T46 |
|---|---|---|---|---|---|
| MSID | BSID | $E$ | $T$ | $M$ | $P$ |
| MS6-1 | BS4-1 | $E_1$ | $T_1$ | $M_1$ | $P_1$ |
| | BS4-2 | $E_2$ | $T_2$ | $M_2$ | $P_2$ |
| | BS4-3 | $E_3$ | $T_3$ | $M_3$ | $P_3$ |

FIG.8

| | T51 | T52 | T53 | T54 | T55 |
|---|---|---|---|---|---|
| | ↓ | ↓ | ↓ | ↓ | ↓ |
| | MSID | APLID | $W_E$ | $W_T$ | $W_M$ |
| | MS6-1 | APL1 | $W_{E1}$ | $W_{T1}$ | $W_{M1}$ |
| | | APL2 | $W_{E2}$ | $W_{T2}$ | $W_{M2}$ |
| | | APL3 | $W_{E3}$ | $W_{T3}$ | $W_{M3}$ |

FIG.9

| | T61 | T62 | T63 | T64 | T65 |
|---|---|---|---|---|---|
| | ↓ | ↓ | ↓ | ↓ | ↓ |
| MSID | APLID | $W_{QoS}$ | $W_{rmain}$ | $W_{rsub}$ | |
| MS6-1 | APL1 | $W_{QoS1}$ | $W_{rmain1}$ | $W_{rsub1}$ | |
| | APL2 | $W_{QoS2}$ | $W_{rmain2}$ | $W_{rsub2}$ | |
| | APL3 | $W_{QoS3}$ | $W_{rmain3}$ | $W_{rsub3}$ | |

FIG.10

| main RSID | MSID | sub RSID | $r_{MS}$ | $\Sigma r_{MSmain}$ | $r_{RSmax}$ | $R_{rmain}$ |
|---|---|---|---|---|---|---|
| RS4-1 | MS6-2 | RS4-2 | 2 | 5 | 18 | 3.6 |
|  | MS6-3 | RS4-3 | 2 |  |  |  |
|  | MS6-4 | RS4-2 | 1 |  |  |  |
| RS4-2 | MS6-5 | RS4-1 | 2 | 4 | 12 | 3.0 |
|  | MS6-6 | RS4-3 | 1 |  |  |  |
|  | MS6-7 | RS4-1 | 1 |  |  |  |
| RS4-3 | MS6-8 | RS4-1 | 2 | 8 | 16 | 2.0 |
|  | MS6-9 | RS4-2 | 1 |  |  |  |
|  | MS6-10 | RS4-2 | 3 |  |  |  |
|  | MS6-11 | – | 1 |  |  |  |
|  | MS6-12 | RS4-1 | 1 |  |  |  |
| ⋮ | ⋮ | ⋮ | ⋮ | ⋮ | ⋮ | ⋮ |

Columns labeled: T111a (main RSID), T112a (MSID), T113a (sub RSID), T114a ($r_{MS}$), T115a ($\Sigma r_{MSmain}$), T116a ($r_{RSmax}$), T117a ($R_{rmain}$)

FIG.22a

| main RSID | MSID | sub RSID | $r_{MS}$ | $\Sigma r_{MSmain}$ | $r_{RSmax}$ | $R_{rmain}$ |
|---|---|---|---|---|---|---|
| BS4-1 | MS6-1 | RS4-2 | 1 | 6 | 18 | 3.0 |
| | MS6-2 | RS4-2 | 2 | | | |
| | MS6-3 | RS4-3 | 2 | | | |
| | MS6-4 | RS4-2 | 1 | | | |
| BS4-2 | MS6-5 | RS4-1 | 2 | 4 | 12 | 3.0 |
| | MS6-6 | RS4-3 | 1 | | | |
| | MS6-7 | RS4-1 | 1 | | | |
| BS4-3 | MS6-8 | RS4-1 | 2 | 8 | 16 | 2.0 |
| | MS6-9 | RS4-2 | 1 | | | |
| | MS6-10 | RS4-2 | 3 | | | |
| | MS6-11 | – | 1 | | | |
| | MS6-12 | RS4-1 | 1 | | | |
| ⋮ | ⋮ | ⋮ | ⋮ | ⋮ | ⋮ | ⋮ |

Column headers labeled T111b, T112b, T113b, T114b, T115b, T116b, T117b.

FIG.22b

| main RSID | MSID | sub RSID | $r_{MS}$ | $\Sigma r_{MSmain}$ | $r_{RSmax}$ | $R_{rmain}$ | $r_{MSnew}$ |
|---|---|---|---|---|---|---|---|
| RS4-1 | MS6-2 | RS4-2 | 2 | 5 | 18 | 3.0 | |
| | MS6-3 | RS4-3 | 2 | | | | |
| | MS6-4 | RS4-2 | 1 | | | | |
| RS4-2 | MS6-5 | RS4-1 | 2 | 4 | 12 | 2.4 | |
| | MS6-6 | RS4-3 | 1 | | | | |
| | MS6-7 | RS4-1 | 1 | | | | 1 |
| RS4-3 | MS6-8 | RS4-1 | 2 | 8 | 16 | 1.8 | |
| | MS6-9 | RS4-2 | 1 | | | | |
| | MS6-10 | RS4-2 | 3 | | | | |
| | MS6-11 | – | 1 | | | | |
| | MS6-12 | RS4-1 | 1 | | | | |

Columns labeled T121, T122, T123, T124, T125, T126, T127, T128.

FIG.23

| main RSID | sub RSID | $\Sigma r_{MSmain}$ | $\Sigma r_{MSsub}$ | $r_{RSmax}$ | $R_{rsub}$ | $r_{MSnew}$ |
|---|---|---|---|---|---|---|
| RS4-1 | RS4-2 | 4 | 3 | 12 | 1.50 | 1 |
| | RS4-3 | 8 | 2 | 16 | 1.45 | |

FIG.24

| MSID | RSID | $E_{RS}$ | $T_{RS}$ | $M_{RS}$ | $P_{RS}$ |
|---|---|---|---|---|---|
| MS6-1 | RS4-1 | $E_{RS1}$ | $T_{RS1}$ | $M_{RS1}$ | $P_{RS1}$ |
|  | RS4-2 | $E_{RS2}$ | $T_{RS2}$ | $M_{RS2}$ | $P_{RS2}$ |
|  | RS4-3 | $E_{RS3}$ | $T_{RS3}$ | $M_{RS3}$ | $P_{RS3}$ |

Columns: T141, T142, T143, T144, T145, T146

FIG.25

| T151 | T152 | T153 | T154 | T155 |
|---|---|---|---|---|
| MSID | APLID | $WE_{RS}$ | $WT_{RS}$ | $WM_{RS}$ |
| MS6-1 | APL1 | $WE_{RS1}$ | $WT_{RS1}$ | $WM_{RS1}$ |
|  | APL2 | $WE_{RS2}$ | $WT_{RS2}$ | $WM_{RS2}$ |
|  | APL3 | $WE_{RS3}$ | $WT_{RS3}$ | $WM_{RS3}$ |

FIG.26

| T161 | T162 | T163 | T164 | T165 |
|---|---|---|---|---|
| MSID | APLID | $W_{QoS}$ | $W_{rmain}$ | $W_{rsub}$ |
| MS6-1 | APL1 | $W_{QoS1}$ | $W_{rmain1}$ | $W_{rsub1}$ |
|  | APL2 | $W_{QoS2}$ | $W_{rmain2}$ | $W_{rsub2}$ |
|  | APL3 | $W_{QoS3}$ | $W_{rmain3}$ | $W_{rsub3}$ |

FIG.27

ROUTE SELECTING DEVICE AND MOBILE RADIO COMMUNICATION SYSTEM

TECHNICAL FIELD

The present invention relates to a route selecting device and a mobile radio communication system, and more particularly to a route selecting device and a mobile radio communication system which selects a main route and a sub route on the basis of residual resources in a radio communication device. The present invention relates to a mobile radio communication system having, for example, a mobile station, one or more relay stations, one or more base stations, a gateway, an external device having a route selection function, and a policy control device. The relay station, the external device having the route selection function, and the policy control device may be omitted.

BACKGROUND ART

As a system for realizing an increase in the speed of mobile radio communication, in recent years, study and standardization activity of a fourth generation mobile communication system have been promoted. In an IMT-Advanced which is one of fourth generation cellular communication systems, a maximum transmission speed is set to 100 Mbps in a high speed moving environment, and 1 Gbps in a low speed moving environment or a fixed environment. A frequency band used in the IMT-Advanced includes the 3.5 GHz band by which a bandwidth of 100 MHz is available in uplink and downlink. In the 3.5 GHz band, frequencies are higher than those in the 800 MHz band and 2 GHz band which are mainly used in a related art radio communication system, resulting in a risk that a transmission distance of electric waves is shortened. This leads to such a problem that an area in which a sufficient reception intensity is not obtained by the conventional number of base stations is broadened and the transmission speed set in the IMT-Advanced cannot be achieved. As a solution to the problem, the number of base stations is increased. A new base station is provided in the area where the sufficient reception intensity is not obtained by the conventional number of base stations to enable radio communication to be conducted. Also, another effective countermeasure is to increase the reception intensity through a radio communication device such as a relay station that relays a communication between the base station and the mobile station.

In the system of this type, the number of radio communication devices such as the base stations or the relay stations per unit area is increased, and a case in which plural radio communication devices that can be connected to the mobile station exists is liable to occur as compared with the conventional art.

When the plural radio communication devices that can be connected to the mobile station exists, there is a need to select an access point from the plural radio communication devices. As a criterion for selecting the radio communication device to be connected, there is a method of conducting selection based on a radio quality between the base station and the mobile station as disclosed in Patent Literature 1. Also, as an example of a protocol stack used in the radio communication system, Non Patent Literature 1 is standardized.

CITATION LIST

Patent Literature

Patent Literature 1: JP-A-2006-352894

Non Patent Literature

Non Patent Literature 1: 3GPP TS23.401 V8.4.0 (2008 December) Technical Specification

SUMMARY OF INVENTION

Technical Problem

In a conventional method of selecting the radio communication device using the radio quality between the base station and the mobile station, accesses to the radio communication device excellent in the radio quality are concentrated, resulting in a risk that a radio resource is short, or convergence occurs.

Also, when there is a need to switch one radio communication device to another due to the movement of the base station or the deterioration of a radio status, if the radio communication device to be newly connected is selected during switching operation, a service disconnection time during the switching operation becomes long.

The present invention has been made in view of the above circumstances, and therefore one object of the present invention is to enable a mobile station connected to one radio communication device to select another radio communication device having a large amount of residual resources as a new access point when the one radio communication device cannot be used, to prevent shortage of the radio resources and convergence in a mobile radio communication system.

Another object of the present invention is to enable a process of selecting the radio communication device as a new access point to be omitted when switching one route to another by determining a sub route as the new access point when a main route is disconnected in advance, to shorten a service disconnection time.

Solution to Problem

The present invention relates to a mobile radio communication system having a route selection function for selecting a main route and a sub route which are used for communication between a mobile station and a gateway on the basis of the residual resources of a base station through which the route goes. Also, the present invention relates to a mobile radio communication system having a route selection function for selecting the main route and the sub route which are used for communication between the mobile station and the gateway on the basis of the residual resources of the relay station through which the route goes.

According to a fourth solution of the present invention, there is provided the mobile radio communication system including the gateway, the base station, the relay station, another device, or the mobile station having the above-mentioned route selecting device.

According to the first solving means of the present invention, there is provided a route selecting device, comprising:

a first memory that stores profile information including, with respect to an identifier "main BSID" of a base station BS, an identifier "MSID" of a mobile station MS that has already selected the BS having the main BSID as a main route, an identifier "sub BSID" of the BS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the BS having the main BSID as the main route, an index $r_{BSmax}$ of an upper limit of the radio resource amount acceptable by the BS having the main BSID, and an evaluation index $R_{rmain}$ based on a residual radio resource amount of the BS having the main BSID as the main route;

a second memory that stores the profile information on the BS selectable as the main route in association with an index $r_{MSnew}$ of the radio resource amount requested by the MS that requests route setting; and a processor that calculates an evaluation index of the route, and selects the route on the basis of the evaluation index, wherein the processor receives, from the BS, a first message including the MSID of the mobile station, the index $r_{MSnew}$ of the radio resource amount requested by the MS, and an identifier "available BSIDs" of the BSIDs of the BS communicatable with the subject mobile station, within requests for the route setting which are transmitted from the MS, the processor extracts, from the first memory, the profile information of the BSs corresponding to a plurality of BSIDs selectable as the route, which are included in the available BSIDs within the first message, and creates the second memory on the basis of the profile information on the BS and $r_{MSnew}$, and the processor calculates an index $(R_{rmain})_n$ of a first residual resource amount on the basis of a ratio of $(r_{BSmax})_n$ to a sum of $(\Sigma r_{MSmain})_n$ and $r_{MSnew}$ for a route n according to the information stored in the second memory when selecting the main route, to calculate the evaluation index $(R_{main})_n$ of the main route based on the first residual resource amount of the BS with respect to the BSs having the main BSIDs stored in the second memory (where ( )n represents each route n), and the processor selects the BS that is the largest in the calculated evaluation index $(R_{main})_n$ of the main route as the main route.

According to the second solving means of the present invention, there is provided a route selecting device, comprising:

a first memory that stores profile information including, with respect to an identifier "main RSID" of a relay station RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route;

a second memory that stores the profile information on the RS selectable as the main route in association with an index $r_{MSnew}$ of the radio resource amount requested by the MS that requests route setting; and a processor that calculates an evaluation index of the route, and selects the route on the basis of the evaluation index, wherein the processor receives, from the RS, a first message including the MSID of the mobile station, the index $r_{MSnew}$ of the radio resource amount requested by the MS, and an identifier "available RSIDs" of the RSIDs of the RS communicatable with the subject mobile station, within requests for the route setting which are transmitted from the MS, the processor extracts, from the first memory, the profile information of the RSs corresponding to a plurality of RSIDs selectable as the route, which are included in the available RSIDs within the first message, and creates the second memory on the basis of the profile information on the RS and $r_{MSnew}$, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the second memory when selecting the main route, to calculate the evaluation index $(R_{main})_n$ of the main route based on the first residual resource amount of the RS with respect to the RSs having the main RSIDs stored in the second memory (where ( )n represents each route n), and the processor selects the RS that is the largest in the calculated evaluation index $(R_{main})_n$ of the main route as the main route.

According to the third solving means of the present invention, there is provided a route selecting device, comprising:

a second memory that, concerning a relay station RS selectable as a main route, stores profile information including, with respect to an identifier "main RSID" of the RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route, in association with an index $r_{MSnew}$ of the radio resource amount requested by the MS that requests route setting; and a processor that calculates an evaluation index of the route, and selects the route on the basis of the evaluation index, wherein the processor of the MS sends requests for the route setting including the MSID of the mobile station, the index $r_{MSnew}$ of the radio resource amount requested by the MS, and an identifier "available RSIDs" of the RSIDs of the RS communicatable with the subject mobile station, the processor receives, the profile information of the RSs corresponding to a plurality of RSIDs selectable as the route, which are included in the available RSIDs, and creates the second memory on the basis of the profile information on the RS and $r_{MSnew}$, by response of a gateway, a BS, a RS or an another device for the request for the route setting, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the second memory when selecting the main route, to calculate the evaluation index $(R_{main})_n$ of the main route based on the first residual resource amount of the RS with respect to the RSs having the main RSIDs stored in the second memory (where ( )n represents each route n), and the processor selects the RS that is the largest in the calculated evaluation index $(R_{main})_n$ of the main route as the main route.

Advantageous Effect of Invention

It is possible, by the present invention, to enable a mobile station connected to one radio communication device to select another radio communication device having a large amount of residual resources as a new access point when the one radio communication device cannot be used, to prevent shortage of the radio resources and convergence in a mobile radio communication system.

Also, it is possible, by the present invention, to enable a process of selecting the radio communication device as a new access point to be omitted when switching one route to another by determining a sub route as the new access point when a main route is disconnected in advance, to shorten a service disconnection time.

BRIEF DESCRIPTION OF DRAWINGS

FIG. 2c illustrates an example of a mobile radio communication system using a relay system.

FIG. 5a illustrates an example of information that is managed by a memory unit of a gateway.

FIG. 5b illustrates an example of information that is managed by a memory unit of a gateway.

FIG. 6 illustrates an example of information that is managed by a memory unit of a gateway.

FIG. 7 illustrates an example of information that is managed by a memory unit of a gateway.

FIG. 8 illustrates an example of information that is managed by a memory unit of the gateway or a policy management function.

FIG. 9 illustrates an example of information that is managed by a memory unit of the gateway or a policy management function.

FIG. 10 illustrates an example of information that is managed by a memory unit of the gateway or a policy management function.

FIG. 22a illustrates an example of information that is managed by the memory unit of the gateway in the case of the relay system.

FIG. 22b illustrates an example of information that is managed by the memory unit of the gateway in the case of the relay system.

FIG. 23 illustrates an example of information that is managed by the memory unit of the gateway in the case of the relay system.

FIG. 24 illustrates an example of information that is managed by the memory unit of the gateway in the case of the relay system.

FIG. 25 illustrates an example of information that is managed by the memory unit of the gateway or the policy management function in the case of the relay system.

FIG. 26 illustrates an example of information that is managed by the memory unit of the gateway or the policy management function in the case of the relay system.

FIG. 27 illustrates an example of information that is managed by the memory unit of the gateway or the policy management function in the case of the relay system.

DESCRIPTION OF EMBODIMENTS

1. Outline

This embodiment provides a mobile radio communication system in which a gateway (hereinafter referred to as "access gateway (AGW)") can select a base station (hereinafter referred to as "BS") on a main route used for communication, and select the BS on the sub route which is an access point when the main route is disconnected, from plural BSs that can be connected with a mobile station (hereinafter referred to as "mobile station (MS)") on the basis of the residual resources of the BS.

This case will be described in a first embodiment below.

Also, this embodiment can be applied to the selection of a relay station (hereinafter referred to as "RS") in the mobile radio communication system using the relay system. In this case, there is provided a system in which the AGW can select the RS on the main route used for communication, and select the RS on the sub route which is an access point when the main route is disconnected, from the plural RSs that can be connected with the MS on the basis of the residual resources of the RS.

This case will be described in a second embodiment below.

Also, this embodiment can be applied to the selection of the relay station and the base station in the mobile radio communication system using the relay system. In this case, there is provided a system in which the AGW can select the RS and the BS on the main route used for communication, and select the RS and the BS on the sub route which is an access point when the main route is disconnected, from the plural RSs and BSs that can be connected with the MS on the basis of the residual resources of the RS and the BS.

This case will be described in a third embodiment below.

Also, in the respective embodiments, route selection can be conducted by not the gateway, but an external device (hereinafter referred to as "RSF"), the BS, or the MS having a route selection function. Also, the respective embodiments can be applied to a case in which plural routes are used at the same time, and the routes of the number requested on the basis of the residual resources in the radio communication device can be selected from the plural selectable routes. Further, the main route and the sub route may be selected on the basis of a quality of the routes apart from the residual resources of the base station and the relay station. Policy information including information on the weight of a route selection criterion or quality information on the routes is set within the AGW in advance, or acquired from a policy control and rules function (hereinafter referred to as "PCRF")

2. First Embodiment (Base Station)

[First Embodiment: One Example in which a Main Route and a Sub Route are Selected on the Basis of Residual Resources of a Base Station in a Mobile Radio Communication System having no Relay Station between a Mobile Station and the Base Station]

2-1. System

[One Example of Architecture of Mobile Radio Communication System According to this Embodiment]

Figure 1A:
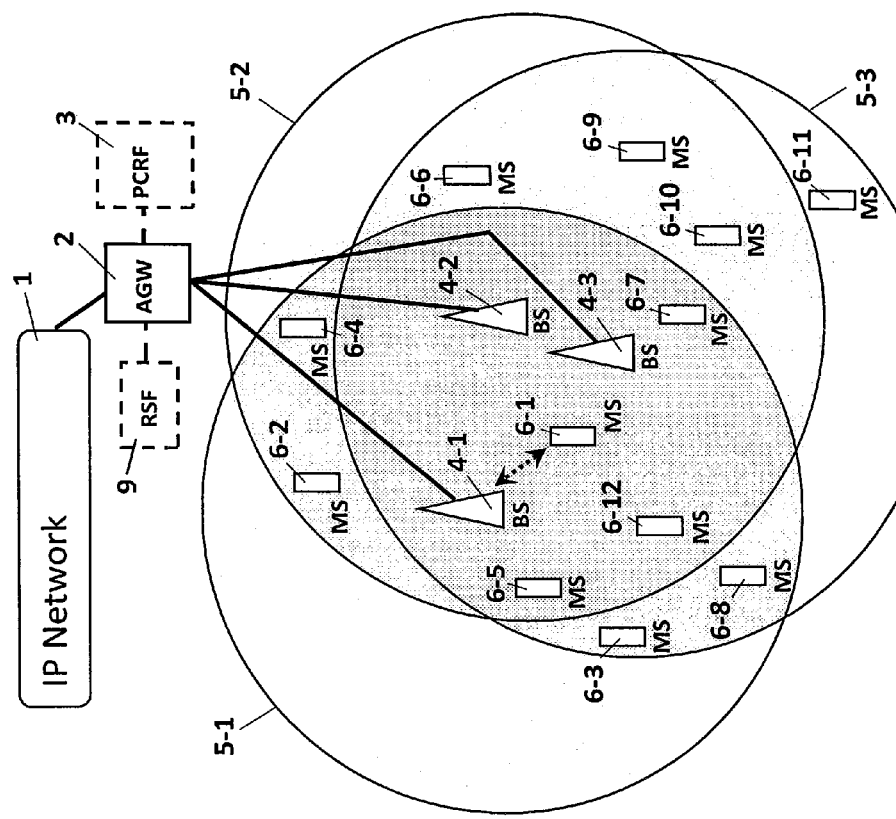
FIG. 1a illustrates an example of a mobile radio communication system.

FIG. 1a illustrates an example of architecture in the mobile radio communication system according to this embodiment.

An AGW 2 is connected to an internet protocol (IP) network 1, has a function of selecting the main route and the sub route based on the residual resources of a BS 4, and transmits and receives a control signal and data with respect to the BS 4. When the route is selected by a node other than the gateway, the function of selecting the main route and the sub route by the AGW 2 is omitted.

A PCRF 3 manages the information on the weight of the selection criterion as the policy information, and transmits and receives the control signal and the data with respect to the AGW 2. When the policy information is set within the AGW 2 in advance, the PCRF 3 can be omitted.

The BS 4 transmits and receives the control signal and the data with respect to the AGW 2 and an MS 6 existing within a radio communication range 5 of the BS 4. In the case of FIG. 1a, for example, a BS4-1 can transmit and receive the control signal and the data with respect to the AGW 2, and an MS 6-1, an MS 6-2, an MS 6-3, an MS 6-4, an MS 6-5, an MS 6-7, an MS 6-8, and an MS 6-12 existing within a radio communication range 5-1. When the route is selected in the base station, the BS 4 has a function of selecting the main route and the sub route based on the residual resources of the BS 4.

The MS 6 transmits and receives the control signal and the data with respect to the radio communicatable BS 4. In the case of FIG. 1a, for example, an MS 6-9 can transmit and receive the control signal and the data with respect to a BS 4-2 and a BS 4-3. When the route is selected in the mobile station, the MS 6 has a function of selecting the main route and the sub route based on the residual resources of the BS 4.

An RSF 9 is an external device having a function of selecting the main route and the sub route based on the residual resources of the BS 4, and transmits and receives the control signal and the data with respect to the AGW 2. When the main route and the sub route are selected by a node other than the external device, the RSF 9 can be omitted.

[One Example of a Method of Acquiring an Identifier of the Base Station Selectable as a Route by the Mobile Station According to this Embodiment]

When the BS transmits a signal including its own base station identifier (hereinafter referred to as "BSID") as annunciation information, the MS receives the annunciation information from the BS, and saves the BSID of the surrounding communicatable BS in a memory unit.

On the other hand, when the BS does not transmit the signal including its own "BSID" as the annunciation information, there is a method of inquiring about the surrounding communicatable BS from the MS.

As the method of inquiring about the BSID of the surrounding communicatable BS from the MS, there is the following method.

The MS transmits a message including its own mobile station identifier (hereinafter referred to as "MSID") to all of the surrounding BSs by broadcast in order to know the BSID of the surrounding communicatable BS.

The BS that has received the message from the MS returns the message adding its own BSID to the MS.

The MS that has received a return message from the BS stores the BSID included in the message in the memory unit, sets up a timer, and waits for a message from another BS.

When the MS receives the message from another BS within a time set up by the timer, the MS saves the BSID included within the message in the memory unit, and resets the timer.

When the MS does not receive the message from another BS within the time set up by the timer, the MS saves all of the BSIDs received previously as the BSIDs of the surrounding communicatable BSs in the memory unit.

Also, as another method for inquiring about the BSID of the surrounding communicatable BS from the MS, there is the following method.

The MS transmits the message including its own MSID to all of the surrounding BSs by broadcast in order to know the BSID of the surrounding communicatable BS.

The BS that has received the message from the MS transmits the message adding its own BSID to the AGW.

The AGW that has received the message from the BS stores the MSID and the BSID included in the message in the memory unit, sets up a timer, and waits for a message from another BS.

When the AGW receives the message from another BS within a time set up by the timer, the AGW confirms the MSID included within the message. If a request is transmitted from the same MS, the AGW also saves the BSID in the memory unit, and resets the timer.

When the AGW does not receive the message from another BS within the time set up by the timer, the AGW transmits the message including all of the BSIDs received previously to the BS corresponding to any one BSID. As the BS to which the message should be transmitted, the BS excellent in communication environments may be selected with reference to a BS profile included the BS information within the AGW, or the BS may be selected at random.

The BS that has received the message from the AGW transmits the message to the MS on the basis of the MSID within the message.

The MS that has received the message from the BS saves all of the BSIDs included in the message as the BSID of the surrounding communicatable BS in the memory unit.

[One Example of Method of Notifying Device having Route Selection Function of Profile Information on Base Station provided in Base Station According to this Embodiment]

A case in which the AGW has the route selection function will be described.

Some of parameters used in selecting the main route and the sub route by the AGW can be notified the AGW as profile information on the BS (hereinafter referred to as "BS profile") in advance.

As information included in the BS profile, there is $r_{BSmax}$ which is an index of an upper limit of a radio resource amount that is acceptable by the BS. $r_{BSmax}$ is used when the AGW selects the main route and the sub route based on the residual resources of the BS.

Also, when the AGW selects the main route and the sub route, if the quality is also taken into account apart from the residual resources of the BS, an effective data transfer rate (hereinafter referred to as "E") between the MS and the BS, a residual communicatable time (hereinafter referred to as "T") of the BS, a mobility (hereinafter referred to as "M") of the BS, and a use priority (hereinafter referred to as "P") of the BS can be included in the BS profile as parameters (hereinafter referred to as "QoS parameters") used for route selection based on the quality.

E is the effective data transfer rate between the MS and the BS, and depends on a radio signal reception intensity of the MS or the like.

T indicates the communicatable time of the BS. T depends on a battery charge of the BS or service contract detail of the BS or the like. T can be omitted when the communicatable time is not set in the BS.

M is the mobility of the BS, and a value indicative of modes of the BS such that the BS is fixed, nomadic, portable, or mobile. When the mode of the BS is uniquely determined, M can be omitted.

P is the priority of the BS. If the priority of the BS possessed by, for example, police or fire is set to be low, the BS can be prevented from being used as a data route of a third party. Also, for example, when a high priority is set for a given BS, incentive can be given so that the BS becomes the data route of the third party.

The BS notifies the AGW of its own BS profile when the timer set up within the BS expires, when the BS profile information is changed, or when the AGW or the MS requests the BS to notify the AGW of the BS profile. Also, when the BS moves, the BS may notify the AGW of the BS profile if the BS updates an area.

As a method of notifying the AGW of the BS profile by the BS, there is the following method.

The BS that notifies the AGW of the BS profile transmits a message including its own BSID and the BS profile to the AGW. When the BS stores the BS profile notified previously, the BS can notify the AGW of only a difference from the previously notified BS profile.

The AGW that has received the message from the BS creates or updates FIG. 5a on the basis of the BS profile. In the case where the quality is also taken into account apart from the residual resources of the BS when the AGW selects the main route and the sub route, if the QoS parameters are included in the BS profile, the AGW creates or updates FIG. 8.

The AGW transmits the message to the BS that has given notification of the BS profile.

The BS that has received the message from the AGW knows that the BS profile has been notified the AGW of.

Even in the case where a device other than the gateway has the route selection function, the same method is applied so that the profile information on the base station can be notified the device having the route selection function of.

2-2. Setting of Main Route and Sub Route

[One Example of Call Flow of Setting Main Route and Sub Route in Radio System According to this Embodiment]

As nodes for setting the main route and the sub route, there are conceivable candidates of the gateway, the external device, the base station, and the mobile station.

Figure 3:
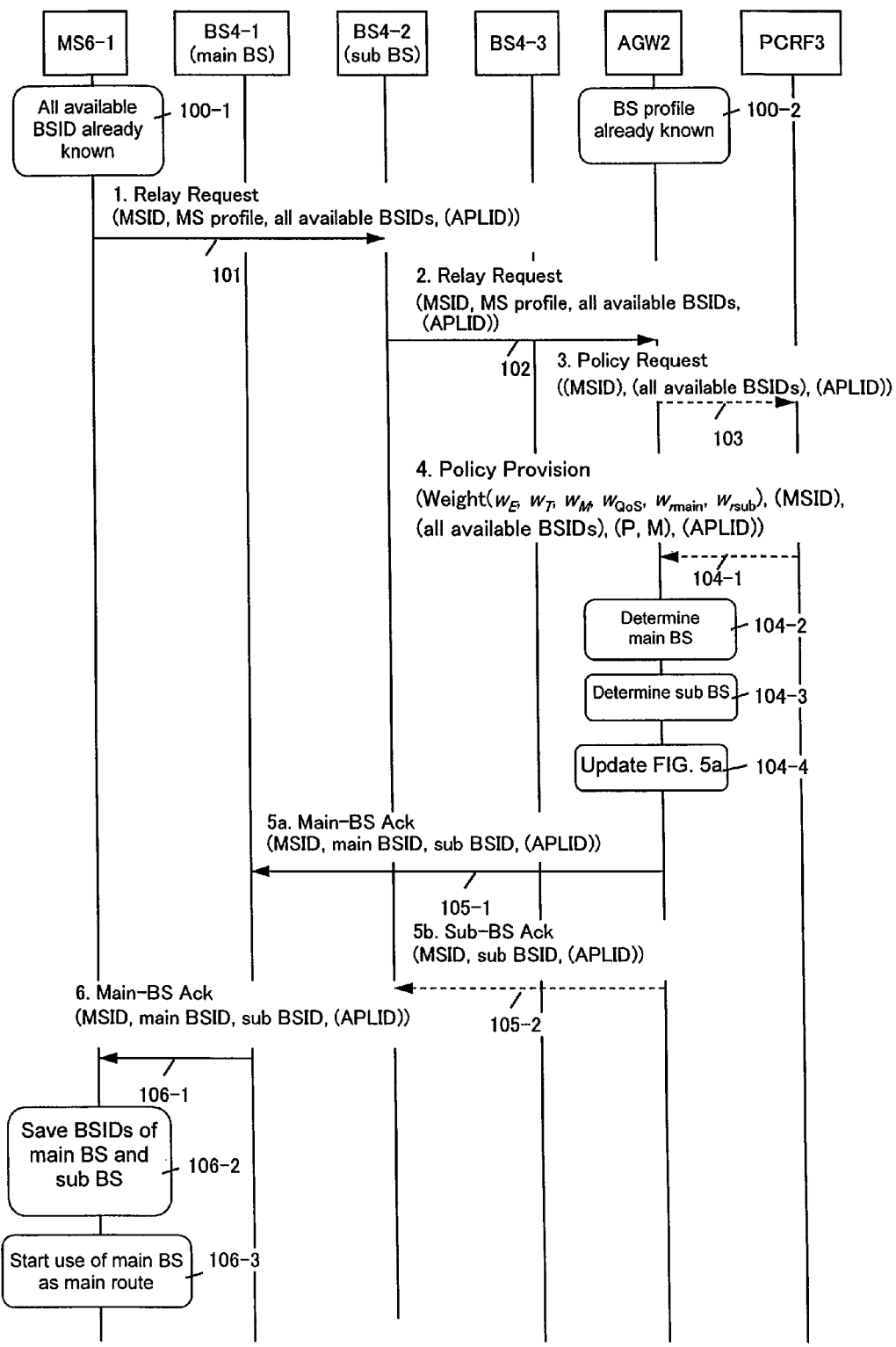
FIG. 3 illustrates an example of a call flow of main route and sub route setting.

FIG. 3 illustrates one example of a call flow when the main route and the sub route in the radio system are set by the gateway according to this embodiment. In this example, the MS 6-1 in FIG. 1a initializes the main route and the sub route. A format of the message in FIG. 3 will be described with reference to FIGS. 11 to 18.

In Step 100-1, the MS has already known the BSID of the surrounding BS communicatable with the MS through the above method.

Also, in Step 100-2, the BS profile of each BS has been already notified the AGW of through the above method.

The MS transmits a message 101 to one of the BSs communicatable with the MS in order to request setting of the main route and the sub route. The BS to which the MS transmits the message 101 may be the BS highest in the reception intensity of the signal among the BSs communicatable with the MS, or may be determined at random.

The MS includes, in the message 101, its own MSID, its own profile information (hereinafter referred to as "MS profile"), and the BSIDs (hereinafter referred to as "all available BSIDs") of all the BSs communicatable with the MS. The MS sets the index ($r_{MSnew}$) of the resource amount requested by the MS for the MS profile.

Also, the MS can set information such as the priority of the MS for the MS profile. The priority of the MS can be used when it is determined which MS route should be changed in conducting a route change request initiated by the AGW, or when a value (hereinafter referred to as "weight") of weight for determining a criterion of the route selection, which is included in the policy information set within the AGW or the PCRF, is determined.

Also, the MS can include an identifier (hereinafter referred to as "APLID") of an application run by the MS in the message 101. The APLID can be omitted when the policy information set within the AGW or the PCRF does not depend on the application.

The BS that has received the message 101 from the MS transmits a message 102 to the AGW. The BS copies the MSID, the MS profile, and the all available BSIDs, which have been received by the message 101, into the message 102.

Also, when the BS receives the APLID from the MS, the BS also includes the APLID in the message.

The AGW that has received the message 102 from the BS transmits a message 103 to the PCRF. When the APLID is included in the message 102, the AGW includes the APLID within the message 102 in the message 103.

Also, if the policy information is different for each MS, the AGW includes the MSID within the message 102 in the message 103.

Also, if the parameter such as P or M different for each BS is included in the policy information, the AGW includes all available BSIDs within the message 102 in the message 103.

If the AGW has all of the necessary policy information, the AGW can be advanced to Step 104-2 without transmission of the message 103.

The PCRF that has received the message 103 from the AGW extracts the policy information corresponding to the BS having the BSID included in all available BSIDs within the message 103 from the memory unit. If the policy information is different for each MS, the PCRF extracts the corresponding policy information from the memory unit on the basis of the MSID included in the message 103.

Also, if the policy information is different for each application run by the MS, the PCRF extracts the corresponding policy information from the memory unit on the basis of the APLID included within the message 103.

Also, if the parameter such as P or M different for each BS is included in the policy information, the PCRF extracts the corresponding policy information from the memory unit on the basis of all available BSIDs included within the message 103.

The PCRF that has received the message 103 from the AGW includes the policy information extracted from the memory unit in a message 104-1, and transmits the message 104-1 to the AGW that is a source of the message 103. The PCRF includes the weight included in the policy information in the message 104-1. If the weight is different depending on the APLID or the MSID, the PCRF includes the weight corresponding to the APLID or the MSID included in the message 103 in the message 104-1.

The AGW that has received the message 104-1 from the PCRF creates FIG. 6 on the basis of the policy information included in the message 104-1, the BS profile and the MS profile extracted from the memory unit. If the quality is taken into account for selection of the main route, the AGW creates FIGS. 6, 8, 9, and 10 on the basis of the policy information included in the message 104-1, and the BS profile and the MS profile which have been extracted from the memory unit. If the AGW has all of the necessary policy information, the AGW can extract the policy information from the memory unit.

In Step 104-2, the AGW selects the BS of the main route on the basis of FIG. 6. If the quality is taken into account for selection of the main route, the AGW selects the BS of the main route on the basis of FIGS. 6, 8, 9, and 10 in Step 104-2. A specific process of the main route selection will be described in detail with reference to a flowchart of FIG. 19a to be described later.

In Step 104-3, the AGW creates FIG. 7 on the basis of FIG. 6, and selects the BS of the sub route. If the quality is taken into account for selection of the sub route, the AGW selects the BS of the sub route on the basis of FIGS. 7, 8, 9, and 10. A specific process of the sub route selection will be described in detail with reference to a flowchart of FIG. 19a to be described later.

In Step 104-4, the AGW updates FIG. 5a saved in the memory unit on the basis of the main route selected in Step 104-2 and the sub route selected in Step 104-3, and creates FIG. 5b. The AGW saves the created FIG. 5b in the memory unit.

The AGW includes the MSID of the MS that has requested the setting of the route, the BSID (hereinafter referred to as "main BSID") of the BS selected as the main route, and the BSID (hereinafter referred to as "sub BSID") of the BS selected as the sub route in a message 105-1 on the basis of the main route selected in Step 104-2 and the sub route selected in Step 104-3. Then, the AGW transmits the message 105-1 to the BS selected as the main route, and sets a data route to the BS selected as the main route.

If the BS selected as the route is different for each application, the AGW transmits the message 105-1 including the APLID to the BS, and notifies the BS selected as the main route what kind of application is used to select the BS as the route.

Also, the AGW includes the MSID of the MS that has requested the setting of the route, and the sub BSID in a message 105-2, and transmits the message 105-2 to the BS selected as the sub route. If the BS selected as the route is different for each application, the AGW transmits the message 105-2 including the APLID to the BS, and notifies the BS selected as the sub route what kind of application is used to select the BS as the route. If there is no need to be aware that the BS is selected as the sub route, this message can be omitted.

The BS that has received the message 105-1 knows that the subject BS is selected as the BS of the main route of the MS from the MSID and the main BSID within the message. The BS selected as the main route sets the data route to the AGW that has transmitted the message 105-1. Then, the BS transmits a message 106-1 to the MS corresponding to the MSID included in the message 105-1, and sets the data route to the MS.

The BS that has received the message 105-2 knows that the subject BS is selected as the BS of the sub route of the MS from the MSID and the sub BSID within the message. If there is no need to be aware that the BS is selected as the sub route, this message can be omitted.

The MS that has received the message 106-1 from the BS selected as the main route knows the BS selected as the main route from the main BSID within the message 106-1, and knows the BS selected as the sub route from the sub BSID within the message 106-1.

In Step 106-2, the MS that has received the message 106-1 saves the main BSID and the sub BSID within the message 106-1 in the memory unit.

In Step 106-3, the MS that has received the message 106-1 sets the data route to the BS selected as the main route, and uses the BS as the main route.

Figure 21A:
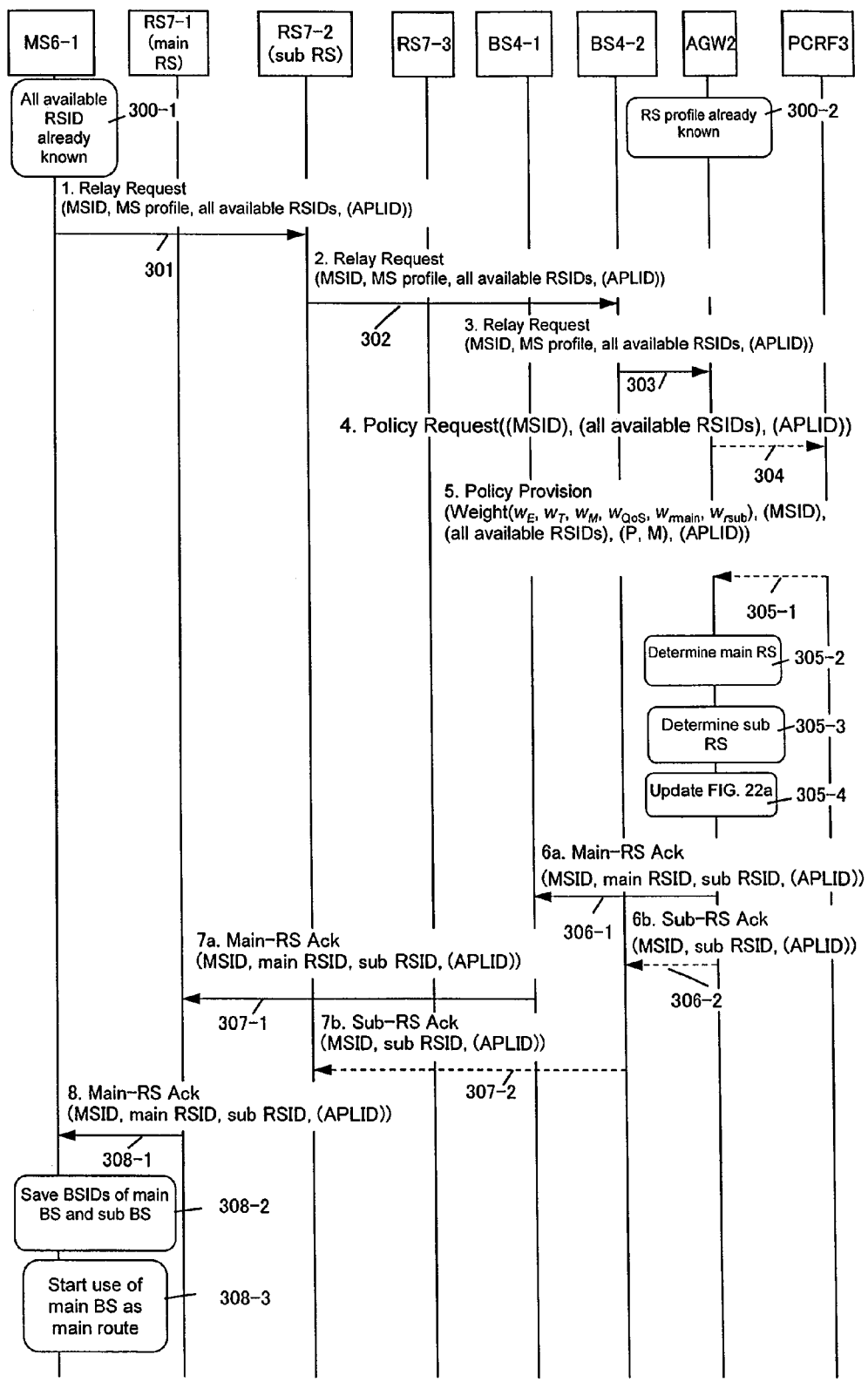
FIG. 21a illustrates an example of a call flow of setting the main route and the sub route in the case of the relay system.

A call flow when the main route and the sub route in the radio system are set in the base station according to this embodiment is identical with a case in which the RS of FIG. 21a is omitted, and the route selection process of the AGW is conducted by the BS.

Figure 21B:
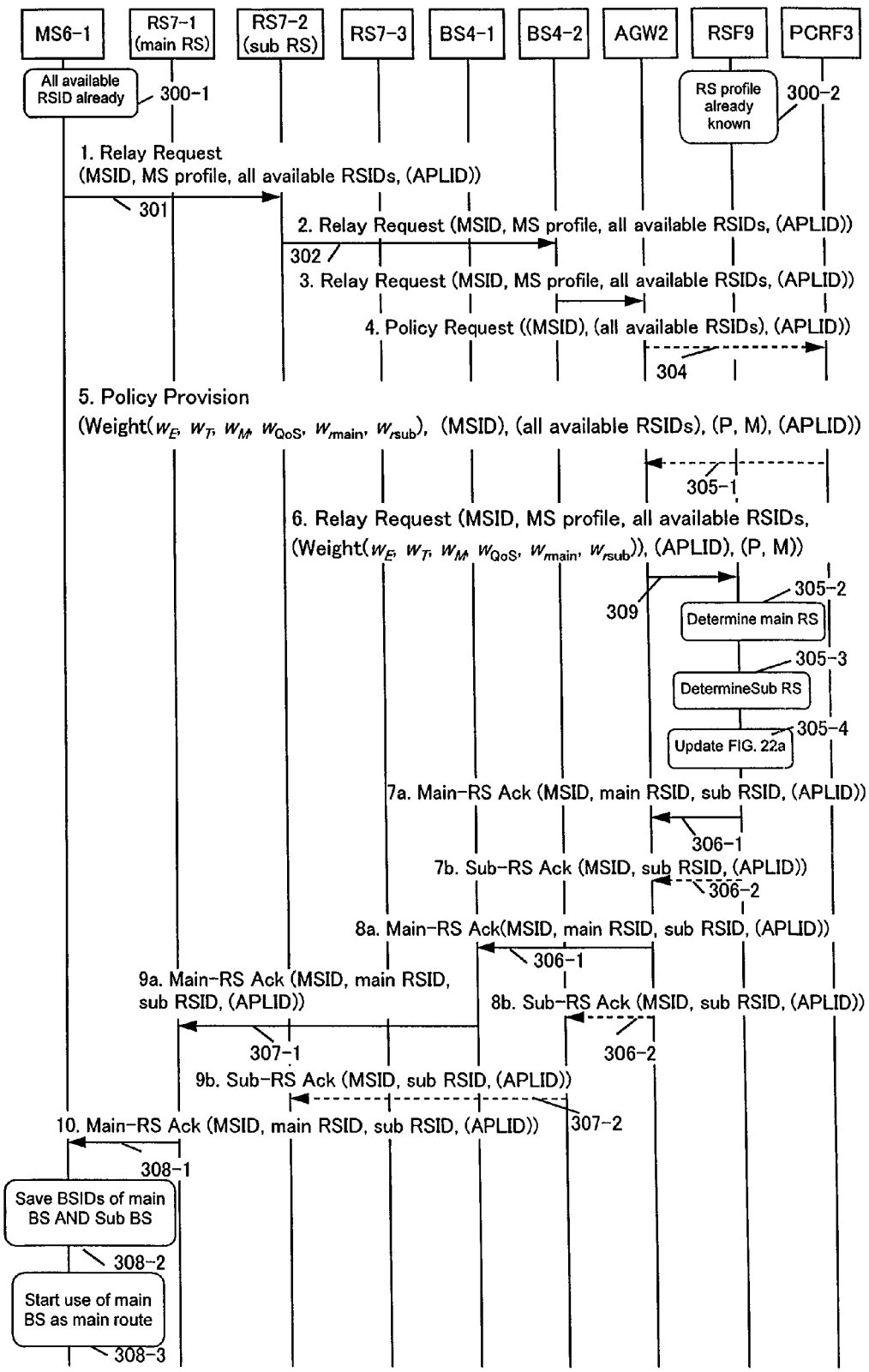
FIG. 21b illustrates an example of a call flow of setting the main route and the sub route in the case of the relay system.

A call flow when the main route and the sub route in the radio system are set in the external device RSF according to this embodiment is identical with a case in which the RS of FIG. 21b is omitted, and the MS and the BS communicate directly with each other.

Figure 21C:
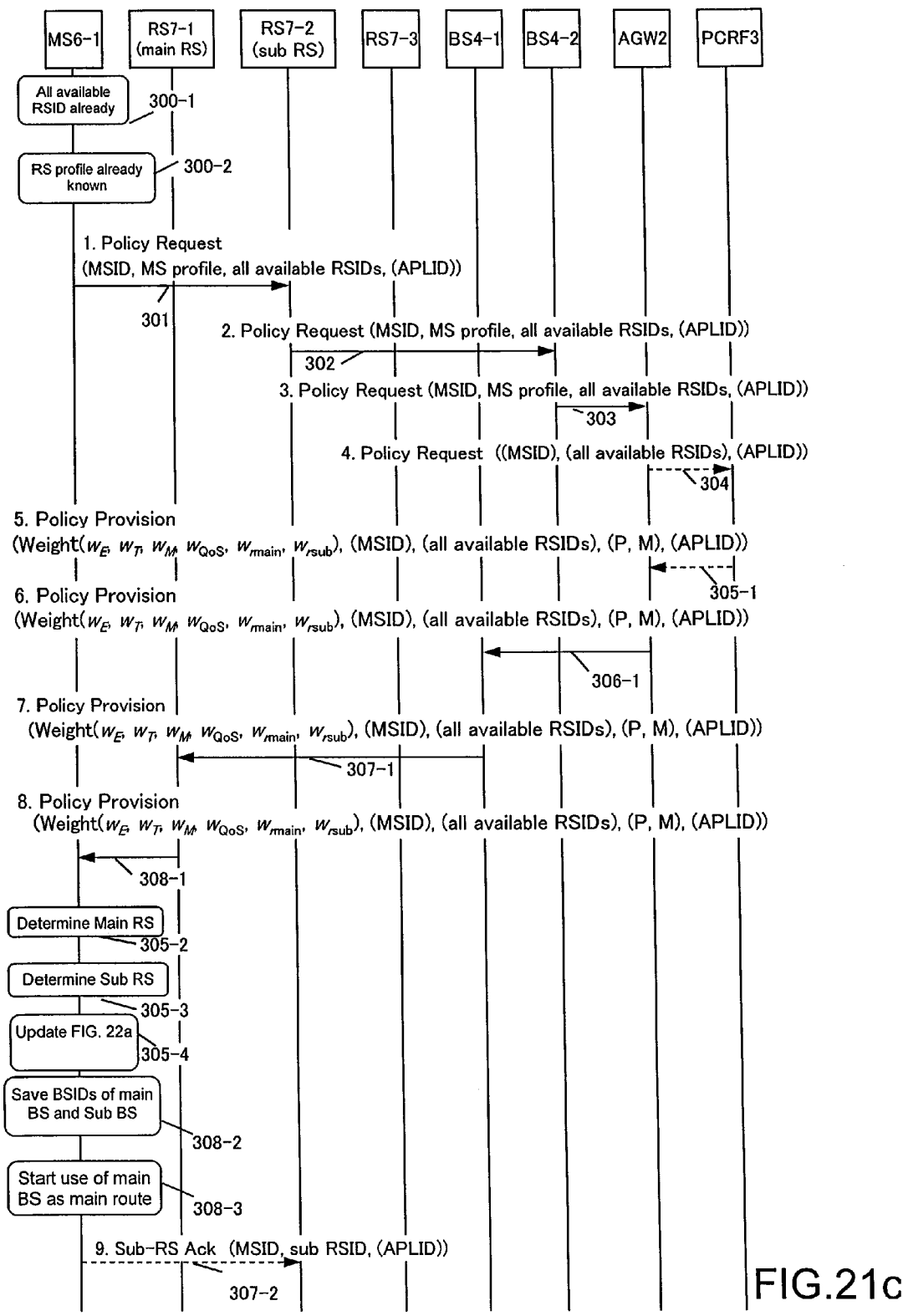
FIG. 21c illustrates an example of a call flow of setting the main route and the sub route in the case of the relay system.

A call flow when the main route and the sub route in the radio system are set in the mobile station according to this embodiment is identical with a case in which the RS of FIG. 21c is omitted, and the MS and the BS communicate directly with each other.

2-3. Switching from Main Route to Sub Route

[One Example of Call Flow of Switching from Main Route to Sub Route in Radio System According to this Embodiment]

Figure 20:
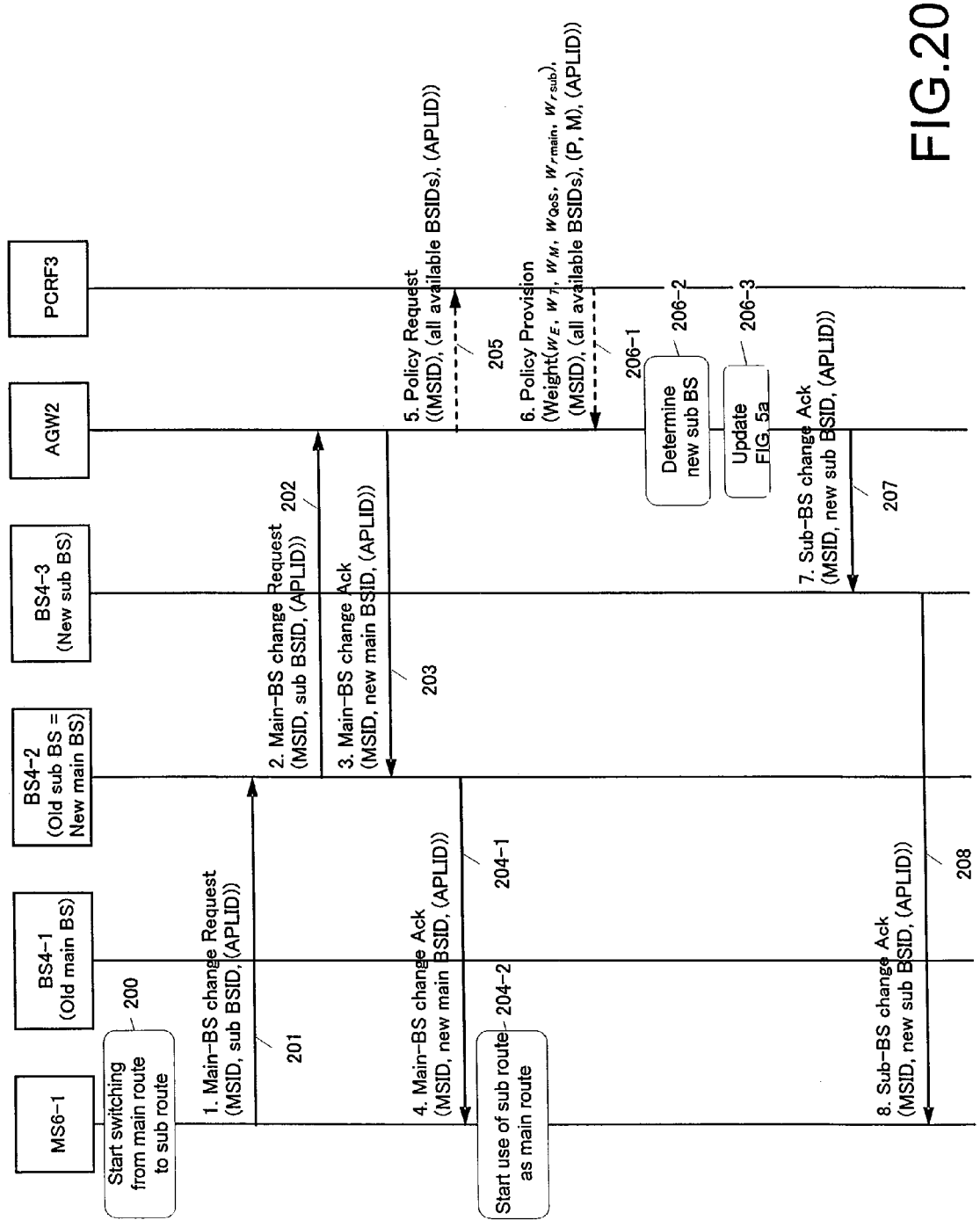
FIG. 20 illustrates an example of a call flow of switching from the main route to the sub route.

FIG. 20 illustrates one example of a call flow of switching from the main route to the sub route in the radio system according to this embodiment. In this example, the MS 6-1 in FIG. 1a disconnects the BS 4-1 used as the main route, connects the BS 4-2, which has been selected as the sub route, as a new main route, and selects a BS 4-3 as a new sub route.

Figure 1B:
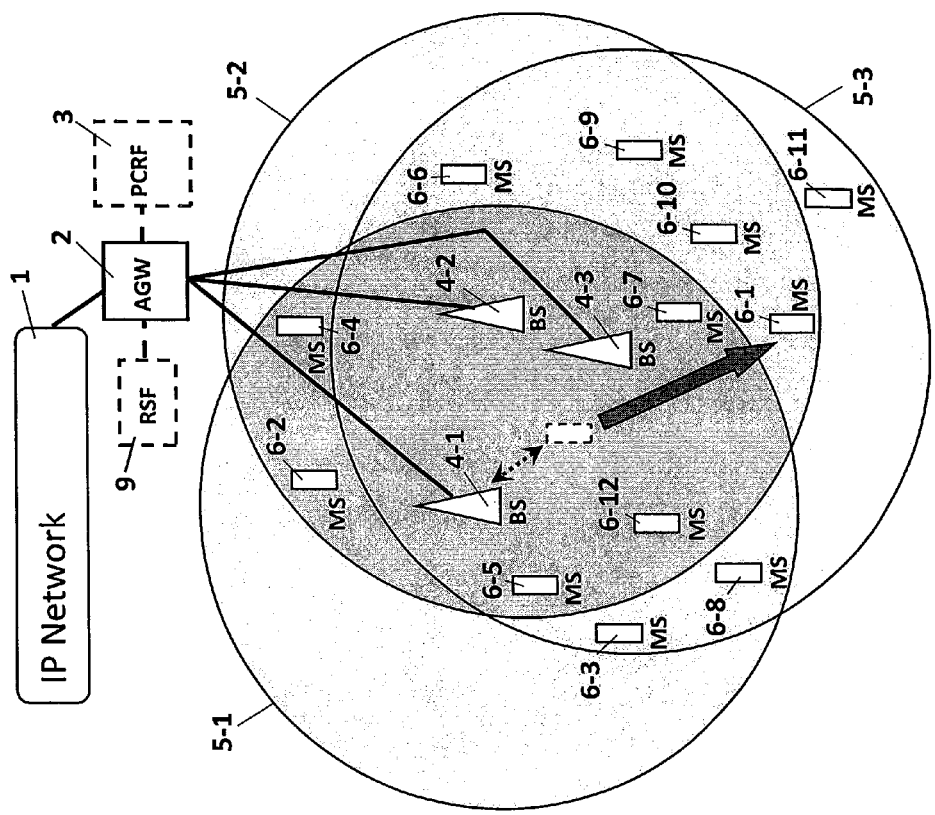
FIG. 1b illustrates an example of a mobile radio communication system.
Figure 1C:
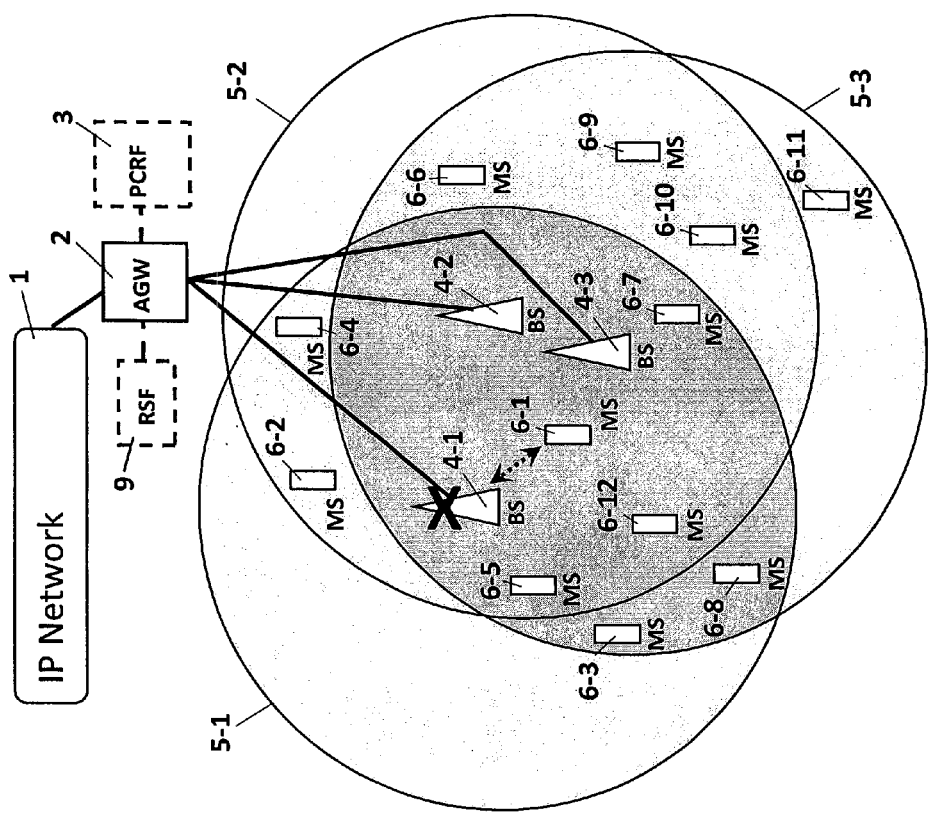
FIG. 1c illustrates an example of a mobile radio communication system.

As a case of switching from the main route to the sub route, there is conceivable a case in which the MS is moved out of a radio communication range of the BS selected as the main route (FIG. 1b), and a case in which the BS selected as the main route becomes unavailable (FIG. 1c).

In Step 200, the MS detects that there is a need to switch a data route from the main route to the sub route.

The MS that switches from the main route to the sub route extracts the BSID (sub BSID) of the BS that has been already determined as the sub route from the memory unit, includes its own MSID and the sub BSID in a message 201, and transmits the message 201 to the BS corresponding to the sub BSID. When the route is set for each application, the MS includes the APLID in the message 201.

The BS that has received the message 201 from the MS transmits a message 202 to the AGW.

The AGW that has received the message 202 from the BS knows that the MS requests switching from the main route to the sub route, from the MSID and the sub BSID which are included in the message 202. The AGW sets a value of the sub BSID to the BSID (hereinafter referred to as "new main BSID") of the sub route which becomes a new main route included in a message 203 as it is, and transmits the message 203 to the BS corresponding to the sub BSID included in the message 202. The AGW sets the data route to the BS corresponding to the sub BSID included in the message 202. The AGW transmits a message 205 immediately after transmitting the message 203. A procedure subsequent to the transmission of the message 205 will be described later.

The BS that has received the message 203 from the AGW knows that the subject BS is selected as the main route of the MS, from the MSID and the new main BSID within the message 203. The BS selected as the main route sets the data route to the AGW that has transmitted the message 203. Then, the BS transmits a message 204-1 to the MS corresponding to the MSID included in the message 203, and sets the data route to the MS.

The MS that has received the message 204-1 saves the new main BSID within the message 204-1 in the memory unit.

In Step 204-2, the MS that has received the message 204-1 sets the data route to the BS newly selected as the main route, and uses the BS as the main route.

On the other hand, the AGW that has transmitted the message 203 transmits the message 205 to the PCRF. When the APLID is included in the message 202, the AGW includes the APLID within the message 202 in the message 205.

Also, if the policy information is different for each MS, the AGW includes the MSID within the message 202 in the message 205.

Also, if the parameter such as P or M different for each BS is included in the policy information, the AGW includes all available BSIDs created on the basis of FIG. 5a within the memory unit in the message 205.

If the AGW has all of the necessary policy information, the AGW can be advanced to Step 206-2 without transmitting the message 205.

The PCRF that has received the message 205 from the AGW extracts the corresponding policy information from the memory unit.

If the policy information is different for each MS, the PCRF extracts the corresponding policy information from the memory unit on the basis of the MSID included in the message 205.

Also, if the policy information is different for each application run by the MS, the PCRF extracts the corresponding policy information from the memory unit on the basis of the APLID included within the message 205.

The PCRF includes the policy information extracted from the memory unit in a message 206-1, and transmits the message 206-1 to the AGW.

In Step 206-2, the AGW that has received the message 206-1 from the PCRF creates FIG. 7 on the basis of FIG. 5a, and selects the BS of a new sub route. If the quality is also taken into account for selection of the sub route, the AGW selects the BS of the sub route on the basis of FIGS. 7, 8, 9, and 10. A specific process of the sub route selection will be described in detail with reference to a flowchart of FIG. 19a to be described later.

In Step 206-3, the AGW updates FIG. 5a saved in the memory unit on the basis of the sub route selected in Step 206-2, and saves the updated FIG. 5a in the memory unit.

The AGW includes the MSID of the MS that has requested the setting of the route, and the BSID (hereinafter referred to as "new sub BSID") of the BS newly selected as the sub route in a message 207 on the basis of the sub route selected in Step 206-2. Then, the AGW transmits the message 207 to the BS newly selected as the sub route.

If the BS selected as the route is different for each application, the AGW transmits the message 207 including the APLID to the BS, and notifies the BS selected as the sub route what kind of application is used to select the BS as the route.

The BS that has received the message 207 from the AGW transmits a message 208 to the MS.

The BS that has received the message 208 from the BS newly selected as the sub route knows the BS newly selected as the sub route from the new sub BSID within the message 208.

The MS that has received the message 208 saves the new sub BSID within the message 208 in the memory unit.

Figure 28A:
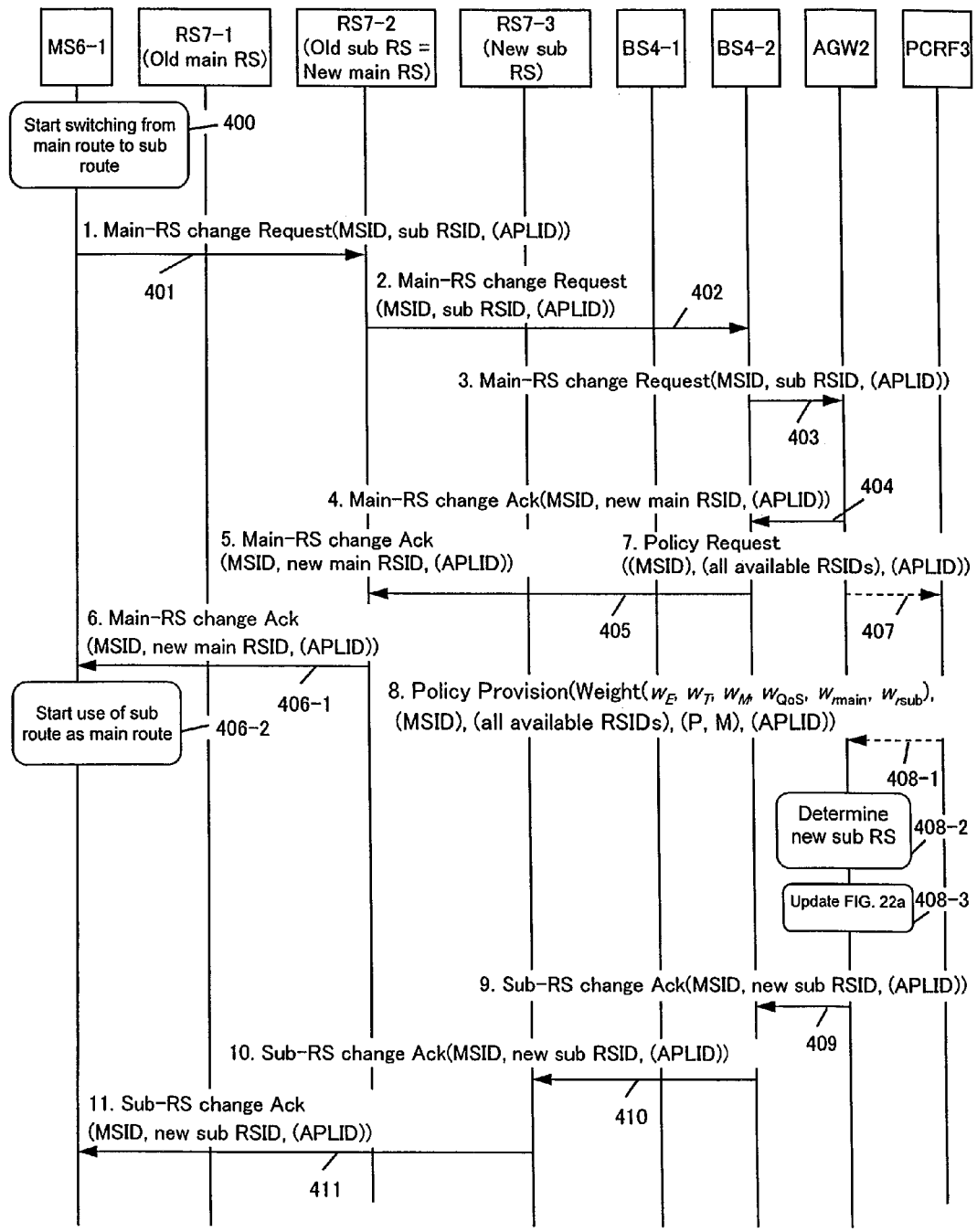
FIG. 28a illustrates an example of a call flow of switching from the main route to the sub route in the case of the relay system.

A call flow of switching from the main route to the sub route when the main route and the sub route in the radio system are set in the base station according to this embodiment is identical with a case in which the RS of FIG. 28a is omitted, and the route selection process of the AGW is conducted by the BS.

Figure 28B:
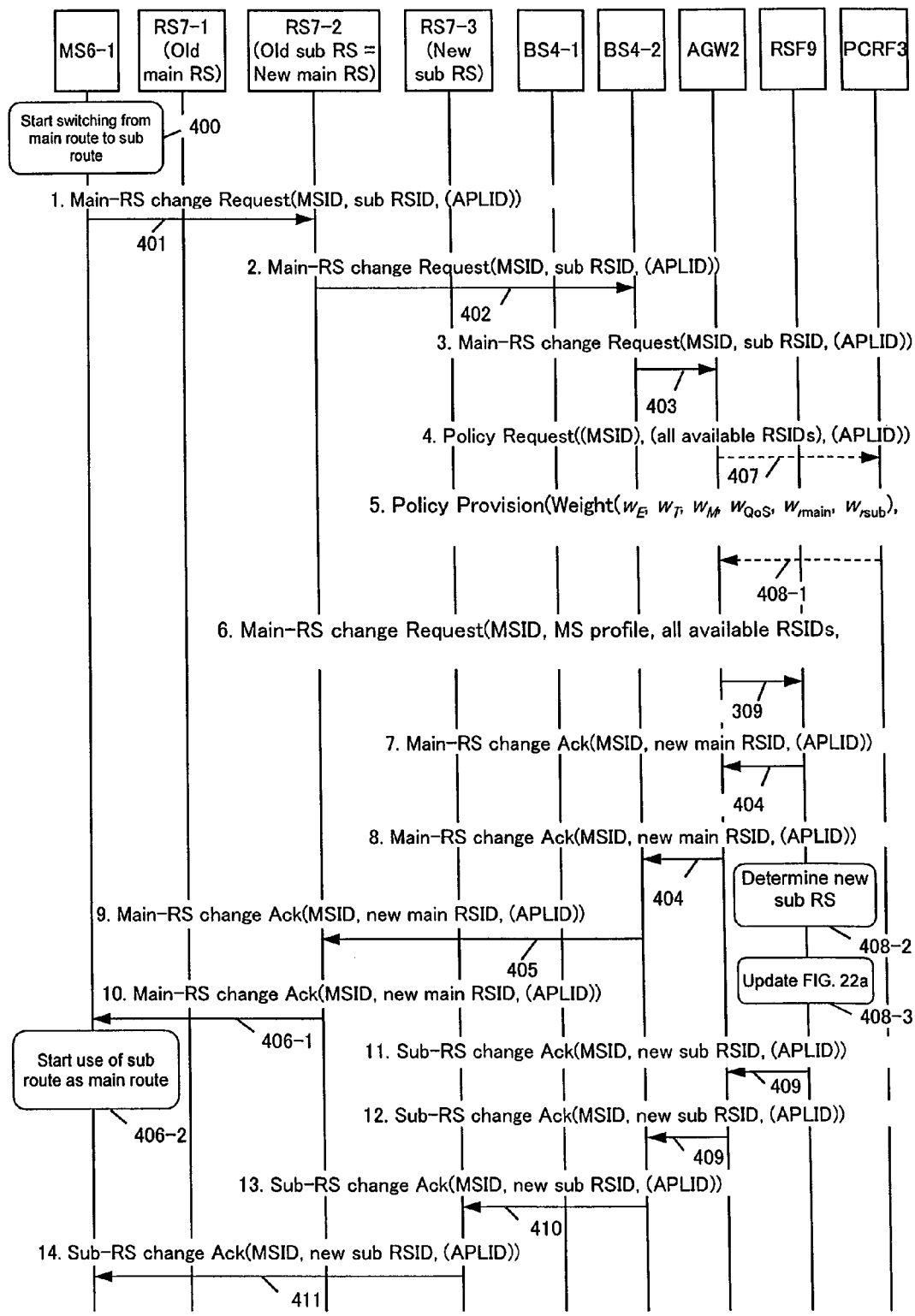
FIG. 28b illustrates an example of a call flow of switching from the main route to the sub route in the case of the relay system.

A call flow of switching from the main route to the sub route when the main route and the sub route in the radio system are set in the external device RSF according to this embodiment is identical with a case in which the RS of FIG. 28b is omitted, and the MS and the BS communicate directly with each other.

Figure 28C:
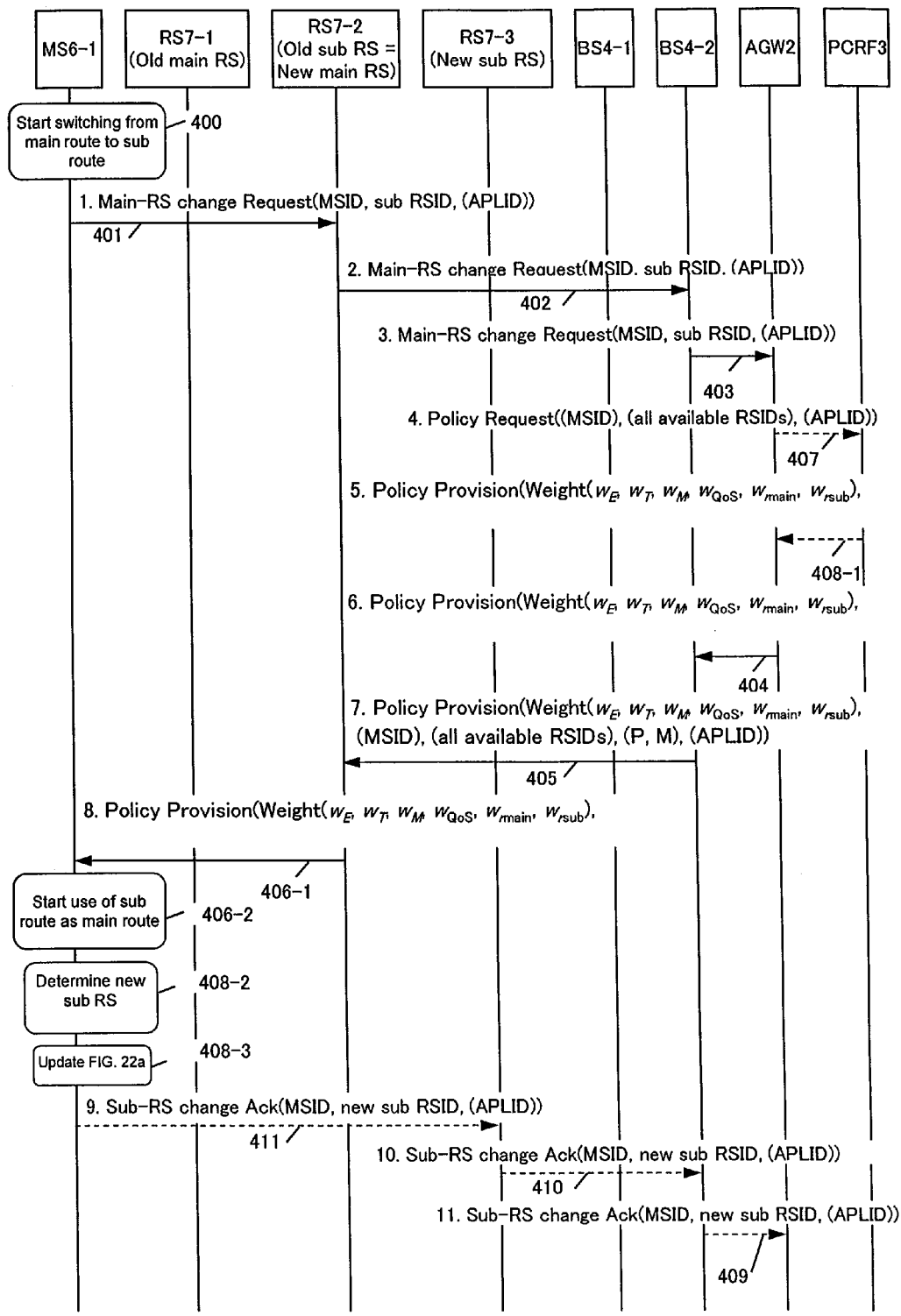
FIG. 28c illustrates an example of a call flow of switching from the main route to the sub route in the case of the relay system.

A call flow of switching from the main route to the sub route when the main route and the sub route in the radio system are set in the mobile station according to this embodiment is identical with a case in which the RS of FIG. 28c is omitted, and the MS and the BS communicate directly with each other.

2-4. AGW 2-4-1. Hardware

[One Example of AGW According to this Embodiment]

Figure 4A:
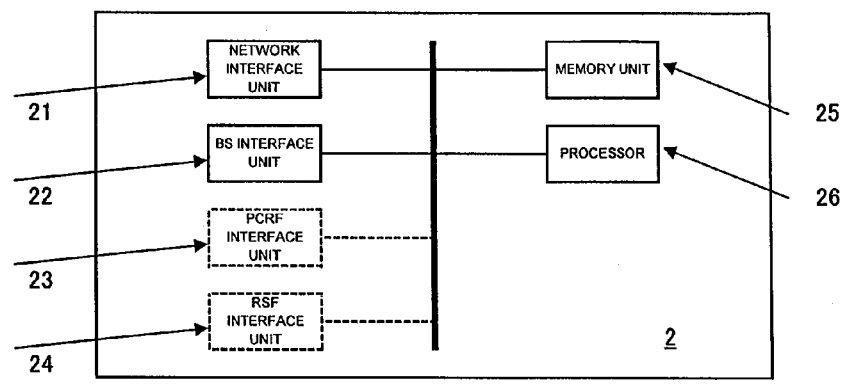
FIG. 4a illustrates an example of a block diagram of a gateway.

FIG. 4a illustrates an example of a functional block diagram of the AGW used in this embodiment.

A network interface unit 21 is an interface with the network. The network interface unit 21 allows the AGW to transmit and receive an IP packet with respect to the IP network.

A BS interface unit 22 is an interface with the BS. The BS interface unit 22 allows the AGW to transmit and receive the IP packet with respect to the BS.

A PCRF interface unit 23 is an interface with the PCRF. The PCRF interface unit 23 allows the AGW to transmit and receive the IP packet with respect to the PCRF. In the case of architecture in which the policy information is set within the AGW, and the PCRF is omitted, the PCRF interface unit 23 can be omitted.

An RSF interface unit 24 is an interface with the RSF. The RSF interface unit 24 allows the AGW to transmit and receive the IP packet with respect to the RSF. In the case of architecture in which the main route and the sub route are selected by a node other than the RSF, the RSF interface unit 24 can be omitted.

A memory unit 25 manages information on an IP packet to be transmitted or received, BS profile ($r_{BSMax}$), MS profile ($r_{MS}$), QoS parameters (E, T, M, P), APLID, weight ($w_E$, $w_T$, $w_M$, $w_{QoS}$, $w_{rmain}$, $w_{rsub}$), and addresses of the PCRF 3 and the BS 4 to be connected in association with the MSID and the BSID selected as the main route and the sub route as the occasion demands.

A processor 26 conducts management of the information held in the memory unit 25, IP packet transmission and reception processing such as creation and analysis of the IP packet, and calculation based on an expression given in selecting the main route and the sub route. In the case of architecture in which the main route and the sub route are selected by a device other than the gateway, a processing function related to the selection of the main route and the sub route can be omitted.

[One Example of Information Held in Memory Unit of AGW According to this Embodiment]

FIG. 5*a* illustrates an example of the information held in the memory unit of the AGW according to this embodiment.

T11*a* (main BSID) is an identifier of the BS.

T12*a* (MSID) is an identifier of the MS that has already selected the BS having the BSID of the T11*a* as the main route.

T13*a* (sub BSID) is an identifier of the BS that has been already selected by the MS having the MSID of the T12*a* as the sub route. When the MS having the MSID of the T12*a* has no sub route, this column is blank.

T14*a* ($r_{MS}$) is an index of a radio resource amount requested by the MS having the MSID of the T12*a*. The T14*a* is notified the AGW of as information within the MS profile when the MS of the T12*a* sets the main route and the sub route, and the AGW saves the information in the memory unit.

T15*a* ($\Sigma r_{MSmain}$) is a total of the indexes of the radio resource amount requested by the MSs with respect to all of the MSs that have already selected the BS having the BSID of the T11*a* as the main route. The T15*a* is created by adding $r_{MS}$ of the T14*a* by the processor of the AGW with respect to the MS that selects the BS having the BSID of the T11*a* as the main route, and the AGW saves the information in the memory unit. When there is no MS that has already used the BS having the BSID of the T11*a* as the main route, T15*a* becomes 0.

T16*a* ($r_{BSmax}$) is an index of an upper limit of the radio resource amount that is acceptable by the BS having the BSID of the T11*a*. The T16*a* is notified the AGW of as information within the BS profile when the MS of the T12*a* sets the main route and the sub route, and the AGW saves the information in the memory unit. The T16*a* is notified the AGW of as information within the BS profile when the MS of the T12*a* sets the main route and the sub route, and the AGW saves the information in the memory unit.

T17*a* ($R_{rmain}$) is an evaluation index as the main route based on a residual radio resource amount of the BS having the BSID of the T11*a*. The T17*a* is calculated according to a ratio of the T16*a* to the T15*a*, and the AGW saves the information in the memory unit. This shows that the larger a value of T17*a* is, the more room the residual radio resource amount of the BS has.

FIG. 8 illustrates an example of the information held by the memory unit of the AGW according to this embodiment.

T41 (MSID) is an identifier of the MS.

T42 (BSID) is a BSID of the BS communicatable with the MS having the MSID of the T41. The T42 is notified the AGW of when the MS having the MSID of the T41 sets the main route and the sub route, and the AGW saves the information in the memory unit.

T43 (E) is an effective data transfer rate between the MS and the BS. The T43 is received by the AGW when the MS having the MSID of the T41 sets the main route and the sub route, or when the BS notifies the AGW of the BS profile, and the AGW saves the information in the memory unit.

T44 (T) is a residual communicatable time of the BS. The T44 is notified the AGW of as information within the BS profile when the MS having the MSID of the T41 sets the main route and the sub route, and the AGW saves the information in the memory unit. The T44 can be omitted when the communicatable time is not set for the BS.

T45 (M) is a mobility of the BS, and a value indicative of modes of the BS such that the BS is fixed, nomadic, portable, or mobile. The T45 is notified the AGW of as information within the BS profile when the MS having the MSID of the T41 sets the main route and the sub route, distributed as the policy information from the PCRF, or included in the policy information set within the AGW, and the AGW saves the information in the memory unit. If the mode of the BS is uniquely determined, the T45 may be omitted.

T46 (P) is a priority of the BS. If the priority of the BS possessed by, for example, police or fire is set to be low, the BS can be prevented from being used as a data route of a third party. Also, for example, when a high priority is set for a given BS, incentive can be given so that the BS becomes the data route of the third party. The T46 is notified the AGW of as information within the BS profile when the MS having the MSID of the T41 sets the main route and the sub route, distributed as the policy information from the PCRF, or included in the policy information set within the AGW, and the AGW saves the information in the memory unit. If the quality is not taken into account for selection of the main route and the sub route, FIG. 8 can be omitted.

FIG. 9 illustrates an example of the information held by the memory unit of the AGW according to this embodiment.

T51 (MSID) is an identifier of the MS. When T53 ($w_E$), T54 ($w_T$), and T55 ($w_M$) which are parameters of the weight are not changed depending on the MS, the T51 can be omitted.

T52 (APLID) is an identifier of an application to be executed by the route. When the T53 ($w_E$), the T54 ($w_T$), and the T55 ($w_M$) which are parameters of the weight are not changed depending on the type of the application, the T52 can be omitted.

T53 ($w_E$) is a parameter of the weight for the effective data transfer rate E between the MS and the BS.

T54 ($w_T$) is a parameter of the weight for a communicatable time T of the BS.

T55 ($w_M$) is a parameter of the weight for the mobility M of the BS.

The T53, the T54, and the T55 are distributed as the policy information from the PCRF when the MS having the MSID of the T51 sets the main route and the sub route, or included in the policy information set within the AGW, and the AGW saves the information in the memory unit.

FIG. 10 illustrates an example of the information held by the memory unit of the AGW according to this embodiment.

T61 (MSID) is an identifier of the MS. If T63 ($w_{QoS}$), T64 ($w_{rmain}$), and T65 ($w_{rsub}$) which are parameters of the weight are not changed depending on the MS, the T61 can be omitted.

T62 (APLID) is an identifier of an application to be executed by the route. If T63 ($w_{QoS}$), T64 ($w_{rmain}$), and T65 ($w_{rsub}$) which are parameters of the weight are not changed depending on the type of the application, the T62 can be omitted.

T63 ($w_{QoS}$) is a parameter of the weight for an evaluation index $R_{QoS}$ of the route based on the quality.

T64 ($w_{rmain}$) is a parameter of the weight for an evaluation index $R_{rmain}$ of the main route based on the residual radio resource amount of the base station.

T65 ($w_{rsub}$) is a parameter of the weight for an evaluation index $R_{rsub}$ of the sub route based on the residual radio resource amount of the base station.

The T63, the T64, and the T65 are distributed as the policy information from the PCRF when the MS having the MSID of the T61 sets the main route and the sub route, or included in the policy information set within the AGW, and the AGW saves the information in the memory unit.

When the main route and the sub route are set by a device other than the gateway, the information on FIGS. 5a, 8, 9, and 10 is omitted.

2-4-2. Setting of Main Route and Sub Route

[One Example of Processing of AGW According to this Embodiment]

Figure 19A:
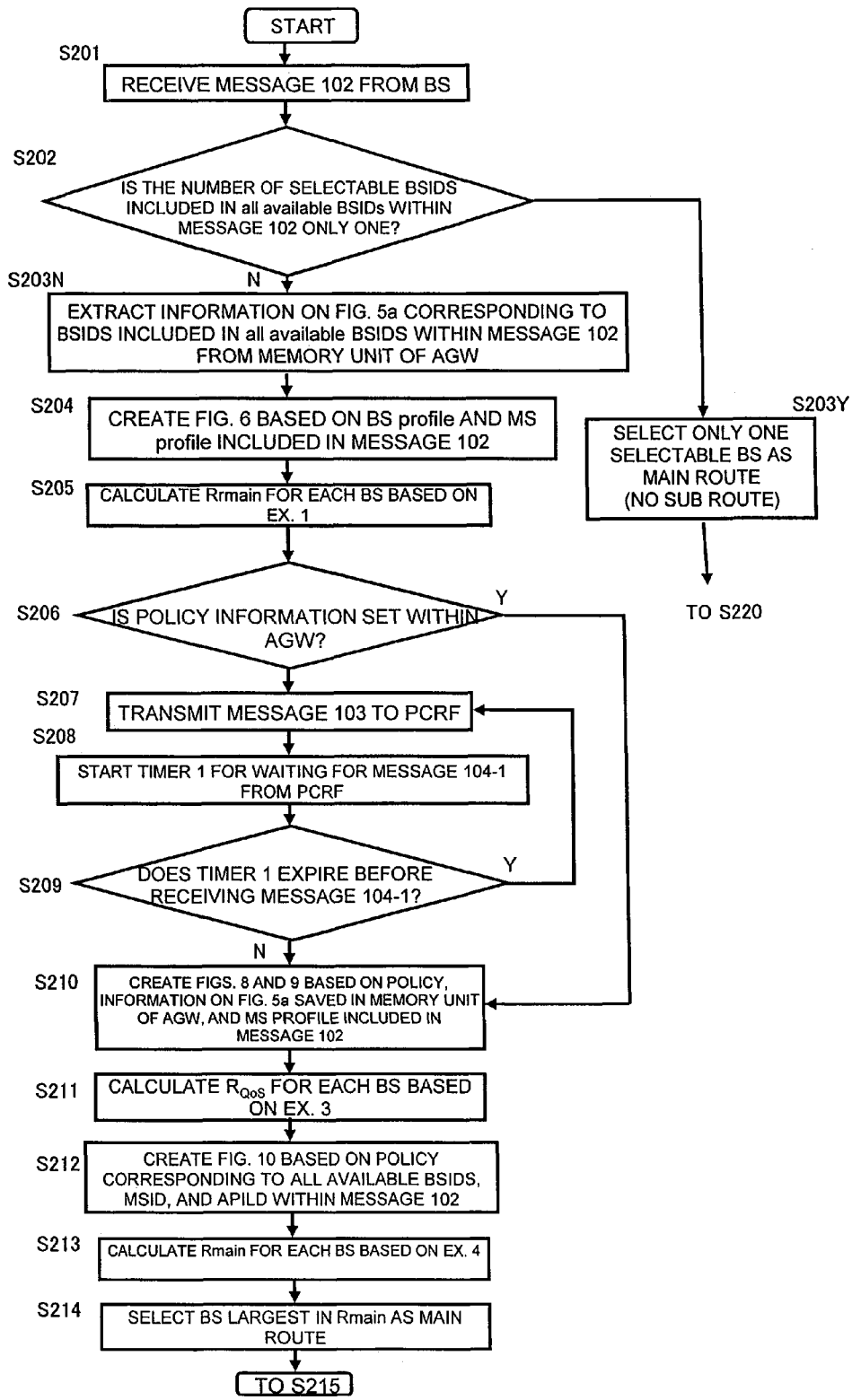
FIG. 19a illustrates an example of processing conducted by the gateway in setting the main route and the sub route.
Figure 19A:
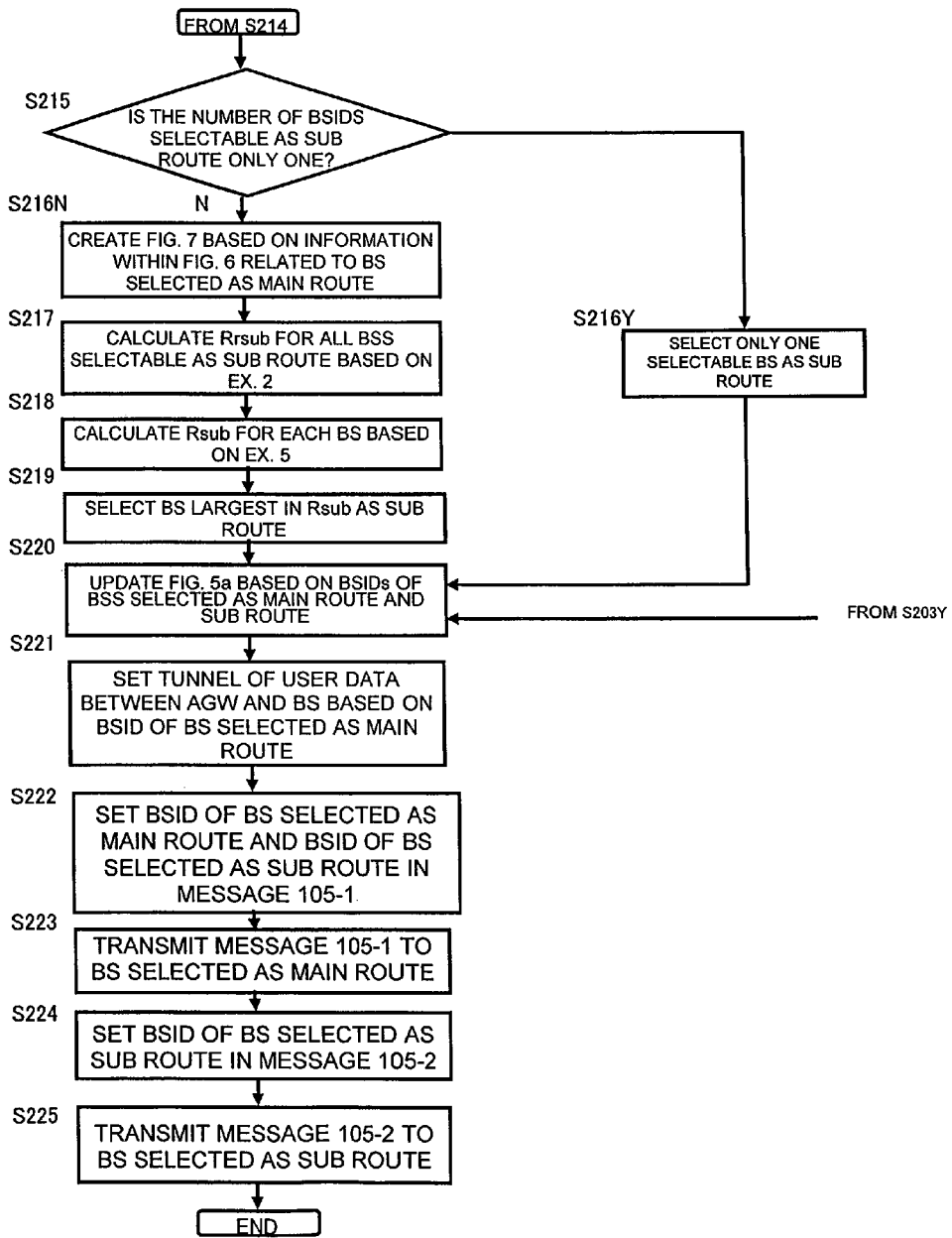

FIG. 19a illustrates an example of processing of the AGW in setting the main route and the sub route.

In S201, the AGW receives the message 102 from the BS.

In S202, the AGW confirms the number of BSIDs selectable as the route included in all available BSIDs within the message 102.

If the number of BSIDs selectable as the route is one, in S203Y, the AGW selects only one selectable BS as the main route, selects no sub route, and is advanced to S220.

On the other hand, if the number of BSIDs selectable as the route is two or more, in S203N, the AGW extracts information on the BS corresponding to the BSID selectable as the route included in all available BSIDs within the message 102 from FIG. 5a saved in the memory unit. If there is no information on the corresponding BS within FIG. 5a, the AGW requests the BS that has transmitted the message 102 to transmit its own BS profile.

In S204, the AGW creates FIG. 6 on the basis of the information included in the BS profile of the BS extracted from the memory unit, and the information included in the MS profile within the message 102.

T21 (main BSID) is a BSID of the BS selectable as the main route, and included in all available BSIDs within the message 102.

T22 (MSID) is an MSID of the MS that has already used the BS having the BSID of the T21 as the main route, and included in the information on the BS which is extracted by the AGW from FIG. 5a saved in the memory unit of the AGW. If there is no MS that has already used the BS having the BSID of the T21 as the main route, the T22 is blank.

T23 (sub BSID) is a BSID of the BS selected as the sub route by the MS having the MSID of the T22, and included in the information on the BS extracted from the memory unit. If the MS having the MSID of the T22 has no sub route as with the MS 6-11, the T23 is blank.

T24 ($r_{MS}$) is an index of the radio resource amount requested by the MS having the MSID of the T22, and included in the information on the BS which is extracted by the AGW from FIG. 5a saved in the memory unit of the AGW.

T25 ($\Sigma r_{MSmain}$) is a total of the indexes of the radio resource amount requested by the MSs with respect to all of the MSs that have already selected the BS having the BSID of the T21 as the main route, and included in the information on the BS which is extracted by the AGW from FIG. 5a saved in the memory unit of the AGW.

T26 ($r_{BSmax}$) is an index of an upper limit of the radio resource amount that is acceptable by the BS having the BSID of the T21, and created by the AGW on the basis of the information on the BS which is extracted by the AGW from FIG. 5a saved in the memory unit of the AGW.

T27 ($R_{rmain}$) is an evaluation index as the main route based on the residual radio resource amount of the BS having the BSID of the T21. The T27 is calculated on the basis of Expression 1 in S205, by the aid of T25, T26, and T28 ($r_{MSnew}$), and the AGW saves the information in the memory unit. This shows that the larger a value of T27 is, the more room the residual radio resource amount of the BS has.

T28 ($r_{MSnew}$) is an index of the radio resource amount requested by the MS that requests the route setting, and included in the MS profile within the message 102.

In S205, the AGW assigns values in FIG. 6 to the respective parameters of Expression 1, and calculates the evaluation index $(R_{rmain})_n$ of the main route based on the residual resource amount of the BS with respect to all of the BSs having the BSID of the T21 in FIG. 6. The AGW may store the calculated values in FIG. 6 as the occasion demands.

$$(R_{rmain})_n = (r_{BSmax})_n / \{(\Sigma r_{MSmain})_n + r_{MSnew}\} \quad \text{(Ex. 1)}$$

In Expression 1, n is an index of the route.

$(R_{rmain})_n$ is an evaluation of the main route based on the residual resources of the BS, and shows that the larger the value is, the more room the residual resource of the BS has.

$(r_{BSmax})_n$ is an index of an upper limit of the radio resource amount acceptable by the BS, and depends on the performance of the BS per se. $r_{MSnew}$ is an index of the radio resource amount requested by the MS that requests the route setting.

$(\Sigma r_{MSmain})_n$ represents a total of the indexes of the radio resource amount requested by the MS with respect to all of the MSs that have already used the BS as the main route. Also, as the information in the memory unit of the AGW, a lower limit of $(R_{rmain})_n$ can be set.

If the lower limit of $(R_{rmain})_n$ is set for the AGW, the AGW can exclude the routes whose $(R_{rmain})_n$ is lower than the lower limit from the routes to be selected, or request a change in the sub route or the main route from the MS that has already selected the BS as the main route or the sub route.

If the quality is also taken into account for selection of the main route, in S206, the AGW determines whether Policy corresponding to the BS is set in the memory unit, or not. If the Policy corresponding to the BS is not set in the memory unit of the AGW, in Step S207, the AGW transmits the message 103 to the PCRF, and requests the PCRF to transmit the Policy of the BS.

In S208, the AGW starts a timer 1, and waits until the message 104-1 including the Policy of the BS is transmitted from the PCRF.

In S209, if the timer 1 expires before the AGW receives the message 104-1 from the PCRF, the AGW again returns to S207, and retransmits the message 103 to the PCRF.

If the AGW receives the message 104-1 from the PCRF before the timer 1 expires, the AGW creates FIGS. 8 and 9 on the basis of the Policy of the BS included within the message 104-1, the information included in the BS profile of the BS which is extracted from the memory unit, and the information included in the MS profile within the message 102.

On the other hand, if the Policy corresponding to the BS is set within the memory unit of the AGW, S207 to S209 are omitted. In S210, the AGW creates FIGS. 8 and 9 on the basis of the Policy of the BS extracted from the memory unit, the information included in the BS profile of the BS which is extracted from the memory unit, and the information included in the MS profile within the message 102. If FIGS. 8 and 9 have been already saved in the memory of the AGW, S210 can be omitted.

Also, if the quality is not taken into account for selection of the main route, S206 to S214 are omitted, and the BS whose $(R_{rmain})_n$ is the largest may be selected as the main route.

In S211, the AGW assigns values in FIGS. 8 and 9 to the respective parameters of Expression 3, and calculates the evaluation index $(R_{QoS})_n$ of the route based on the quality with respect to all of the BSs having the BSID of the T21 in FIG. 6.

$$(R_{QoS})_n = P_n(w_E E_n + w_T T_n + w_M M_n) \quad (Ex.\ 3)$$

In Expression 3, n is an index of the route.

$(R_{QoS})_n$ is an evaluation based on the quality of the route, and shows that the quality of the route is higher as the value is larger.

$P_n$ represents the policy information (weight related to the use of the BS) indicative of the priority by which the BS is selected as the data route, and the priority can be made higher by making the value larger.

$E_n$ represents an effective data transfer rate between the MS and the BS. The $E_n$ depends on the radio signal reception intensity of the MS or the like.

$T_n$ is a communicatable time of the BS. The $T_n$ depends on a battery charge of the BS or service contract detail of the BS or the like.

$M_n$ is the mobility of the BS. The $M_n$ depends on whether the BS is fixed or movable or the like.

$w_E$ is a parameter of the weight for the $E_n$.
$w_T$ is a parameter of the weight for the $T_n$.
$w_M$ is a parameter of the weight for the $M_n$.

Also, the $T_n$ can be omitted if the communicatable time is not set in the BS, and the $M_n$ can be omitted if the BS is not movable.

In S212, the AGW creates FIG. 10 on the basis of the Policy of the BS extracted from the memory unit. If FIG. 10 has been already saved in the memory unit of the AGW, S212 can be omitted.

In S213, the AGW assigns values of FIGS. 5a, 8, and 10 to the respective parameters of Expression 4, and calculates an overall evaluation index $(R_{main})_n$ of the main route based on the residual resource amount of the BS and the quality of the route with respect to all of the BSs having the BSID of the T21 in FIG. 6. The AGW may store the calculated values in FIG. 6 as the occasion demands.

$$(R_{main})_n = (P_{main})_n (w_{QoS}(R_{QoS})_n + w_{rmain}(R_{rmain})_n) \quad (4)$$

In Expression 4, n is an index of the route.

$(R_{main})_n$ is an overall evaluation of the main route based on the quality of the route and the residual resource amount of the BS.

$(P_{main})_n$ is the policy information (weight related to the use of the BS) indicative of the priority by which the BS is selected as the main route, and the priority can be made higher by making the value larger.

$(R_{QoS})_n$ is an evaluation of the route based on the quality of the route, and shows that the quality of the route is higher as the value is larger.

$(R_{rmain})_n$ is an evaluation of the main route based on the residual resource of the BS, and shows that the larger the value is, the more room the residual resource of the BS has.

$w_{QoS}$ is a parameter of the weight for $(R_{QoS})_n$.
$w_{rmain}$ is a parameter of the weight for $(R_{rmain})_n$.

In S214, the AGW selects the BS whose overall evaluation index $(R_{main})_n$ of the main route calculated in S213 is the largest as the main route.

Also, as the information in the memory unit of the AGW, a lower limit of the evaluation index $(R_{rmain})_n$ of the main route based on the residual resource index of the BS can be set. When the lower limit of $(R_{rmain})_n$ is set in the AGW, if $(R_{rmain})_n$ of the BS selected as the main route is lower than the lower limit, the AGW can refuse the setting of the main route, or request a change in the sub route or the main route from the MS that has already selected the BS as the sub route or the main route.

In S215, the AGW confirms the number of BSs as the residual sub route candidates obtained by excluding the BS selected as the main route from the BSs having the BSID of the T21 in FIG. 6. When the number of BSIDs selectable as the sub route is one, in S216Y, the AGW selects only one selectable BS as the sub route, and is advanced to S220.

On the other hand, if the number of BSIDs selectable as the sub route is two or more, in S216N, the AGW extracts information on the BS selected as the main route from FIG. 6, and creates FIG. 7 on the basis of the extracted information of the BS, and the information included in the MS profile within the message 102. FIG. 7 illustrates an example in which the BS 4-1 is selected as the main route.

T31 (main BSID) is a BSID selected as the main route.

T32 (sub BSID) is an BSID of the BS selectable as the sub route, and created by the AGW with reference to all of the BSIDs except for the BS selected as the main route in S214 among the BSIDs of the BSs selectable as the main route in the T21 of FIG. 6.

T33 ($\Sigma r_{MSmain}$) is a total of the indexes of the radio resource amount requested by the MSs with respect to all of the MSs that have already selected the BS having the BSID of the T31 as the main route. When there is no MS that has already selected the BS having the BSID of the T31 as the main route, T33 becomes 0.

T34 ($\Sigma r_{MSsub}$) is a total of indexes of the radio resource amount requested by the MS with respect to all of the MSs that have already selected the BS having the BSID of the T31 as the main route, and already selected the BS having the BSID of the T32 as the sub route. The T34 is created by adding $r_{MS}$ of T14 in FIG. 5a by the processor of the AGW with respect to the MSs that have selected the BS having the BSID of the T31 as the main route, and already selected the BS having the BSID of the T32 as the sub route. If there is no MS that has already selected the BS having the BSID of the T31 as the main route, and already selected the BS having the BSID of the T32 as the sub route, the T34 becomes 0.

T35 ($r_{Bsmax}$) is an index of an upper limit of the radio resource amount acceptable by the BS having the BSID of the T32.

T36 ($R_{rsub}$) is an evaluation index as the sub route based on the residual radio resource amount of the BS having the BSID of the T32. The T36 is calculated on the basis of Expression 2 in S217, by the aid of the T33, T34, T35, and T37 ($r_{MSnew}$) and the AGW saves the information in the memory unit. This shows that the larger the value of the T36 is, the more room the residual resource amount of the BS has.

T37 ($r_{MSnew}$) is an index of the radio resource amount requested by the MS that has requested the route setting, and included in the MS profile within the message 102.

In S217, the AGW assigns values of FIG. 7 to the respective parameters of Expression 2, and calculates an evaluation index $(R_{rsub})_n$ of the sub route based on the residual resource amount of the BS with respect to all of the BSs having the BSID of the T32 in FIG. 7. The AGW may store the calculated values in FIG. 7 as the occasion demands.

$$(R_{rsub})_n=(r_{BSmax})_n/\{(\Sigma r_{MSmain})_n+(\Sigma r_{MSsub})_n+r_{MSnew}\} \quad \text{(Ex. 2)}$$

In Expression 2, n is an index of the route.

$(R_{rsub})_n$ is an evaluation of the sub route based on the residual resource of the BS, and shows that the larger the value is, the more room the residual resource of the BS has when the BS of the main route is unavailable.

$(r_{BSmax})_n$ is an index of the upper limit of the radio resource amount acceptable by the BS, and depends on the performance of the BS per se. $r_{MSnew}$ is an index of the radio resource amount requested by the MS that has requested the route setting.

$(\Sigma r_{MSmain})_n$ is a total of the indexes of the radio resource amount requested by the MSs with respect to all of the MSs that have already used the BS as the main route.

$(\Sigma r_{MSsub})_n$ is a total of the indexes of the radio resource amount requested by the MSs with respect to all of the MSs that have already used the BS as the main route selected as the main route by the MS that has made a route setting request, and also already selected the BS as the sub route.

Also, as the information in the memory unit of the AGW, a lower limit of $(R_{rsub})_n$ can be set. If the lower limit of $(R_{rsub})_n$ is set for the AGW, the AGW can exclude the routes whose $(R_{rsub})_n$ is lower than the lower limit from the routes to be selected, or request a change in the sub route or the main route from the MS that has already selected the BS as the main route or the sub route.

When the quality is taken into account for selection of the sub route, in S218, the AGW assigns the calculation results of S211 and S217 and the values of FIG. 10 to the respective parameters of Expression 5, and calculates the overall evaluation index $(R_{sub})_n$ of the sub route based on the residual resource amount of the BS and the quality of the route with respect to all of the BSs having the BSID of the T32 in FIG. 7. The AGW may store the calculated values in FIG. 7 as the occasion demands.

$$(R_{sub})_n=(P_{sub})_n(w_{QoS}(R_{QoS})_n+w_{rsub}(R_{rsub})_n) \quad \text{(Ex. 5)}$$

In Expression 5, n is an index of the route.

$(R_{sub})_n$ is an overall evaluation of the sub route based on the quality of the route and the residual resource amount of the BS.

$(P_{sub})_n$ is the policy information (weight related to the use of the BS) indicative of the priority by which the BS is selected as the sub route, and the priority can be made higher by making the value larger.

$(R_{QoS})_n$ is an evaluation of the route based on the quality of the route, and shows that the quality of the route is higher as the value is larger.

$(R_{rsub})_n$ is an evaluation of the main route based on the residual resource of the BS, and shows that the larger the value is, the more room the residual resource of the BS has.

$w_{QoS}$ is a parameter of the weight for $(R_{QoS})_n$.
$w_{rsub}$ is a parameter of the weight for $(R_{rsub})_n$.

When the quality is not taken into account for selection of the sub route, S218 to S219 are omitted, and the BS whose $(R_{rsub})_n$ is the largest may be selected as the sub route.

In S219, the AGW selects the BS whose overall evaluation index $(R_{sub})_n$ calculated in S218 is the largest as the sub route.

Also, as the information in the memory unit of the AGW, a lower limit of the evaluation index $(R_{rsub})_n$ of the sub route based on the residual resource index of the BS can be set. When the lower limit of $(R_{rsub})_n$ is set in the AGW, if $(R_{rsub})_n$ of the BS selected as the sub route is lower than the lower limit, the AGW can refuse the setting of the sub route, or request a change in the sub route or the main route from the MS that has already selected the BS as the sub route or the main route.

In S220, the AGW updates FIG. 5a on the basis of the BSIDs of the BSs selected as the main route and the sub route. Updated FIG. 5a is illustrated, for example, in FIG. 5b.

In S221, the AGW sets a tunnel of user data between the AGW and the BS selected as the main route.

In S222, the AGW sets the BSID of the BS selected as the main route and the BSID of the BS selected as the sub route in the message 105-1.

In S223, the AGW transmits the message 105-1 to the BS selected as the main route.

In S224, the AGW sets the BSID of the BS selected as the sub route in the message 105-2.

In S225, the AGW transmits the message 105-2 to the BS selected as the sub route.

When the main route and the sub route are set by a node other than the gateway, processing related to the route selection is omitted.

2-4-3. Switching from Main Route to Sub Route

Figure 29A:
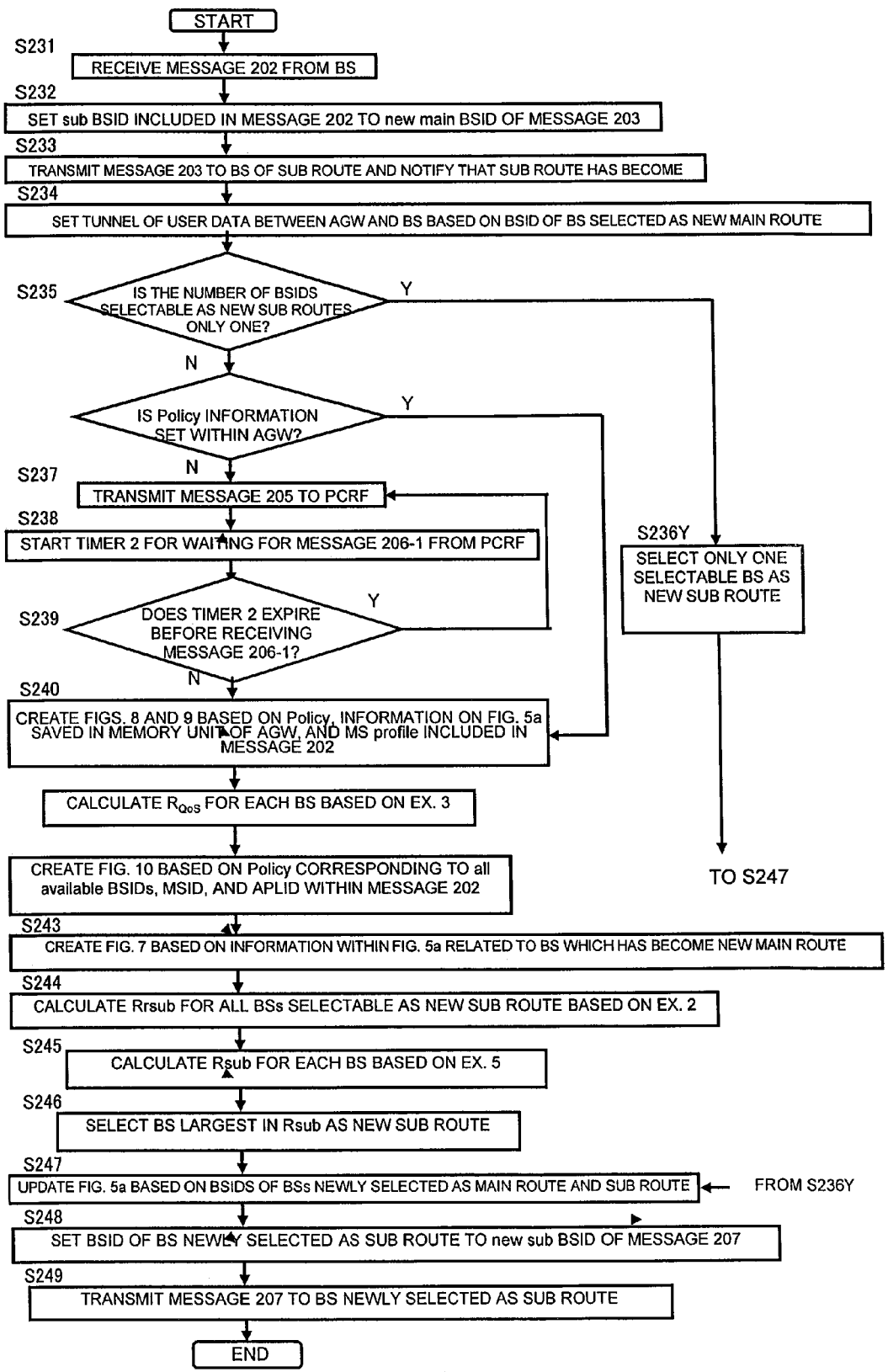
FIG. 29a illustrates an example of processing conducted by the gateway in switching from the main route to the sub route.

FIG. 29a illustrates an example of processing of the AGW in switching from the main route to the sub route.

In S231, the AGW receives the message 202 from the BS. The AGW that has received the message 202 from the BS knows that the MS requests switching from the main route to the sub route, from the MSID and the sub BSID included in the message 202.

In S232, the AGW sets a value of the sub BSID to the new main BSID included in the message 203 as it is.

In S233, the AGW transmits the message 203 to the BS corresponding to the sub BSID included in the message 202.

In S234, the AGW sets the data route to the BS corresponding to the sub BSID included in the message 202.

In S235, the AGW confirms the number of BSs that are candidates for a new sub route with respect to the MS having the MSID included in the message 202 on the basis of FIG. 5a. If the number of BSIDs selectable as the new sub route is one, in S236Y, the AGW selects only one selectable BS as the sub route, and is advanced to S247.

On the other hand, if the number of BSIDs selectable as the new sub route is two or more, the AGW is advanced to S236N.

When the quality is also taken into account for selection of the new sub route, in S236N, the AGW determines whether the Policy corresponding to the BS is set in the memory unit, or not.

If the Policy corresponding to the BS is not set within the memory unit of the AGW, in S237, the AGW transmits the message 205 to the PCRF, and requests the PCRF to transmit the Policy of the BS.

On the other hand, if the Policy corresponding to the BS is set within the memory unit of the AGW, S237 to S239 are omitted, and the AGW creates FIGS. 8 and 9 on the basis of the Policy of the BS extracted from the memory unit, the information included in the BS profile of the BS extracted from the memory unit, and the information included in the MS profile within the message 202. When FIGS. 8 and 9 have been already saved in the memory of the AGW, S240 can be omitted.

Also, if the quality is not taken into account for selection of the main route, S236 to S242 are omitted, and the BS whose $(R_{rsub})_n$ is the largest may be selected as a new sub route.

In S238, the AGW starts a timer 2, and waits until the message 206-1 including the Policy of the BS is transmitted from the PCRF.

In S239, if the timer 2 expires before the AGW receives the message 206-1 from the PCRF, the AGW again returns to S237, and retransmits the message 205 to the PCRF.

In S240, if the AGW receives the message 206-1 from the PCRF before the timer 2 expires, the AGW creates FIGS. 8 and 9 on the basis of the Policy of the BS included within the message 206-1, the information included in the BS profile of the BS which is extracted from the memory unit, and the information included in the MS profile within the message 202.

In S241, the AGW assigns values of FIGS. 8 and 9 to the respective parameters of Expression 3, and calculates the evaluation index $(R_{QoS})_n$ of the route based on the quality with respect to all of the BSs having the BSID of the T21 in FIG. 6.

$$(R_{QoS})_n = P_n(w_E E_n + w_T T_n + w_M M_n) \quad \text{(Ex. 3)}$$

In Expression 3, n is an index of the route.

$(R_{QoS})_n$ is an evaluation based on the quality of the route, and shows that the quality of the route is higher as the value is larger.

$P_n$ represents the policy information (weight related to the use of the BS) indicative of the priority by which the BS is selected as the data route, and the priority can be made higher by making the value larger.

$E_n$ represents an effective data transfer rate between the MS and the BS. The $E_n$ depends on the radio signal reception intensity of the MS or the like.

$T_n$ is a communicatable time of the BS. The $T_n$ depends on a battery charge of the BS or service contract detail of the BS or the like.

$M_n$ is the mobility of the BS. The $M_n$ depends on whether the BS is fixed or movable or the like.

$w_E$ is a parameter of the weight for the $E_n$.

$w_T$ is a parameter of the weight for the $T_n$.

$w_M$ is a parameter of the weight for the $M_n$.

Also, the $T_n$ can be omitted if the communicatable time is not set in the BS, and the $M_n$ can be omitted if the BS is not movable.

In S242, the AGW creates FIG. 10 on the basis of the Policy of the BS extracted from the memory unit. If FIG. 10 has been already saved in the memory unit of the AGW, S242 can be omitted.

In S243, the AGW extracts the information on the BS newly selected as the main route from FIG. 5a, and creates FIG. 7 on the basis of the extracted information on the BS and the information included in the MS profile within the message 202. In this example, the BS 4-2 is selected as the new main route whereas FIG. 7 illustrates an example in which the BS 4-1 is selected as the main route, which is different from each other.

T31 (main BSID) is the BSID selected as the main route.

T32 (sub BSID) is the BSID of the BS selectable as the sub route, and created by the AGW with reference to all of the BSIDs except for the BS selected as the main route in S214 among the BSIDs of the BSs selectable as the main route in the T21 of FIG. 6.

T33 $(\Sigma r_{MSmain})$ is a total of the indexes of the radio resource amount requested by the MSs with respect to all of the MSs that have already selected the BS having the BSID of the T31 as the main route. When there is no MS that has already selected the BS having the BSID of the T31 as the main route, T33 becomes 0.

T34 $(\Sigma r_{MSsub})$ is a total of indexes of the radio resource amount requested by the MS with respect to all of the MSs that have already selected the BS having the BSID of the T31 as the main route, and already selected the BS having the BSID of the T32 as the sub route. The T34 is created by adding $r_{MS}$ of T14 in FIG. 5a by the processor of the AGW with respect to the MSs that have selected the BS having the BSID of the T31 as the main route, and already selected the BS having the BSID of the T32 as the sub route. If there is no MS that has already selected the BS having the BSID of the T31 as the main route, and already selected the BS having the BSID of the T32 as the sub route, the T34 becomes 0.

T35 $(r_{BSmax})$ is an index of an upper limit of the radio resource amount acceptable by the BS having the BSID of the T32.

T36 $(R_{rsub})$ is an evaluation index as the sub route based on the residual radio resource amount of the BS having the BSID of the T32. The T36 is calculated on the basis of Expression 2 in S244, by the aid of the T33, T34, T35, and T37 $(r_{MSnew})$, and the AGW saves the information in the memory unit. This shows that the larger the value of T36 is, the more room the residual radio resource amount of the BS has.

T37 $(r_{MSnew})$ is an index of the radio resource amount requested by the MS that has requested the route setting, and included in the MS profile within the message 202.

In S244, the AGW assigns values of FIG. 7 to the respective parameters of Expression 2, and calculates an evaluation index $(R_{rsub})_n$ of the sub route based on the residual resource amount of the BS with respect to all of the BSs having the BSID of the T32 in FIG. 7. The AGW may store the calculated values in FIG. 6 as the occasion demands.

$$(R_{rsub})_n = (r_{BSmax})_n / \{(\Sigma r_{MSmain})_n + (\Sigma r_{MSsub})_n + r_{MSnew}\} \quad \text{(Ex. 2)}$$

In Expression 2, n is an index of the route.

$(R_{rsub})_n$ is an evaluation of the sub route based on the residual resource of the BS, and shows that the larger the value is, the more room the residual resource of the BS has when the BS of the main route is unavailable.

$(r_{BSmax})_n$ is an index of the upper limit of the radio resource amount acceptable by the BS, and depends on the performance of the BS per se. $r_{MSnew}$ is an index of the radio resource amount requested by the MS that has requested the route setting.

$(\Sigma r_{MSmain})_n$ is a total of the indexes of the radio resource amount requested by the MSs with respect to all of the MSs that have already used the BS as the main route.

$(\Sigma r_{MSsub})_n$ is a total of the indexes of the radio resource amount requested by the MSs with respect to all of the MSs that have already used the BS as the main route selected as the main route by the MS that has made a route setting request, and also already selected the BS as the sub route.

Also, as the information in the memory unit of the AGW, a lower limit of $(R_{rsub})_n$ can be set. If the lower limit of $(R_{rsub})_n$ is set for the AGW, the AGW can exclude the routes whose $(R_{rsub})_n$ is lower than the lower limit from the routes to be selected, or request a change in the sub route or the main route from the MS that has already selected the BS as the main route or the sub route.

When the quality is also taken into account for selection of the sub route, in S245, the AGW assigns the values of FIG. 7 and the calculation results of S244 to the respective parameters of Expression 5, and calculates the overall evaluation index $(R_{sub})_n$ of the sub route based on the residual resource amount of the BS and the quality of the route with respect to all of the BSs having the BSID of the T32 in FIG. 7. The AGW may store the calculated values in FIG. 6 as the occasion demands.

$$(R_{sub})_n = (P_{sub})_n (w_{QoS}(R_{QoS})_n + w_{rsub}(R_{rsub})_n) \quad \text{(Ex. 5)}$$

In Expression 5, n is an index of the route.

$(R_{sub})_n$ is an overall evaluation of the main route based on the quality of the route and the residual resource amount of the BS.

$(P_{sub})_n$ is the policy information (weight related to the use of the BS) indicative of the priority by which the BS is selected as the sub route, and the priority can be made higher by making the value larger.

$(R_{QoS})_n$ is an evaluation of the route based on the quality of the route, and shows that the quality of the route is higher as the value is larger.

$(R_{rsub})_n$ is an evaluation of the main route based on the residual resource of the BS, and shows that the larger the value is, the more room the residual resource of the BS has.

$w_{QoS}$ is a parameter of the weight for $(R_{QoS})_n$.

$w_{rsub}$ is a parameter of the weight for $(R_{rsub})_n$.

When the quality is not taken into account for selection of the sub route, S245 to S246 are omitted, and the BS whose $(R_{rsub})_n$ is the largest may be selected as the sub route.

In S246, the AGW selects the BS whose overall evaluation index $(R_{sub})_n$ of the sub route calculated in S245 is the largest as the sub route.

Also, as the information in the memory unit of the AGW, a lower limit of the evaluation index $(R_{rsub})_n$ of the sub route based on the residual resource index of the BS can be set. When the lower limit of $(R_{rsub})_n$ is set in the AGW, if $(R_{rsub})_n$ of the BS selected as the sub route is lower than the lower limit, the AGW can refuse the setting of the sub route, or request a change in the sub route or the main route from the MS that has already selected the BS as the sub route or the main route.

In S247, the AGW updates FIG. 5a on the basis of the BSIDs of the BSs newly selected as the main route and the sub route. Updated FIG. 5a is illustrated, for example, in FIG. 5b. However, the example of the call flow for switching is different from the example illustrated in FIG. 5b.

In S248, the AGW sets the MSID of the MS that has requested the setting of the route and the BSID of the BS newly selected as the sub route in the message 207 as the new sub BSIDs.

In S249, the AGW transmits the message 207 to the BS newly selected as the sub route.

If the BS selected as the route is different for each application, the AGW transmits the message 207 including the APLID to the BS, and notifies the BS selected as the sub route what kind of application is used to select the BS as the route.

When the main route and the sub route are set by a device other than the gateway, processing related to the route selection is omitted.

2-5. Other Devices

[One Example of PCRF According to this Embodiment]

Figure 4B:
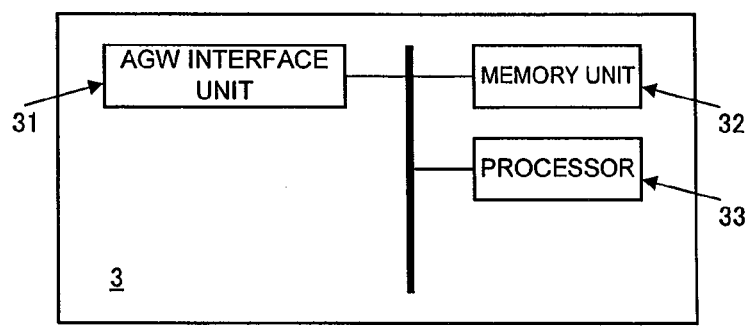
FIG. 4b illustrates an example of a block diagram of a policy management function.

FIG. 4b illustrates an example of a functional block diagram of the PCRF used in this embodiment.

An AGW interface unit 31 is an interface with the AGW. The AGW interface unit 31 allows the PCRF to transmit and receive the IP packet with respect to the AGW.

A memory unit 32 manages information on an IP packet to be transmitted or received, BS profile ($r_{BSmax}$) MS profile ($r_{MS}$) QoS parameters (E, T, M, P), APLID, policy ($w_E$, $w_T$, $w_M$, $w_{QoS}$, $w_{rmain}$, $w_{rsub}$) and addresses of the AGW to be connected in association with the MSID and the BSID selected as the main route or the sub route as the occasion demands.

A processor 33 conducts management of the information held in the memory unit 32, and IP packet transmission and reception processing such as creation and analysis of the IP packet.

[One Example of Processing of PCRF According to this Embodiment]

Figure 19B:
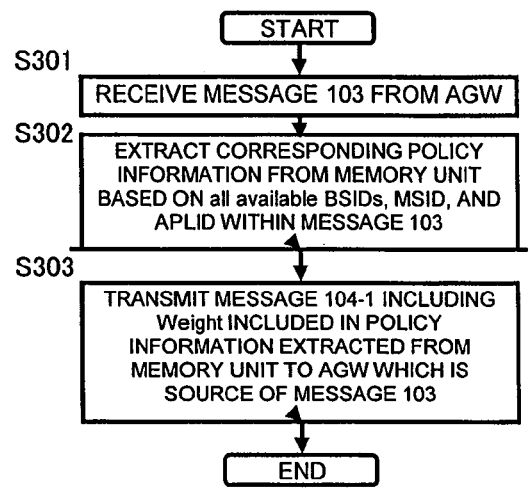
FIG. 19b illustrates an example of processing conducted by the policy management function in setting the main route and the sub route.

FIG. 19b illustrates an example of processing of the PCRF in setting the main route and the sub route.

In S301, the PCRF receives the message 103 from the AGW.

In S302, the PCRF extracts the policy information from the memory unit.

If the policy information is different for each MS, the PCRF extracts the corresponding policy information from the memory unit on the basis of the MSID included in the message 103.

Also, if the policy information is different for each application run by the MS, the PCRF extracts the corresponding policy information from the memory unit on the basis of the APLID included in the message 103.

Also, if the parameter different for each BS such as P or M is included in the policy information, the PCRF extracts the corresponding policy information from the memory unit on the basis of all available BSIDs included within the message 103. In S303, the PCRF that has received the message 103 from the AGW includes the policy information extracted from the memory unit in the message 104-1, and transmits the message 104-1 to the AGW that is a source of the message 103. The PCRF includes weight included in the policy information in the message 104-1. If the weight is different depending on the APLID or the MSID, the PCRF includes the weight corresponding to the APLID or the MSID included in the message 103 in the message 104-1.

Figure 29B:
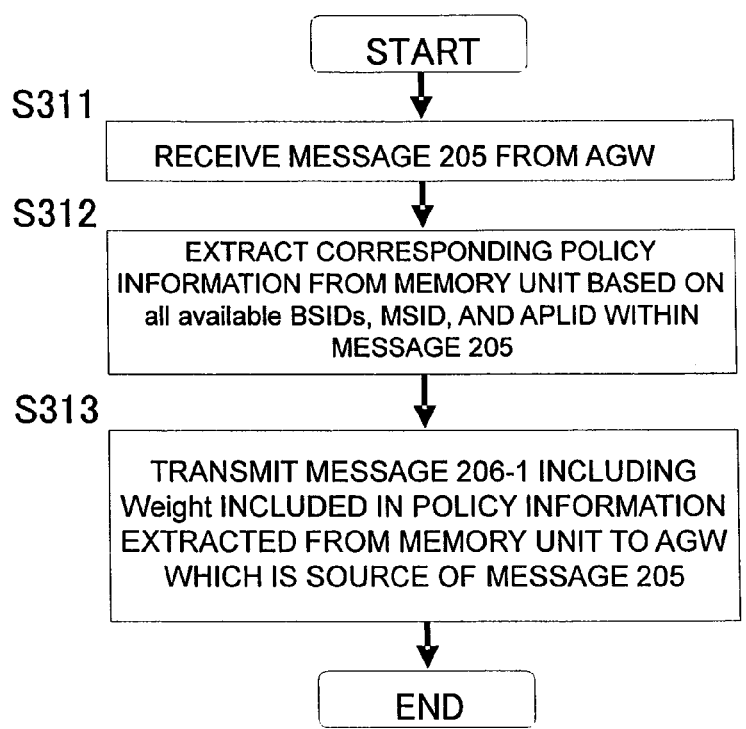
FIG. 29b illustrates an example of processing conducted by the policy management function in switching from the main route to the sub route.

FIG. 29b illustrates an example of processing of the PCRF in switching from the main route to the sub route.

In S311, the PCRF receives the message 205 from the AGW.

In S312, the PCRF extracts the policy information from the memory unit.

If the policy information is different for each MS, the PCRF extracts the corresponding policy information from the memory unit on the basis of the MSID included in the message 205.

Also, if the policy information is different for each application run by the MS, the PCRF extracts the corresponding policy information from the memory unit on the basis of the APLID included in the message 205.

Also, if the parameter different for each BS such as P or M is included in the policy information, the PCRF extracts the corresponding policy information from the memory unit on the basis of all available BSIDs included within the message 205. In S313, the PCRF that has received the message 205 from the AGW includes the policy information extracted from the memory unit in the message 206-1, and transmits the message 206-1 to the AGW that is a source of the message 205. The PCRF includes weight included in the policy information in the message 206-1. If the weight is different depending on the APLID or the MSID, the PCRF includes the weight corresponding to the APLID or the MSID included in the message 205 in the message 206-1.

[One Example of BS According to this Embodiment]

Figure 4C:
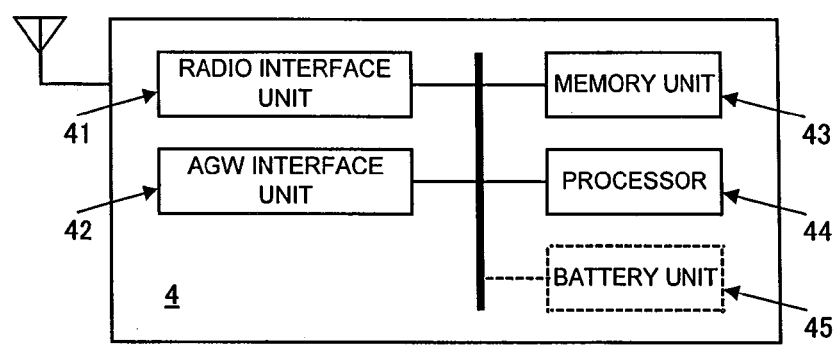
FIG. 4c illustrates an example of a block diagram of a base station.

FIG. 4c illustrates an example of a functional block diagram of the BS used in this embodiment.

A radio interface unit 41 is a radio interface. The radio interface unit 41 allows the BS to transmit and receive the IP packet with respect to the MS.

An AGW interface unit 42 is an interface with the AGW. The AGW interface unit 42 allows the BS to transmit and receive the IP packet with respect to the AGW.

A memory unit 43 manages information on the IP packet to be transmitted or received, BS profile information ($r_{BSmax}$), QoS parameters (E, T, M, P), and addresses of the AGW and the MS to be connected in association with the MSID or the BSID selected as the main route and the sub route as the occasion demands. In the case of architecture in which the route is selected by the BS, information on FIGS. 5a, 8, 9, and 10 used for selection of the main route and the sub route is saved in the memory unit.

A processor 44 conducts management of the information held in the memory unit 43, and IP packet transmission and reception processing such as creation and analysis of the IP packet. When the routes are selected by the BS, a function such as calculation based on an expression given in selecting the main route and the sub route is added.

A battery unit 45 is a battery of the BS. When an electric power is always supplied to the BS, the battery unit 45 can be omitted.

[One Example of Processing of the Bs According to this Embodiment]

Figure 19C:
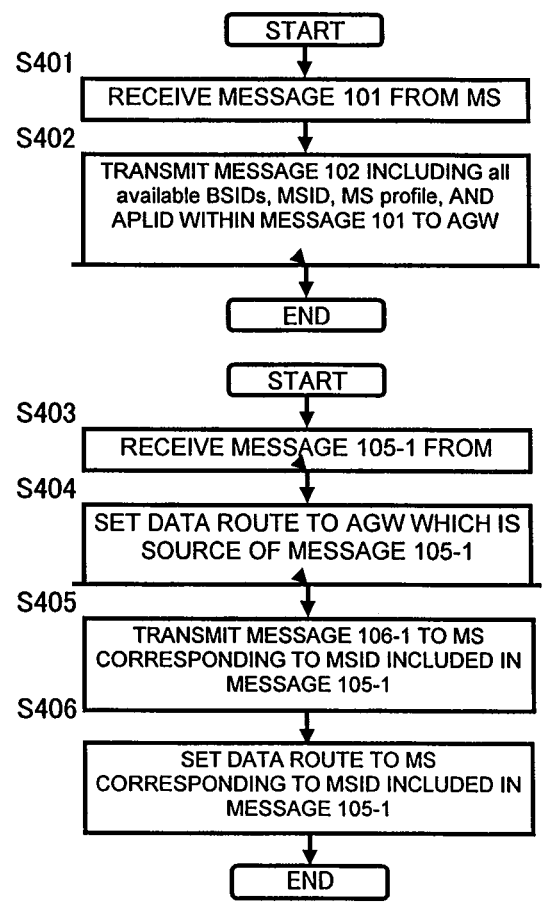
FIG. 19c illustrates an example of processing conducted by the base station in setting the main route and the sub route.

FIG. 19c illustrates an example of processing of the BS in setting the main route and the sub route.

In S401, the BS receives the message 101 from the MS.

When the MS transmits the message 101 to another BS, S401 and S402 will be omitted.

In S402, the BS that has received the message 101 includes the MSID, the MS profile, and all available BSIDs which have been received by the message 101 in the message 102, and transmits the message 102 to the AGW.

Also, if the BS receives the APLID from the MS, the BS also includes the APLID in the message 102.

In setting the main route and the sub route, the BS selected as the sub route by the AGW receives the message 105-1 from the AGW in S403.

The BS that has received the message 105-1 from the AGW knows that the subject BS is selected as the BS of the main route of the MS, from the MSID and the main BSID within the message in S404, and sets the data route to the AGW that has transmitted the message 105-1.

In S405, the BS transmits the message 106-1 to the MS corresponding to the MSID included in the message 105-1.

In S406, the BS sets the data route to the MS.

On the other hand, in setting the main route and the sub route, the BS selected by the AGW as the sub route receives the message 105-2, and knows that the subject BS is selected as the BS of the sub route of the MS, from the MSID and the sub BSID within the message. When there is no need to be aware that the BS is selected as the sub route, this message can be omitted.

When the route is selected by the BS, the same processing as that in FIG. 19a is conducted by the BS.

Figure 29C:
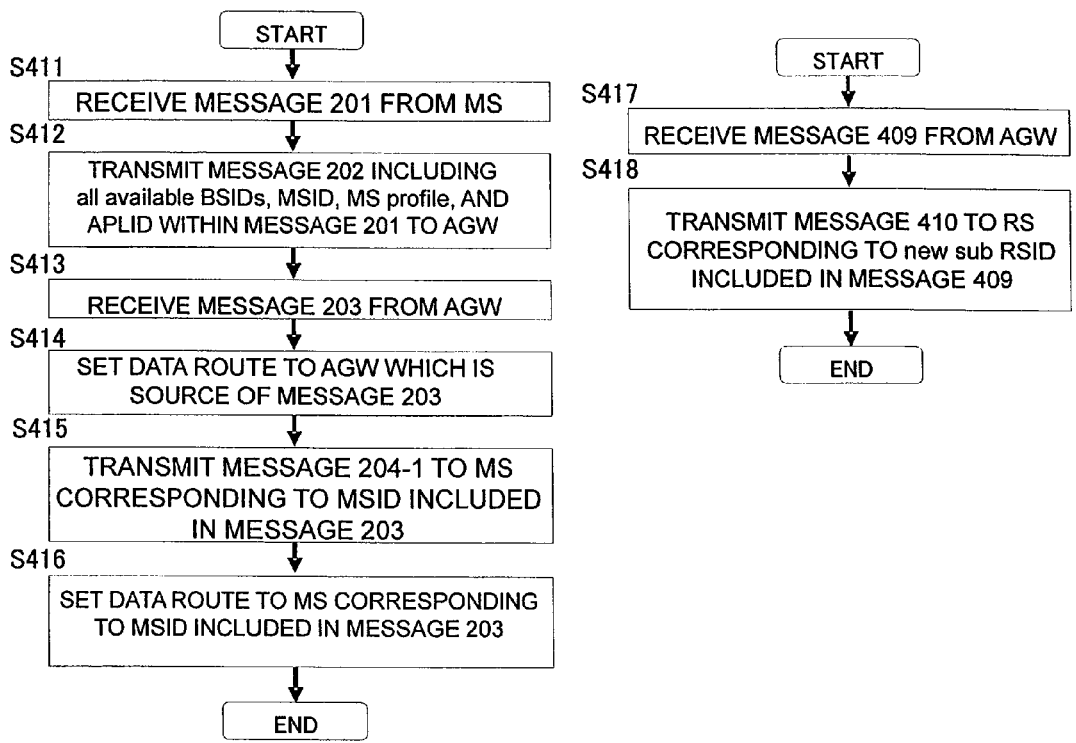
FIG. 29c illustrates an example of processing conducted by the base station in switching from the main route to the sub route.

FIG. 29c illustrates an example of processing of the BS in switching from the main route to the sub route.

In S411, the BS selected as the sub route of the MS that conducts switching receives the message 201 from the MS.

In S412, the BS that has received the message 201 includes the MSID, the MS profile, and all available BSIDs which have been received by the message 201 in the message 202, and transmits the message 202 to the AGW.

Also, if the BS receives the APLID from the MS, the BS also includes the APLID in the message 202.

The BS that has transmitted the message 202 receives the message 203 from the AGW in S413.

The BS that has received the message 203 from the AGW knows that the subject BS will be used as the BS of the main route of the MS in S414, from the MSID and the new main BSID within the message, and sets the data route to the AGW that has transmitted the message 203.

In S415, the BS transmits the message 204-1 to the MS corresponding to the MSID included in the message 203.

In S416, the BS sets the data route to the MS.

On the other hand, in switching from the main route to the sub route, the BS selected by the AGW as the new sub route receives the message 207, and knows that the subject BS is selected as the BS of the sub route of the MS, from the MSID and the new sub BSID within the message. When there is no need to be aware that the BS is selected as the sub route, this message can be omitted.

On the other hand, in switching from the main route to the sub route, the BS selected by the AGW as the new sub route receives the message 207 in S417, and knows that the subject BS is selected as the new sub route of the MS, from the MSID and the new sub BSID within the message.

In S418, the BS transmits the message 208 to the MS corresponding to the MSID included in the message 207.

When the route is selected by the BS, the same processing as those in FIG. 29a is conducted in the BS.

[One Example of MS According to this Embodiment]

Figure 4D:
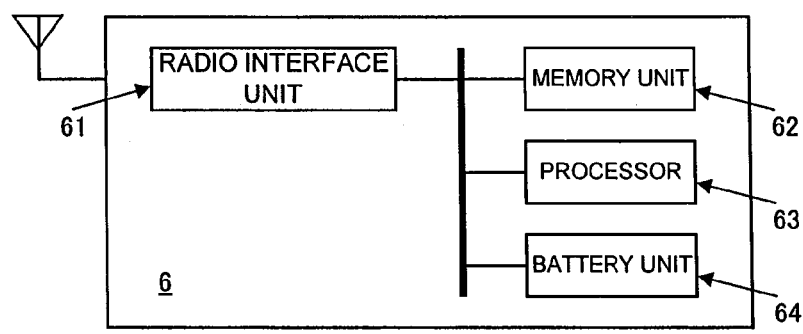
FIG. 4d illustrates an example of a block diagram of a mobile station.

FIG. 4d illustrates an example of a functional block diagram of the MS used in this embodiment.

A radio interface unit 61 is a radio interface. The radio interface unit 61 allows the MS to transmit and receive the IP packet with respect to the BS.

A memory unit 62 manages information on the IP packet to be transmitted or received, MS profile ($r_{MS}$), QoS parameters (E), an APLID, and addresses of the BS to be connected in association with the MSID or the BSID selected as the main route or the sub route as the occasion demands. When the route is selected by the MS, information on FIGS. 5a, 8, 9, and 10 used for selection of the main route and the sub route is saved in the memory unit.

A processor 63 conducts management of the information held in the memory unit 62, and IP packet transmission and reception processing such as creation and analysis of the IP packet. When the routes are selected by the MS, a function such as calculation based on an expression given in selecting the main route and the sub route is added.

A battery unit 64 is a battery of the MS.

[One Example of Processing of the MS According to this Embodiment]

Figure 19D:
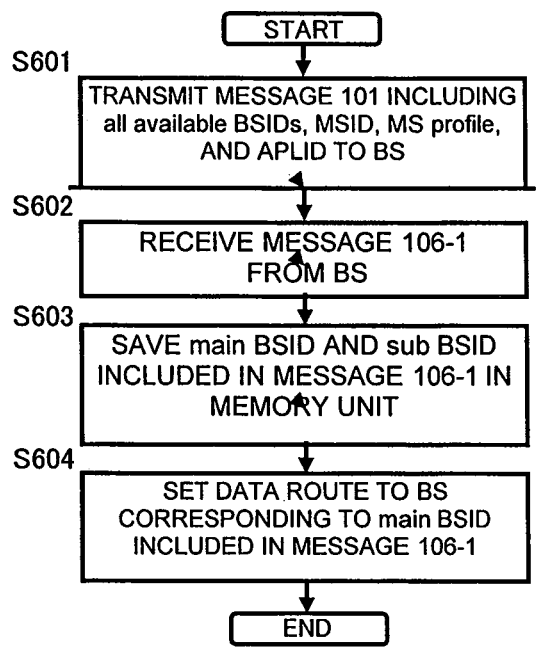
FIG. 19d illustrates an example of processing conducted by the mobile station in setting the main route and the sub route.

FIG. 19d illustrates an example of processing of the MS in setting the main route and the sub route.

In S601, the MS transmits the message 101 to one BS communicatable with the subject MS in order to request the setting of the main route and the sub route. The BS to which the MS transmits the message 101 may be the BS highest in the reception intensity of the signal among the BSs communicatable with the subject MS, or may be determined at random.

The MS includes its own MS profile and all available BSIDs in the message 101. The MS sets an index ($r_{MSnew}$) of the resource amount requested by the MS for the MS profile.

Also, the MS can set information such as the priority of the MS for the MS profile. The priority of the MS can be used when it is determined which MS route should be changed in conducting a route change request initiated by the AGW, or when the weight included in the policy information set within the AGW or the PCRF is determined.

Also, the MS can include the APLID in the message 101. When the RS selected as the route by the application is not changed, the APLID can be omitted.

In S602, the MS that has received the message 106-1 from the BS selected as the main route by the AGW knows the BS selected as the main route from the main BSID within the message 106-1, and knows the BS selected as the sub routine from the sub BSID within the message 106-1.

In S603, the MS that has received the message 106-1 saves the main BSID and the sub BSID within the message 106-1 in the memory unit.

In S604, the MS that has received the message 106-1 sets a data route to the BS selected as the main route, and uses the BS as the main route.

When the route is selected by the MS, the same processing as that in FIG. 19a is conducted by the MS.

Figure 29D:
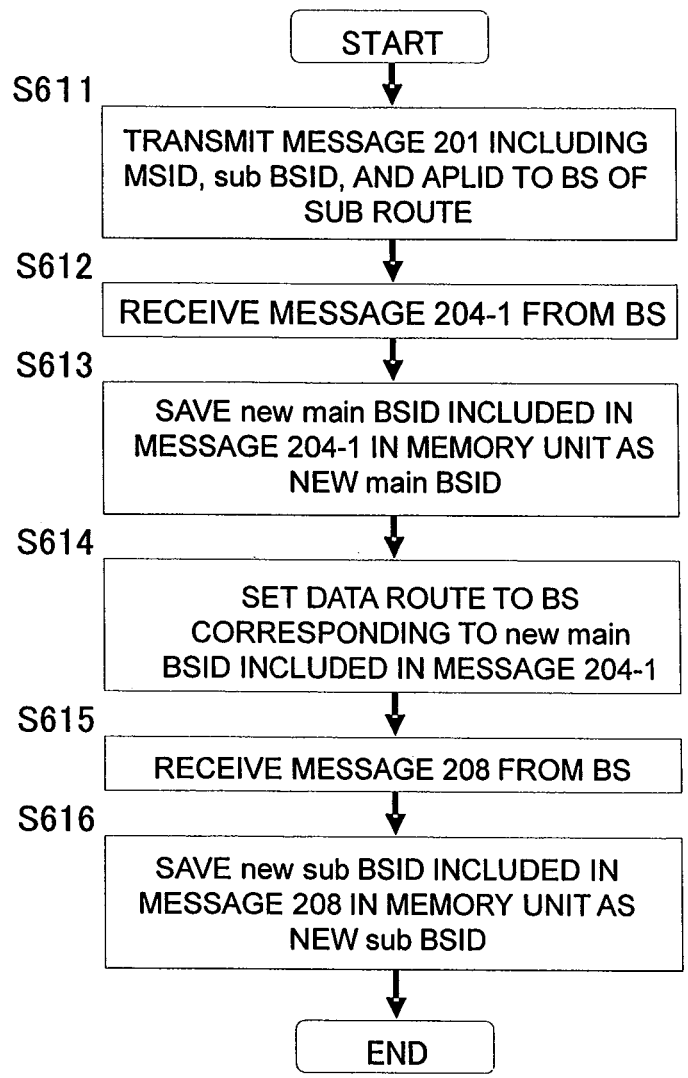
FIG. 29*d* illustrates an example of processing conducted by the mobile station in switching from the main route to the sub route.

FIG. 29d illustrates an example of processing of the MS in switching from the main route to the sub route.

In S611, the MS transmits the message 201 to the BS of the sub route with reference to the BSID of the sub route from the memory unit, in order to request switching from the main route to the sub route.

Also, the MS can include the APLID of an application run by the MS in the message 201. The APLID can be omitted if the BS selected as the route is not changed by the application.

In S612, the MS that has received the message 204-1 from the BS selected as the main route by the AGW knows that the BS of the sub route is newly selected as the main route from the new main BSID within the message 204-1.

In S613, the MS that has received the message 204-1 saves the new main BSID within the message 204-1 in the memory unit.

In S614, the MS that has received the message 204-1 sets the data route to the BS which becomes a new main route, and uses the BS as a new main route.

Also, the MS that has received the message 208 knows the BSID of the BS newly selected as the sub route from the new sub BSID within the message 208 in S615, and saves its BSID in the memory unit in S616.

When the route is selected by the MS, the same processing as that in FIG. 29a is conducted by the MS.

[One Example of RSF According to this Embodiment]

Figure 4E:
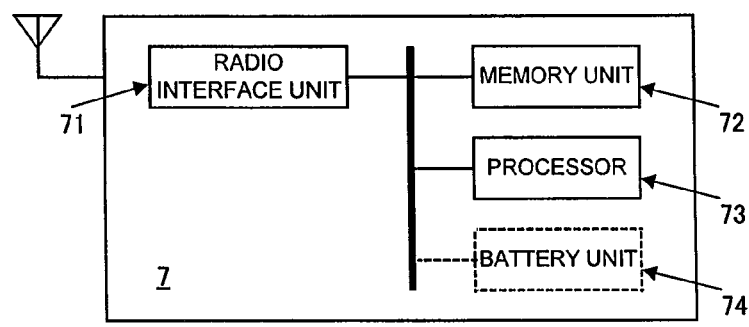
FIG. 4e illustrates an example of a block diagram of a relay station.
Figure 4F:
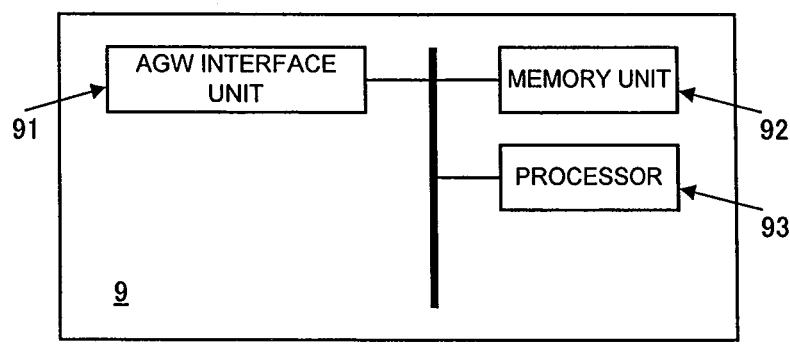
FIG. 4f illustrates an example of a block diagram of an external device.

FIG. 4f illustrates an example of a functional block diagram of the RSF used in this embodiment.

An AGW interface unit 91 is an interface with the AGW. The AGW interface unit 91 allows the RSF to transmit and receive the IP packet with respect to the AGW.

A memory unit 92 manages information on the IP packet to be transmitted or received, BS profile ($r_{BSMax}$), MS profile ($r_{MS}$) QoS parameters (E, T, M, P), APLID, weight ($w_E$, $w_T$, $w_M$, $w_{QoS}$, $w_{rmain}$, $w_{rsub}$), and addresses of the PCRF 3 and the BS 4 to be connected in association with the MSID or the BSID selected as the main route or the sub route as the occasion demands.

A processor 93 conducts management of the information held in the memory unit 25, IP packet transmission and reception processing such as creation and analysis of the IP packet, and calculation based on an expression given in selecting the main route and the sub route.

[One Example of Information Held by Memory Unit of RSF According to this Embodiment]

The RSF has information such as FIGS. 5a, 8, 9, and 10 as information necessary for route selection.

[One Example of Processing of RSF According to this Embodiment]

An example of processing of the RSF in setting the main route and the sub route is identical with that in FIG. 19a.

An example of processing of the RSF in switching from the main route to the sub route is identical with that in FIG. 29a.

2-6. Message Format

[One Example of Message Format to be Transmitted from MS to BS According to this Embodiment]

Figure 12:
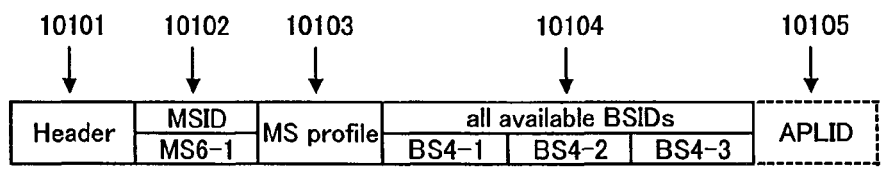
FIG. 12 illustrates an example of a message format used in setting the main route and the sub route.

FIG. 12 illustrates an example of a format of the message 101 to be transmitted from the MS to the BS in setting the main route and the sub route according to this embodiment.

A header 10101 stores information on a layer 1 (L1), a medium access control (MAC), a radio link control (RLC), a packet data convergence protocol (PDCP), and an internet protocol (IP) which are disclosed in FIG. 5.1.1.3-1 of Non Patent Literature 1.

Figure 11:
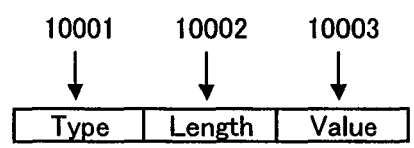
FIG. 11 illustrates an example of a message format used in setting the main route and the sub route.

An MSID field 10102 is a TLV format illustrated in FIG. 11, and sets the MSID in a value field 10003.

In the TLV format, the type field 10001 represents a type of the information stored in the value field 10003, and a length field 10002 represents a length of the value field 10003.

An MS profile field 10103 is the TLV format illustrated in FIG. 11, and sets profile information on the MS such as an index of the radio resource amount requested by the MS in the value field 10003. The profile information on the MS may include the priority of the MS.

An all available BSIDs field 10104 is the TLV format illustrated in FIG. 11, and sets the BSIDs of all the BSs which are candidates for the routes in the value field 10003.

An APLID field 10105 is the TLV format illustrated in FIG. 11, and sets the APLID of the application run by the MS in the value field 10003.

Figure 30:
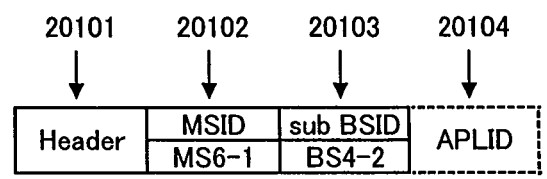
FIG. 30 illustrates an example of a message format used in switching from the main route to the sub route.

FIG. 30 illustrates an example of the format of the message 201 to be transmitted from the MS to the BS in switching from the main route to the sub route in this embodiment.

A header 20101 stores information on the L1, the MAC, the RLC, the PDCP, and the IP which are disclosed in FIG. 5.1.1.3-1 of Non Patent Literature 1.

An MSID field 20102 is the TLV format illustrated in FIG. 11, and sets the MSID in the value field 10003.

A sub BSID field 20103 is the TLV format illustrated in FIG. 11, and sets the BSID corresponding to the BS of the sub route, which is saved in the memory unit, in the value field 10003.

An APLID field 20104 is the TLV format illustrated in FIG. 11, and sets the APLID of the application run by the MS in the value field 10003.

[One Example of Message Format to be Transmitted from BS to AGW According to this Embodiment]

Figure 13:
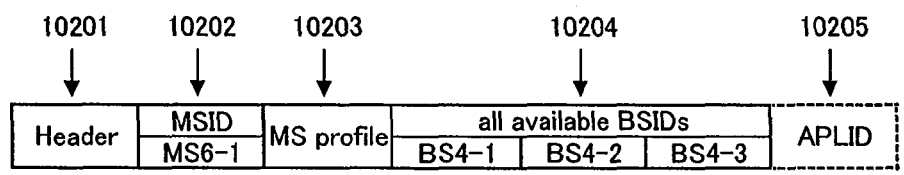
FIG. 13 illustrates an example of a message format used in setting the main route and the sub route.

FIG. 13 illustrates an example of a format of the message 102 to be transmitted from the BS to the AGW in setting the main route and the sub route according to this embodiment.

A header 10201 stores information on the L1, the L2, and the IP which are disclosed in FIG. 5.1.1.2-1 of Non Patent Literature 1.

A value of the MSID field 10102 received by the message 101 is copied into an MSID field 10202.

A value of the MS profile field 10103 received by the message 101 is copied into an MS profile field 10203.

A value of the all available BSIDs field 10104 received by the message 101 is copied into an all available BSIDs field 10204.

A value of the APLID field 10105 received by the message 101 is copied into an APLID field 10205.

Figure 31:
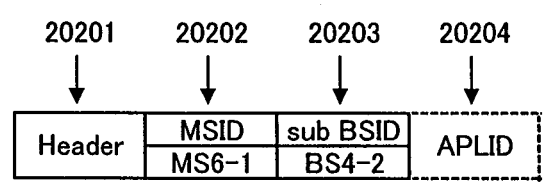
FIG. 31 illustrates an example of a message format used in switching from the main route to the sub route.

FIG. 31 illustrates an example of the format of the message 202 to be transmitted from the BS to the AGW in switching from the main route to the sub route in this embodiment.

A header 20201 stores information on the L1, the L2, and the IP which are disclosed in FIG. 5.1.1.2-1 of Non Patent Literature 1.

A value of the MSID field 20102 received by the message 201 is copied into an MSID field 20202.

A value of the sub BSID field 20103 received by the message 201 is copied into a sub BSID field 20203.

A value of the APLID field 20104 received by the message 201 is copied into an APLID field 20204.

[One Example of Message Format to be Transmitted from AGW to PCRF According to this Embodiment]

Figure 14:
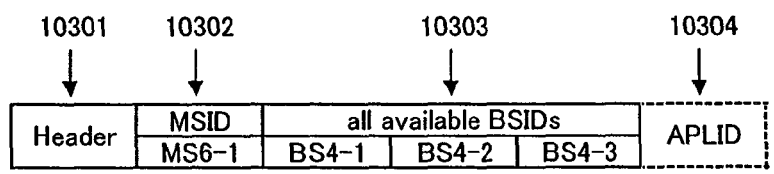
FIG. 14 illustrates an example of a message format used in setting the main route and the sub route.

FIG. 14 illustrates an example of a format of the message 103 to be transmitted from the AGW to the PCRF in setting the main route and the sub route according to this embodiment.

A header 10301 stores information on the L1, the L2, and the IP which are disclosed in FIG. 5.1.1.2-1 of Non Patent Literature 1.

A value of the MSID field 10202 received by the message 102 is copied into an MSID field 10302.

A value of the all available BSIDs field 10204 received by the message 102 is copied into an all available BSIDs field 10303.

A value of the APLID field 10205 received by the message 102 is copied into an APLID field 10304.

Figure 34:
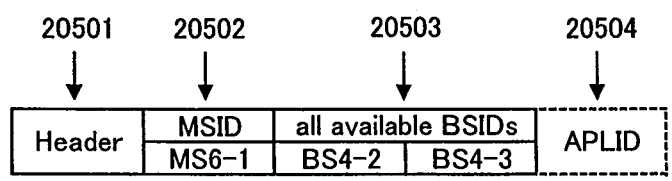
FIG. 34 illustrates an example of a message format used in switching from the main route to the sub route.

FIG. 34 illustrates an example of the format of the message 205 to be transmitted from the AGW to the PCRF in switching from the main route to the sub route in this embodiment.

A header 20501 stores information on the L1, the L2, and the IP which are disclosed in FIG. 5.1.1.2-1 of Non Patent Literature 1.

A value of the MSID field 20202 received by the message 202 is copied into an MSID field 20502.

A value of the all available BSIDs field 20204 received by the message 202 is copied into an all available BSIDs field 20503.

A value of the APLID field 20205 received by the message 202 is copied into an APLID field 20504.

[One Example of Message Format to be Transmitted from PCRF to AGW According to this Embodiment]

Figure 15:
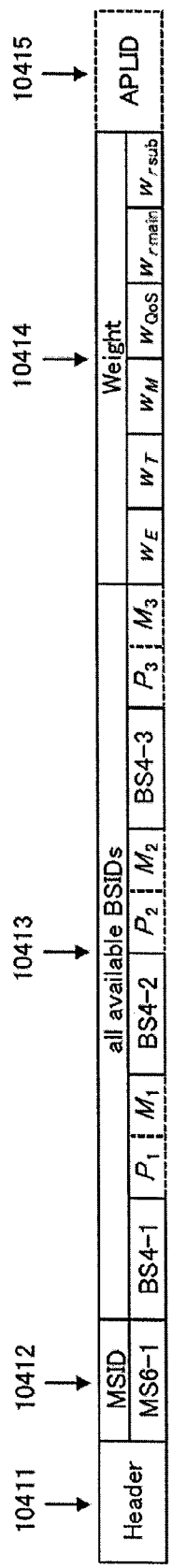
FIG. 15 illustrates an example of a message format used in setting the main route and the sub route.

FIG. 15 illustrates an example of a format of the message 104-1 to be transmitted from the PCRF to the AGW in setting the main route and the sub route according to this embodiment.

A header 10411 stores information on the L1, the L2, and the IP which are disclosed in FIG. 5.1.1.2-1 of Non Patent Literature 1.

A value of the MSID field 10302 received by the message 103 is copied into an MSID field 10412.

A value of the all available BSIDs field 10303 received by the message 103 is copied into an all available BSIDs field 10413. When the quality is also taken into account in selection of the route, and P and M of the QoS parameters are included in the policy, the P and M corresponding to each BSID are extracted from the memory unit, and set in the all available BSIDs field 10413.

A value of corresponding weight ($w_E$, $w_T$, $w_M$, $w_{QoS}$, $w_{rmain}$, $w_{rsub}$) is extracted from the policy saved in the memory unit, and set in a weight field 10414.

A value of the APLID field 10304 received by the message 103 is copied into an APLID field 10415.

Figure 35:
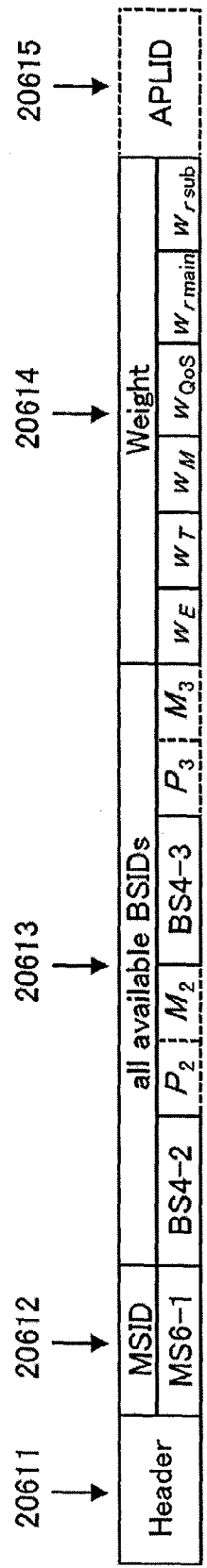
FIG. 35 illustrates an example of a message format used in switching from the main route to the sub route.

FIG. 35 illustrates an example of the format of the message 206-1 to be transmitted from the PCRF to the AGW in switching from the main route to the sub route in this embodiment.

A header 20601 stores information on the L1, the L2, and the IP which are disclosed in FIG. 5.1.1.2-1 of Non Patent Literature 1.

A value of the MSID field 20502 received by the message 205 is copied into an MSID field 20612.

A value of the all available BSIDs field 20503 received by the message 205 is copied into an all available BSIDs field 20613. When the quality is also taken into account in selection of the route, and P and M of the QoS parameters are included in the policy, the P and M corresponding to each BSID are extracted from the memory unit, and set in the all available BSIDs field 20613.

A value of corresponding weight ($w_E$, $w_T$, $w_M$, $w_{QoS}$, $w_{rmain}$, $w_{rsub}$) is extracted from the policy saved in the memory unit, and set in a weight field 20614.

A value of the APLID field 20504 received by the message 205 is copied into an APLID field 20615.

[One Example of Message Format to be Transmitted from AGW to RSF According to this Embodiment]

An example of a format of a message 309 to be transmitted from the AGW to the PCRF in setting the main route and the sub route and in switching from the main route to the sub route according to this embodiment is identical with that in FIG. 15 to which the MS profile is added.

[One Example of Message Format to be Transmitted from AGW to BS According to this Embodiment]

Figure 16:
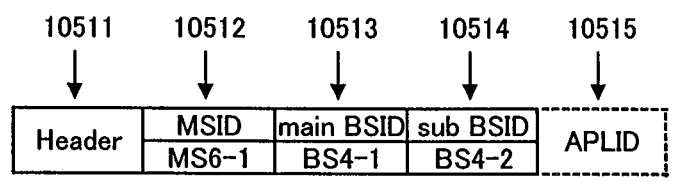
FIG. 16 illustrates an example of a message format used in setting the main route and the sub route.

FIG. 16 illustrates an example of a format of the message 105-1 to be transmitted from the AGW to the BS selected as the main route in setting the main route and the sub route according to this embodiment.

A header 10511 stores information on the L1, the L2, and the IP which are disclosed in FIG. 5.1.1.2-1 of Non Patent Literature 1.

A value of the MSID field 10202 received by the message 102 is copied into an MSID field 10512.

A value of the BSID of the BS selected as the main route by the AGW is set in a main BSID field 10513.

A value of the BSID of the BS selected as the sub route by the AGW is set in a sub BSID field 10514.

A value of the APLID field 10205 received by the message 102 is copied into an APLID field 10515.

Figure 17:
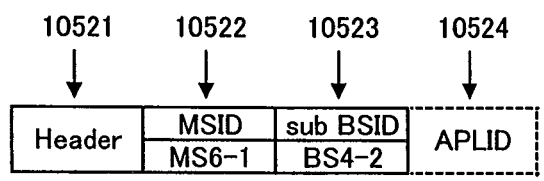
FIG. 17 illustrates an example of a message format used in setting the main route and the sub route.

FIG. 17 illustrates an example of a format of the message 105-2 to be transmitted from the AGW to the BS selected as the sub route in setting the main route and the sub route according to this embodiment.

A header 10521 stores information on the L1, the L2, and the IP which are disclosed in FIG. 5.1.1.2-1 of Non Patent Literature 1.

A value of the MSID field 10202 received by the message 102 is copied into an MSID field 10522.

A value of the BSID of the BS selected as the sub route by the AGW is set in a sub BSID field 10523.

A value of the APLID field 10205 received by the message 102 is copied into an APLID field 10524.

Figure 32:
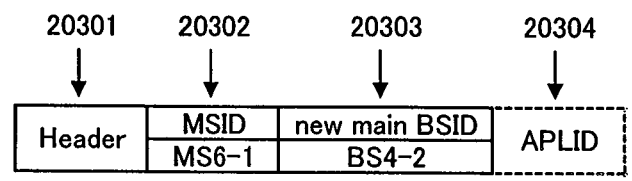
FIG. 32 illustrates an example of a message format used in switching from the main route to the sub route.

FIG. 32 illustrates an example of the format of the message 203 to be transmitted from the AGW to the BS of the sub route newly used as the main route in switching from the main route to the sub route in this embodiment.

A header 20301 stores information on the L1, the L2, and the IP which are disclosed in FIG. 5.1.1.2-1 of Non Patent Literature 1.

A value of the MSID field 20202 received by the message 202 is copied into an MSID field 20302.

A value of the sub BSID field 20203 received by the message 202 is set in a new main BSID field 20303.

A value of the APLID field 20204 received by the message 202 is copied into an APLID field 20304.

Figure 36:
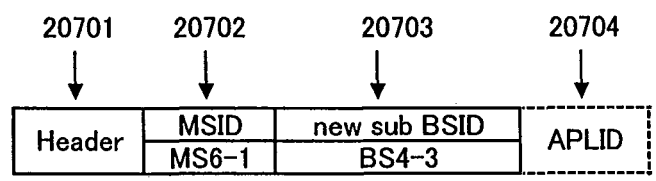
FIG. 36 illustrates an example of a message format used in switching from the main route to the sub route.

FIG. 36 illustrates an example of the format of the message 207 to be transmitted from the AGW to the BS newly selected as the sub route in switching from the main route to the sub route in this embodiment.

A header 20701 stores information on the L1, the L2, and the IP which are disclosed in FIG. 5.1.1.2-1 of Non Patent Literature 1.

A value of the MSID field 20202 received by the message 202 is copied into an MSID field 20702.

A value of the BSID of the BS newly selected as the sub route by the AGW is set into a new sub BSID field 20703.

A value of the APLID field 20204 received by the message 202 is copied into an APLID field 20704.

[One Example of Message Format to be Transmitted from BS to MS According to this Embodiment]

Figure 18:
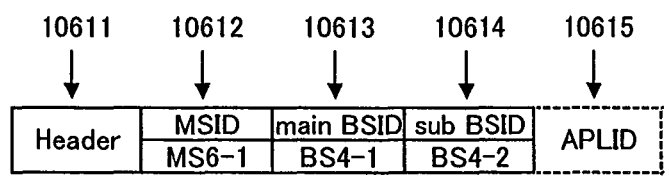
FIG. 18 illustrates an example of a message format used in setting the main route and the sub route.

FIG. 18 illustrates an example of a format of the message 106-1 to be transmitted from the BS to the MS in setting the main route and the sub route according to this embodiment.

A header 10611 stores information on the L1, the MAC, the RLC, the PDCP, and the IP which are disclosed in FIG. 5.1.1.3-1 of Non Patent Literature 1.

A value of the MSID field 10202 received by the message 102 is copied into an MSID field 10612.

A value of the main BSID field 10513 received by the message 105-1 is copied into a main BSID field 10613.

A value of the sub BSID field 10514 received by the message 105-1 is copied into a sub BSID field 10614.

A value of the APLID field 10515 received by the message 105-1 is copied into an APLID field 10615.

Figure 33:
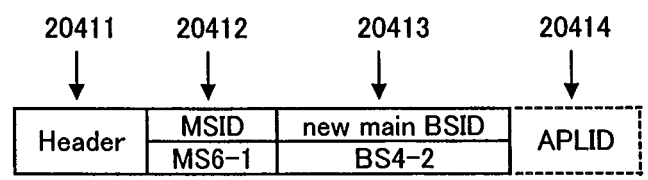
FIG. 33 illustrates an example of a message format used in switching from the main route to the sub route.

FIG. 33 illustrates an example of the format of the message 204-1 to be transmitted from the BS of the sub route newly used as the main route to the MS in switching from the main route to the sub route in this embodiment.

A header 20411 stores information on the L1, the MAC, the RLC, the PDCP, and the IP which are disclosed in FIG. 5.1.1.3-1 of Non Patent Literature 1.

A value of the MSID field 20302 received by the message 203 is copied into an MSID field 20412.

A value of the new main BSID field 20303 received by the message 203 is set in a new main BSID field 20413.

A value of the APLID field 20304 received by the message 203 is copied into an APLID field 20414.

Figure 37:
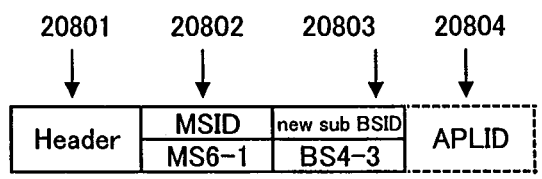
FIG. 37 illustrates an example of a message format used in setting the main route and the sub route in the case of the relay system.

FIG. 37 illustrates an example of the format of the message 208 to be transmitted from the AGW to the BS newly selected as the sub route in switching from the main route to the sub route in this embodiment.

A header 20801 stores information on the L1, the MAC, the RLC, the PDCP, and the IP which are disclosed in FIG. 5.1.1.3-1 of Non Patent Literature 1.

A value of the MSID field 20702 received by the message 207 is copied into an MSID field 20802.

A value of the new sub BSID field 20703 received by the message 207 is copied in a new sub BSID field 20803.

A value of the APLID field 20704 received by the message 207 is copied into an APLID field 20804.

3. Second Embodiment (Relay Station)
[Second Embodiment: One Example of Selection of Main Route and Sub Route Based on Residual Resource of Relay Station in Mobile Radio Communication System Using Relay System having Relay Station Between Mobile Station and Base Station]
3-1. System
[One Example of Architecture of Mobile Radio Communication System using Relay System According to this Embodiment]

Figure 2A:
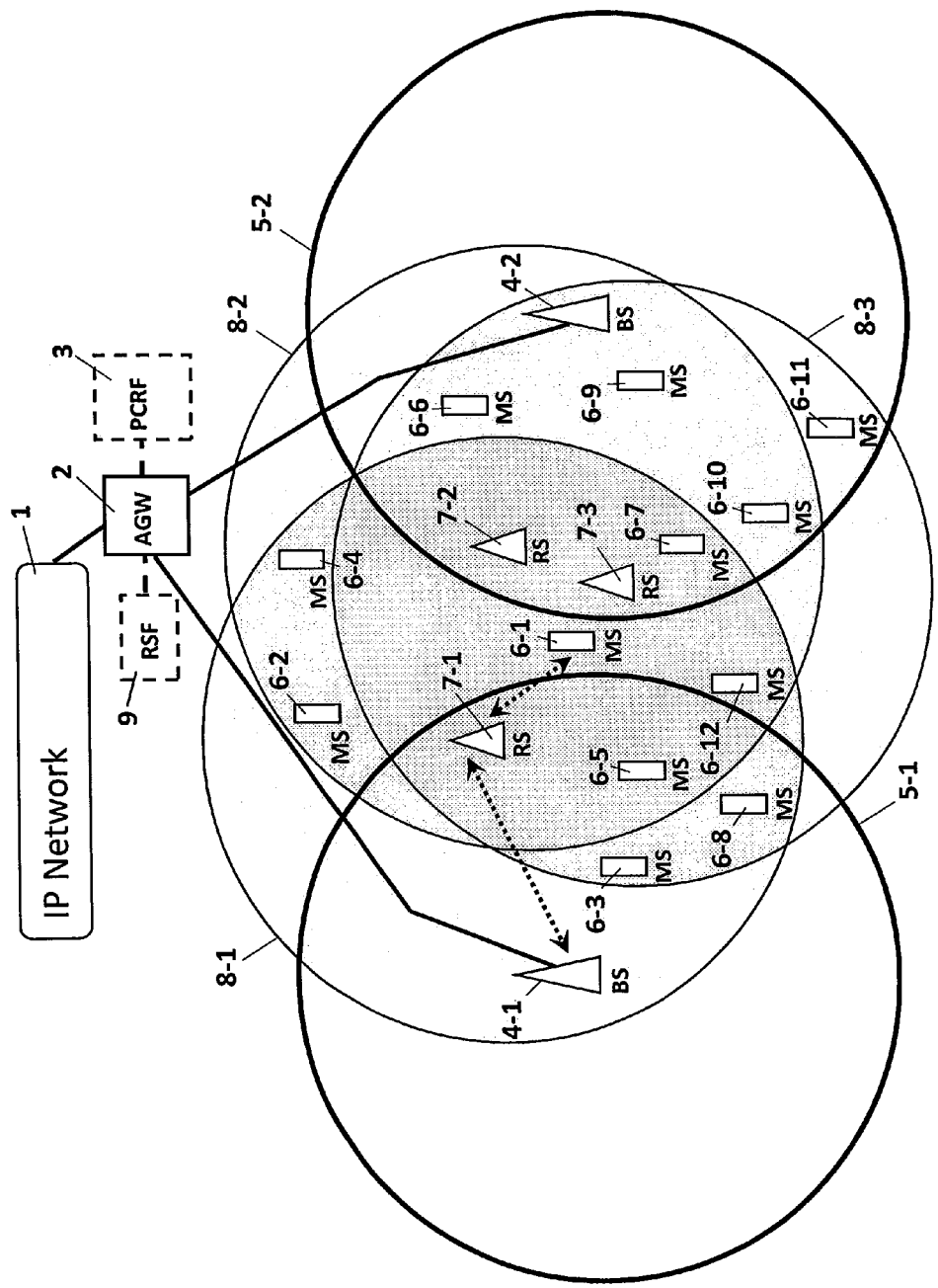
FIG. 2a illustrates an example of a mobile radio communication system using a relay system.

This embodiment is also applicable to the selection of a relay station in a relay system. FIG. 2a illustrates an example of architecture of a mobile radio communication system using the relay system according to this embodiment.

The AGW 2 is connected to the IP network 1, has a function of selecting the main route and the sub route based on the residual resources of the BS 4, and exchanges a control signal and data with the BS 4. When the route is selected by a node other than the gateway, the function of selecting the main route and the sub route by the AGW 2 is omitted.

The PCRF 3 manages the information on the weight of the selection criterion as the policy information, and exchanges the control signal and the data with the AGW 2. When the policy information is set within the AGW 2 in advance, the PCRF 3 can be omitted.

The BS 4 exchanges the control signal and the data with an RS 7 existing within the radio communication range 5 of the BS 4 and the MS 6 existing within the radio communication range 5 of the BS 4. In the case of FIG. 2a, for example, the BS4-1 can exchange the data with the AGW 2 and an RS 7-1, the MS 6-3, the MS 6-5, and the MS 6-8 existing within the radio communication range 5-1. When the route is selected in the BS 4, the BS 4 has a function of selecting the main route and the sub route based on the residual resources of the RS 7.

The MS 6 exchanges the control signal and the data with the radio communicatable BS 4 and the radio communicatable RS 7. In the case of FIG. 2a, for example, the MS 6-9 can exchange the data with the BS 4-2, an RS 7-2, and an RS 7-3. When the route is selected in the MS 6, the MS 6 has a function of selecting the main route and the sub route based on the residual resources of the RS 7.

The RS 7 exchanges the control signal and the data with the BS 4 existing within a radio communication range 8 of the RS 7, and the MS 6 existing within the radio communication range 8 of the RS 7. In the case of FIG. 2a, for example, the RS 7-1 can exchange the data with the BS 4-1, the MS 6-1, the MS 6-2, the MS 6-3, the MS 6-4, the MS 6-5, the MS 6-7, the MS 6-8, and the MS 6-12, which exist within a radio communication range 8-1.

The RSF 9 is an external device having a function of selecting the main route and the sub route based on the residual resources of the RS 7, and transmits and receives the control signal and the data with respect to the AGW 2. When the main route and the sub route are selected by a node other than the external device, the RSF 9 can be omitted.

[One Example of Method of Acquiring Identifier of Relay Station Selectable as Route by Mobile Station According to this Embodiment]

A radio system using the relay system illustrated in FIG. 2a is assumed.

When the RS transmits a signal including its own relay station identifier (hereinafter referred to as "RSID") as annunciation information, the MS receives the annunciation information from the RS, and saves the RSID of the surrounding communicatable RS in a memory unit.

On the other hand, when the RS does not transmit the signal including its own "RSID" as the annunciation information, there is a method of inquiring about the surrounding communicatable RS from the MS.

As the method of inquiring about the RSID of the surrounding communicatable RS from the MS, there is the following method.

The MS transmits a message including its own MSID to all of the surrounding RSs by broadcast in order to know the RSID of the surrounding communicatable RS.

The RS that has received the message from the MS returns the message adding its own RSID to the MS.

The MS that has received a return message from the RS stores the RSID included in the message in the memory unit, sets up a timer, and waits for a message from another RS.

When the MS receives the message from another RS within a time set up by the timer, the MS saves the RSID included within the message in the memory unit, and resets the timer.

When the MS does not receive the message from another RS within the time set up by the timer, the MS saves all of the RSIDs received previously as the RSIDs of the surrounding communicatable RSs in the memory unit.

Also, as another method for inquiring about the RSID of the surrounding communicatable RS from the MS, there is the following method.

The MS transmits the message including its own MSID to all of the surrounding RSs by broadcast in order to know the RSID of the surrounding communicatable RS.

The RS that has received the message from the MS transmits the message adding its own RSID to the BS.

The BS that has received the message from RS transfers the received message to the AGW.

The AGW that has received the message from the BS stores the MSID, RSID and the BSID included in the message in the memory unit, sets up a timer, and waits for another message from the BS.

When the AGW receives the another message from the BS within a time set up by the timer, the AGW confirms the MSID included within the message. If a request is transmitted from the same MS, the AGW also saves the RSID and the BSID in the memory unit, and resets the timer.

When the AGW does not receive the another message from the BS within the time set up by the timer, the AGW transmits the message including all of the RSIDs received previously to the RS corresponding to any one RSID, through the corresponding BS. As the RS to which the message should be transmitted, the RS excellent in communication environments may be selected with reference to a RS profile included the RS information within the AGW, or the RS may be selected at random.

The RS that has received the message from the AGW through the BS transmits the message to the MS on the basis of the MSID within the message.

The MS that has received the message from the RS saves all of the RSIDs included in the message as the RSID of the surrounding communicatable RS in the memory unit.

[One Example of Method of Notifying Device having Route Selection Function of Profile Information on Base Station provided in Base Station According to this Embodiment]

A case in which the AGW has the route selection function will be described.

A radio system using the relay system illustrated in FIG. 2a is assumed. Some of parameters used in selecting the main route and the sub route by the AGW can be notified the AGW as profile information on the RS (hereinafter referred to as "RS profile") in advance.

As information included in the RS profile, there is $r_{RSmax}$ which is an index of an upper limit of a radio resource amount that is acceptable by the RS. $r_{RSmax}$ is used when the AGW selects the main route and the sub route based on the residual resources of the RS.

Also, when the AGW selects the main route and the sub route, if the quality is also taken into account apart from the residual resources of the RS, an effective data transfer rate (hereinafter referred to as "$E_{RS}$") between the MS and the RS and the BS, a residual communicatable time (hereinafter referred to as "$T_{RS}$") of the RS, a mobility (hereinafter referred to as "$M_{RS}$") of the RS, and a use priority (hereinafter referred to as "$P_{RS}$") of the RS can be included in the RS profile as parameters (hereinafter referred to as "RS QoS parameters") used for route selection based on the quality.

$E_{RS}$ is the effective data transfer rate between the MS and the RS, and depends on a radio signal reception intensity of the MS or the like.

$T_{RS}$ indicates the communicatable time of the RS. $T_{RS}$ depends on a battery charge of the RS or service contract detail of the RS or the like. $T_{RS}$ can be omitted when the communicatable time is not set in the RS.

$M_{RS}$ is the mobility of the RS, and a value indicative of modes of the RS such that the RS is fixed, nomadic, portable, or mobile. When the mode of the RS is uniquely determined, $M_{RS}$ can be omitted.

$P_{RS}$ is the priority of the RS. If the priority of the RS possessed by, for example, police or fire is set to be low, the RS can be prevented from being used as a data route of a third party. Also, for example, when a high priority is set for a given RS, incentive can be given so that the RS becomes the data route of the third party.

The RS notifies the AGW of its own RS profile when the timer set up within the RS expires, when the RS profile information is changed, or when the AGW or the MS requests the RS to notify the AGW of the RS profile. Also, when the RS moves, the RS may notify the AGW of the RS profile if the RS updates an area.

As a method of notifying the AGW of the RS profile by the RS, there is the following method.

The RS that notifies the AGW of the RS profile transmits a message including its own RSID and the RS profile to the AGW through the BS. When the RS stores the RS profile notified previously, the RS can notify the AGW of only a difference from the previously notified RS profile.

The AGW that has received the message from the RS through the BS creates or updates FIG. 5a on the basis of the RS profile. In the case where the quality is also taken into account apart from the residual resources of the RS when the AGW selects the main route and the sub route, if the QoS parameters are included in the RS profile, the AGW creates or updates FIG. 8.

The AGW transmits the message to the RS that has given notification of the RS profile through the BS.

The RS that has received the message from the AGW through the BS knows that the RS profile has been notified the AGW of.

Even in the case where a device other than the gateway has the route selection function, the same method is applied so that the profile information on the base station can be notified the device having the route selection function of.

3-2. Setting of Main Route and Sub Route

[One Example of Call Flow of Setting Main Route and Sub Route in Radio System Using the Relay System According to this Embodiment]

As nodes for setting the main route and the sub route, there are conceivable candidates of the gateway, the external device, the base station, and the mobile station.

FIG. 21a illustrates one example of a call flow when the main route and the sub route in the radio system using the relay system are set by the gateway according to this embodiment.

In this example, the MS 6-1 in FIG. 2a initializes the main route and the sub route.

In Step 300-1, the MS has already known the RSID of the surrounding RS communicatable with the MS through the above method.

Also, in Step 300-2, the RS profile of each RS has been already notified the AGW of through the above method.

The MS transmits a message 301 to one of the RSs communicatable with the MS in order to request setting of the main route and the sub route. The RS to which the MS transmits the message 301 may be the RS highest in the reception intensity of the signal among the RSs communicatable with the MS, or may be determined at random.

The MS includes, in the message 301, its own MSID, its own profile information, and the RSIDs (hereinafter referred to as "all available RSIDs") of all the RSs communicatable with the MS. The MS sets the index ($r_{MSnew}$) of the resource amount requested by the MS for the MS profile.

Also, the MS can set information such as the priority of the MS for the MS profile. The priority of the MS can be used when it is determined which MS route should be changed in conducting a route change request initiated by the AGW, or when a Weight, which is included in the policy information set within the AGW or the PCRF, is determined.

Also, the MS can include APLID of an application run by the MS in the message 301. The APLID can be omitted when the policy information set within the AGW or the PCRF does not depend on the application.

The RS that has received the message 301 from the MS transmits a message 302 to the BS. The RS copies the MSID, the MS profile, and the all available RSIDs, which have been received by the message 301, into the message 302.

Also, when the RS receives the APLID from the MS, the RS also includes the APLID in the message.

The BS that has received the message 302 from the RS transmits a message 303 to the AGW. The RS copies the MSID, the MS profile, and the all available RSIDs, which have been received by the message 302, into the message 303.

Also, when the BS receives the APLID, the BS also includes the APLID in the message.

The AGW that has received the message 302 from the BS transmits a message 304 to the PCRF. When the APLID is included in the message 303, the AGW includes the APLID within the message 303 in the message 304.

Also, if the policy information is different for each MS, the AGW includes the MSID within the message 303 in the message 304.

Also, if the parameter such as $P_{RS}$ or $M_{RS}$ different for each RS is included in the policy information, the AGW includes all available RSIDs within the message 303 in the message 304. If the AGW has all of the necessary policy information, the AGW can be advanced to Step 305-2 without transmission of the message 304.

The PCRF that has received the message 304 from the AGW extracts the policy information corresponding to the RS having the RSID included in all available RSIDs within the message 304 from the memory unit. If the policy information is different for each MS, the PCRF extracts the corresponding policy information from the memory unit on the basis of the MSID included in the message 304.

Also, if the policy information is different for each application run by the MS, the PCRF extracts the corresponding policy information from the memory unit on the basis of the APLID included within the message 103.

Also, if the parameter such as $P_{RS}$ or $M_{RS}$ different for each RS is included in the policy information, the PCRF extracts the corresponding policy information from the memory unit on the basis of all available RSIDs included within the message 304.

The PCRF that has received the message 304 from the AGW includes the policy information extracted from the memory unit in a message 305-1, and transmits the message 305-1 to the AGW that is a source of the message 304. The PCRF includes the weight included in the policy information in the message 305-1. If the weight is different depending on the APLID or the MSID, the PCRF includes the weight corresponding to the APLID or the MSID included in the message 304 in the message 305-1.

The AGW that has received the message 305-1 from the PCRF creates FIG. 23 on the basis of the policy information included in the message 305-1, the RS profile and the MS profile extracted from the memory unit. If the quality is taken into account for selection of the main route, the AGW creates FIGS. 23, 25, 26, and 27 on the basis of the policy information included in the message 305-1, and the RS profile and the MS profile which have been extracted from the memory unit. If the AGW has all of the necessary policy information, the AGW can extract the policy information from the memory unit.

In Step 305-2, the AGW selects the RS of the main route on the basis of FIG. 23. If the quality is taken into account for selection of the main route, the AGW selects the RS of the main route on the basis of FIGS. 23, 25, 26, and 27 in Step 305-2. A specific process of the main route selection will be described in detail with reference to a flowchart of FIG. 59a to be described later.

In Step 305-3, the AGW creates FIG. 24 on the basis of FIG. 23, and selects the RS of the sub route. If the quality is taken into account for selection of the sub route, the AGW selects the RS of the sub route on the basis of FIGS. 24, 25, 26, and 27. A specific process of the sub route selection will be described in detail with reference to a flowchart of FIG. 59a to be described later.

In Step 305-4, the AGW updates FIG. 22a saved in the memory unit on the basis of the main route selected in Step 305-2 and the sub route selected in Step 305-3, and creates FIG. 5b. The AGW saves the created FIG. 22b in the memory unit.

The AGW includes the MSID of the MS that has requested the setting of the route, the RSID (hereinafter referred to as "main RSID") of the RS selected as the main route, and the RSID (hereinafter referred to as "sub RSID") of the RS selected as the sub route in a message 306-1 on the basis of the main route selected in Step 305-2 and the sub route selected in Step 305-3. Then, the AGW transmits the message 306-1 to the BS corresponding to the RS selected as the main route, and sets a data route to the BS corresponding to the RS selected as the main route.

If the RS selected as the route is different for each application, the AGW transmits the message 306-1 including the APLID to the RS, and notifies the RS selected as the main route what kind of application is used to select the RS as the route.

Also, the AGW includes the MSID of the MS that has requested the setting of the route, and the sub RSID in a message 306-2, and transmits the message 306-2 to the BS corresponding to the RS selected as the sub route. If the RS selected as the route is different for each application, the AGW transmits the message 306-2 including the APLID to the RS, and notifies the RS selected as the sub route what kind of application is used to select the RS as the route. If there is no need to be aware that the RS is selected as the sub route, this message can be omitted.

The BS that has received the message 306-1 sets the data route to the AGW that has transmitted the message 306-1. Then, the BS transmits a message 307-1 to the RS corresponding to the main RSID included in the message 306-1, and sets the data route to the RS.

The RS that has received the message 307-1 knows that the subject RS is selected as the RS of the main route of the MS from the MSID and the main RSID within the message. The RS selected as the main route sets the data route to the AGW that has transmitted the message 307-1. Then, the RS transmits a message 308-1 to the MS corresponding to the MSID included in the message 307-1, and sets the data route to the MS.

The BS that has received the message 306-2 transmits a message 307-2 to the RS corresponding to sub RSID in the message. The RS knows that the subject RS is selected as the RS of the sub route of the MS. If there is no need to be aware that the RS is selected as the sub route, this message can be omitted.

The RS that has received the message 307-2 knows that the subject RS is selected as the RS of the sub route of the MS from the MSID and the sub RSID within the message. If there is no need to be aware that the RS is selected as the sub route, this message can be omitted.

The MS that has received the message 308-1 from the RS selected as the main route knows the RS selected as the main route from the main RSID within the message 308-1, and knows the RS selected as the sub route from the sub RSID within the message 308-1.

In Step 308-2, the MS that has received the message 308-1 saves the main RSID and the sub RSID within the message 308-1 in the memory unit.

In Step 308-3, the MS that has received the message 308-1 sets the data route to the RS selected as the main route, and uses the RS as the main route.

A case in which the main route and the sub route in the radio system using the relay system are set by the external device RSF is identical with a case in which the route selection process of the AGW in a call flow of FIG. 21a is conducted by the BS.

FIG. 21b illustrates one example of a call flow when the main route and the sub route in the radio system using the relay system are set by the external device RSF. In this example, the MS 6-1 in FIG. 2a initializes the main route and the sub route.

Steps 1 to 5 in FIG. 21b are identical with Steps 1 to 5 in FIG. 21a.

In Step 6 of FIG. 21b, the message 309 is transmitted from the AGW to the RSF, and all of information requested when the route is set by the gateway is transmitted to the RSF.

The setting of the main route and the sub route which is conducted by the RSF is identical with that in a sequence of setting the main route and the sub route, which is conducted by the gateway in FIG. 21a.

In Step 7 of FIG. 21b, messages 306-1 and 306-2 are transmitted from the RSF to the AGW.

Steps 8 to 10 in FIG. 21b are identical with Steps 6 to 8 in FIG. 21a.

FIG. 21c illustrates an example of the call flow when the main route and the sub route in the radio system using the relay system are set by the mobile station. In this example, the MS 6-1 of FIG. 2a initializes the main route and the sub route.

Steps 1 to 8 in FIG. 21c are identical with Steps 1 to 8 in FIG. 21a.

The MS acquires profile information (FIG. 23) on the RS of the available RSIDs by messages 305-1, 306-1, 307-1, and 308-1, or by another sequence.

The setting of the main route and the sub route which is conducted by the MS is identical with a sequence of setting the main route and the sub route which is conducted by the gateway in FIG. 21a.

In Step 9 of FIG. 21c, the RS that has received a message 307-2 from the MS knows that the subject RS is selected as the RS of the sub route of the MS, from the MSID and the sub RSID within the message. When there is no need to be aware that the RS is selected as the sub route, this message can be omitted.

3-3. Switching From Main Route to Sub Route

[One Example of Call Flow of Switching from Main Route to Sub Route in Radio System Using Relay System According to this Embodiment]

FIG. 28a illustrates one example of a call flow of switching from the main route to the sub route when the main route and the sub route in the radio system using the relay system are set by the gateway. It is conceivable that switching from the main route to the sub route occurs, for example, when the MS moves out of the radio communication range of the RS selected as the main route (FIG. 2b), or when the BS selected as the main route becomes unavailable (FIG. 2c)

Figure 2B:
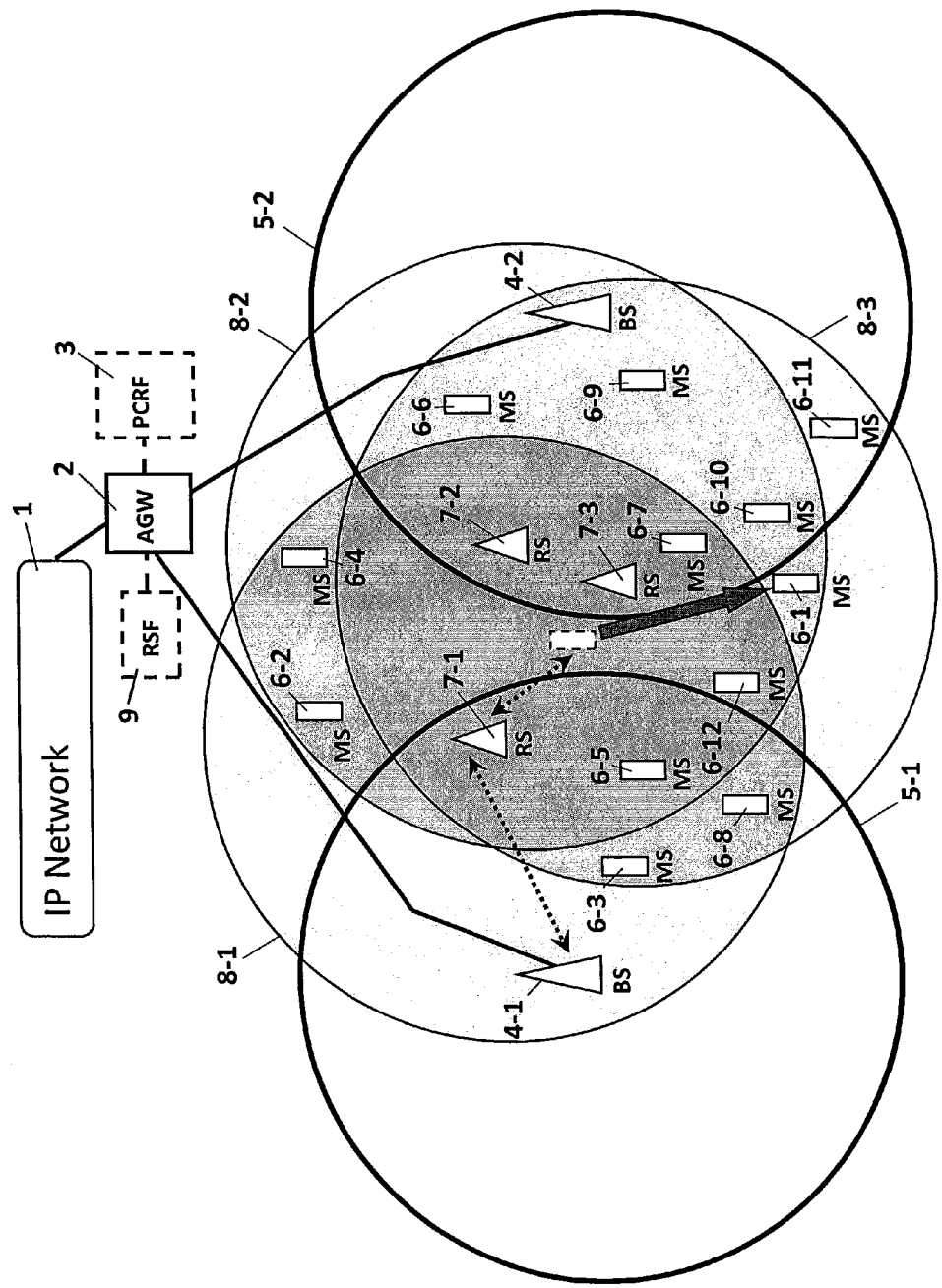
FIG. 2b illustrates an example of a mobile radio communication system using a relay system.

For example, a case in which the MS 6-1 in FIG. 2b is disconnected from the RS 7-1 used as the main route, the RS 7-2 selected as the sub route is connected as a new main route, and the RS 7-3 is selected as a new sub route will be exemplified.

In Step 400, the MS detects that there is a need to switch the data route from the main route to the sub route.

The MS that switches from the main route to the sub route extracts the RSID (sub RSID) of the RS already determined as the sub route from the memory unit, and transmits a message 401 including the MSID of the subject MS and the sub RSID to the RS corresponding to the sub RSID. When the route is set for each application, the MS includes the APLID in the message 401.

The RS that has received the message 401 from the MS transmits a message 402 to the BS.

The BS that has received the message 402 from the RS transmits a message 403 to the AGW.

The AGW that has received the message 403 from the RS knows that the MS requests switching from the main route to the sub route, from the MSID and the sub RSID included in the message 403. The AGW sets a value of the sub BSID to a new main BSID included in a message 404 as it is, and transmits the message 404 to the BS corresponding to the sub BSID included in the message 403. The AGW sets a data route to the BS corresponding to the sub BSID included in the message 403. The AGW transmits a message 407 immediately after transmission of the message 404. A procedure after transmission of the message 407 will be described later.

The BS that has received the message 404 from the AGW transmits a message 405 to the RS corresponding to the sub RSID within the message 404, and sets the data routes to the AGW and the RS.

The RS that has received the message 405 from the BS knows that the subject RS is selected as the main route of the MS, from the MSID and the new main RSID within the message 405. The RS newly selected as the main route sets the data route to the BS that has transmitted the message 405. Then, the RS transmits a message 406-1 to the MS corresponding to the MSID included in the message 405, and sets the data route to the MS.

The MS that has received the message 406-1 saves the new main RSID within the message 406-1 in the memory unit.

The MS that has received the message 406-1 sets the data route to the RS selected as the main route in Step 404-2, and uses that RS as the main route.

On the other hand, the AGW that has transmitted the message 404 transmits the message 407 to the PCRF. When the APLID is included in the message 403, the AGW includes the APLID within the message 403 in the message 407.

Also, if the policy information is different for each MS, the AGW includes the MSID within the message 403 in the message 407.

Also, if the parameter different for each RS such as P or M is included in the policy information, the AGW also includes all available RSIDs created on the basis of FIG. 22a within the memory unit in the message 407.

If the AGW has all of necessary policy information, the AGW can be advanced to Step 408-2 without transmitting the message 407.

The PCRF that has received the message 407 from the AGW extracts the corresponding policy information from the memory unit.

If the policy information is different for each MS, the PCRF extracts the corresponding policy information from the memory unit on the basis of the MSID included in the message 407.

Also, if the policy information is different for each application run by the MS, the PCRF extracts the corresponding policy information from the memory unit on the basis of the APLID included within the message 407.

The PCRF transmits a message 408-1 including the policy information extracted from the memory unit to the AGW.

The AGW that has received the message 408-1 from the PCRF creates FIG. 24 on the basis of FIG. 22a in Step 408-2, and selects the RS of a new sub route. When the quality is also taken into account for selection of the sub route, the AGW selects the RS of the sub route on the basis of FIGS. 24, 25, 26, and 27. A specific process of selecting the sub route will be described in detail with reference to a flowchart of FIG. 59a which will be described later.

In Step 408-3, the AGW updates FIG. 5a saved in the memory unit on the basis of the sub route selected in Step 408-2, and saves updated FIG. 5a in the memory unit.

The AGW includes the MSID of the MS that has requested the setting of the route and the RSID of the RS newly selected as the sub route in a message 409 as a new sub RSID on the basis of the sub route selected in Step 408-2, and transmits the message 409 to the BS corresponding to the RS newly selected as the sub route.

If the RS selected as the route is different for each application, the AGW transmits the message 409 including the APLID to the RS, and notifies the RS selected as the sub route what kind of application is used to select the RS as the route.

The BS that has received the message 409 from the AGW transmits a message 410 to the RS corresponding to the new sub RSID within the message 409.

The RS that has received the message 410 from the BS transmits a message 411 to the MS corresponding to the MSID within the message 410.

The MS that has received the message 411 from the RS newly selected as the sub route is notified of the RS newly selected as the sub route from the new sub RSID within the message 411.

The MS that has received the message 411 saves the new sub RSID within the message 411 in the memory unit.

When switching from the main route to the sub route in the radio system using the relay system is conducted by the base station, a call flow of switching from the main route to the sub route is identical with a case in which the route selection process conducted by the AGW in FIG. 28a is conducted by the BS.

FIG. 28b illustrates one example of a call flow of switching from the main route to the sub route when switching from the main route to the sub route in the radio system using the relay system is conducted by the external device RSF. In this example, the MS 6-1 in FIG. 2a is disconnected from the RS 7-1 used as the main route, the RS 7-2 selected as the sub route is connected as a new main route, and the RS 7-3 is selected as a new sub route.

Steps 1 to 3 in FIG. 28b are identical with Steps 1 to 3 in FIG. 28a.

Steps 4 and 5 in FIG. 28b are identical with Steps 7 and 8 in FIG. 28a.

Step 6 in FIG. 28b are identical with Step 6 in FIG. 21b.

In Step 7 of FIG. 28b, the message 404 is transmitted from the RSF to the AGW.

Steps 8 to 10 in FIG. 28b are identical with Steps 4 to 6 in FIG. 28a.

The setting of the new sub route which is conducted by the RSF is identical with a sequence of setting the new sub route which is conducted by the gateway in FIG. 28a.

In Step 11 of FIG. 28b, the message 409 is transmitted from the RSF to the AGW.

Steps 12 to 14 in FIG. 28b are identical with Steps 9 to 12 in FIG. 28a.

FIG. 28c illustrates one example of a call flow of switching from the main route to the sub route when switching from the main route to the sub route in the radio system using the relay system is conducted by the mobile station. In this example, the MS 6-1 in FIG. 2a is disconnected from the RS 7-1 used as the main route, the RS 7-2 selected as the sub route is connected as a new main route, and the RS 7-3 is selected as a new sub route.

Steps 1 to 3 in FIG. 28c are identical with Steps 1 to 3 in FIG. 28a.

Steps 4 and 5 in FIG. 28c are identical with Steps 7 and 8 in FIG. 28a.

Steps 6 to 8 in FIG. 28c are identical with Steps 4 to 6 in FIG. 28a.

The MS acquires profile information (FIG. 23) on the RS of available RSIDs by the messages 404, 405, and 406-1, or by another sequence.

The setting of the new sub route which is conducted by the MS is identical with a sequence of setting the new sub route which is conducted by the gateway in FIG. 28a.

In Step 9 of FIG. 28c, the RS that has received the message 411 from the MS knows that the subject RS is selected as the RS of the new sub route of the MS, from the MSID and the new sub RSID within the message. When there is no need to be aware that the RS is selected as the new sub route, this message can be omitted.

In Step 10 of FIG. 28c, the BS that has received the message 410 from the RS knows the RS selected as the new sub route of the MS, from the MSID and the new sub RSID within the message. When there is no need for the BS to be aware of the RS selected as the new sub route, this message can be omitted.

In Step 11 of FIG. 28c, the AGW that has received the message 410 from the BS knows the RS selected as the new sub route of the MS, from the MSID and the new sub RSID within the message. When there is no need for the AGW to be aware of the RS selected as the new sub route, this message can be omitted.

3-4. AGW 3-4-1. Hardware

[One Example of AGW According to this Embodiment]

FIG. 4a illustrates an example of a functional block diagram of the AGW used in this embodiment.

A network interface unit 21 is an interface with the network. The network interface unit 21 allows the AGW to transmit and receive an IP packet with respect to the IP network.

A BS interface unit 22 is an interface with the BS. The BS interface unit 22 allows the AGW to transmit and receive the IP packet with respect to the BS.

A PCRF interface unit 23 is an interface with the PCRF. The PCRF interface unit 23 allows the AGW to transmit and receive the IP packet with respect to the PCRF. In the case of architecture in which the policy information is set within the AGW, and the PCRF is omitted, the PCRF interface unit 23 can be omitted.

An RSF interface unit 24 is an interface with the RSF. The RSF interface unit 24 allows the AGW to transmit and receive the IP packet with respect to the RSF. In the case of architecture in which the main route and the sub route are selected by a node other than the RSF, the RSF interface unit 24 can be omitted.

A memory unit 25 manages information on an IP packet to be transmitted or received, RS profile ($r_{RSMax}$), MS profile ($r_{MS}$), QoS parameters (E, T, M, P), APLID, weight ($w_E$, $w_T$, $w_M$, $w_{QoS}$, $w_{rmain}$, $w_{rsub}$), and addresses of the PCRF 3 and the BS 4 to be connected in association with the MSID and the RSID selected as the main route and the sub route as the occasion demands.

A processor 26 conducts management of the information held in the memory unit 25, IP packet transmission and reception processing such as creation and analysis of the IP packet, and calculation based on an expression given in selecting the main route and the sub route. In the case of architecture in which the main route and the sub route are selected by a device other than the gateway, a processing function related to the selection of the main route and the sub route can be omitted.

[One Example of Information Held in Memory Unit of AGW According to this Embodiment]

FIG. 22a illustrates an example of the information held in the memory unit of the AGW according to this embodiment.

T111a (main RSID) is an identifier of the RS.

T112a (MSID) is an identifier of the MS that has already selected the RS having the RSID of the T111a as the main route.

T113a (sub RSID) is an identifier of the RS that has been already selected by the MS having the MSID of the T112a as the sub route. When the MS having the MSID of the T112a has no sub route, this column is blank.

T114a ($r_{MS}$) is an index of a radio resource amount requested by the MS having the MSID of the T112a. The T114a is notified the AGW of as information within the MS profile when the MS of the T112a sets the main route and the sub route, and the AGW saves the information in the memory unit.

T115a ($\Sigma r_{MSmain}$) is a total of the indexes of the radio resource amount requested by the MSs with respect to all of the MSs that have already selected the RS having the RSID of the T111a as the main route. The T115a is created by adding $r_{MS}$ of the T14a by the processor of the AGW with respect to the MS that selects the RS having the RSID of the T1la as the main route, and the AGW saves the information in the memory unit. When there is no MS that has already used the RS having the RSID of the T11a as the main route, T115a becomes 0.

T116a ($r_{RSmax}$) is an index of an upper limit of the radio resource amount that is acceptable by the RS having the RSID of the T111a. The T116a is notified the AGW of as information within the RS profile when the MS of the T112a sets the main route and the sub route, and the AGW saves the information in the memory unit. The T16a is notified the AGW of as information within the RS profile when the MS of the T12a sets the main route and the sub route, and the AGW saves the information in the memory unit.

T117a ($R_{rmain}$) is an evaluation index as the main route based on a residual radio resource amount of the RS having the RSID Of the T111a. The T117a is calculated according to a ratio of the T116a to the T115a, and the AGW saves the information in the memory unit. This shows that the larger a value of T117a is, the more room the residual radio resource amount of the RS has.

FIG. 25 illustrates an example of the information held by the memory unit of the AGW according to this embodiment.

T141 (MSID) is an identifier of the MS.

T142 (RSID) is a RSID of the RS communicatable with the MS having the MSID of the T141. The T142 is notified the AGW of when the MS having the MSID of the T141 sets the main route and the sub route, and the AGW saves the information in the memory unit.

T143 ($E_{RS}$) is an effective data transfer rate between the MS and the RS and the BS. The T143 is received by the AGW when the MS having the MSID of the T141 sets the main route and the sub route, or when the RS notifies the AGW of the RS profile, and the AGW saves the information in the memory unit.

T144 ($T_{RS}$) is a residual communicatable time of the RS. The T144 is notified the AGW of as information within the RS profile when the MS having the MSID of the T141 sets the main route and the sub route, and the AGW saves the information in the memory unit. The T144 can be omitted when the communicatable time is not set for the RS.

T145 ($M_{RS}$) is a mobility of the RS, and a value indicative of modes of the RS such that the RS is fixed, nomadic, portable, or mobile. The T145 is notified the AGW of as information within the RS profile when the MS having the MSID of the T141 sets the main route and the sub route, distributed as the policy information from the PCRF, or included in the policy information set within the AGW, and the AGW saves the information in the memory unit. If the mode of the RS is uniquely determined, the T145 may be omitted.

T146 ($P_{RS}$) is a priority of the RS. If the priority of the RS possessed by, for example, police or fire is set to be low, the RS can be prevented from being used as a data route of a third party. Also, for example, when a high priority is set for a given RS, incentive can be given so that the RS becomes the data route of the third party. The T146 is notified the AGW of as information within the RS profile when the MS having the MSID of the T141 sets the main route and the sub route, distributed as the policy information from the PCRF, or included in the policy information set within the AGW, and the AGW saves the information in the memory unit. If the quality is not taken into account for selection of the main route and the sub route, FIG. 25 can be omitted.

FIG. 26 illustrates an example of the information held by the memory unit of the AGW according to this embodiment. T151 (MSID) is an identifier of the MS. When T153 ($w_{ERS}$), T154 ($w_{TRS}$), and T155 ($w_{MRS}$) which are parameters of the weight are not changed depending on the MS, the T151 can be omitted.

T152 (APLID) is an identifier of an application to be executed by the route. When the T153 ($w_{ERS}$), the T154 ($w_{TRS}$) and the T155 ($w_{MRS}$) which are parameters of the weight are not changed depending on the type of the application, the T152 can be omitted.

T153 ($w_{ERS}$) is a parameter of the weight for the effective data transfer rate E between the MS and the RS and the BS.

T154 ($w_{TRS}$) is a parameter of the weight for a communicatable time T of the RS.

T155 ($w_{MRS}$) is a parameter of the weight for the mobility M of the RS.

The T153, the T154, and the T155 are distributed as the policy information from the PCRF when the MS having the MSID of the T151 sets the main route and the sub route, or included in the policy information set within the AGW, and the AGW saves the information in the memory unit.

FIG. 27 illustrates an example of the information held by the memory unit of the AGW according to this embodiment.

T161 (MSID) is an identifier of the MS. If T163 ($w_{QoS}$), T164 ($w_{rmain}$), and T165 ($w_{rsub}$) which are parameters of the weight are not changed depending on the MS, the T161 can be omitted.

T162 (APLID) is an identifier of an application to be executed by the route. If T163 ($w_{QoS}$), T164 ($w_{rmain}$) and T165 ($w_{rsub}$) which are parameters of the weight are not changed depending on the type of the application, the T162 can be omitted.

T163 ($w_{QoS}$) is a parameter of the weight for an evaluation index $R_{QoS}$ of the route based on the quality.

T164 ($w_{rmain}$) is a parameter of the weight for an evaluation index $R_{rmain}$ of the main route based on the residual radio resource amount of the base station.

T165 ($w_{rsub}$) is a parameter of the weight for an evaluation index $R_{rsub}$ of the sub route based on the residual radio resource amount of the base station.

The T163, the T164, and the T165 are distributed as the policy information from the PCRF when the MS having the MSID of the T161 sets the main route and the sub route, or included in the policy information set within the AGW, and the AGW saves the information in the memory unit.

When the main route and the sub route are set by a device other than the gateway, the information on FIGS. 22a, 25, 26, and 27 is omitted.

3-4-2. Setting of Main Route and Sub Route
[One Example of Processing of AGW According to this Embodiment]

Figure 59A:
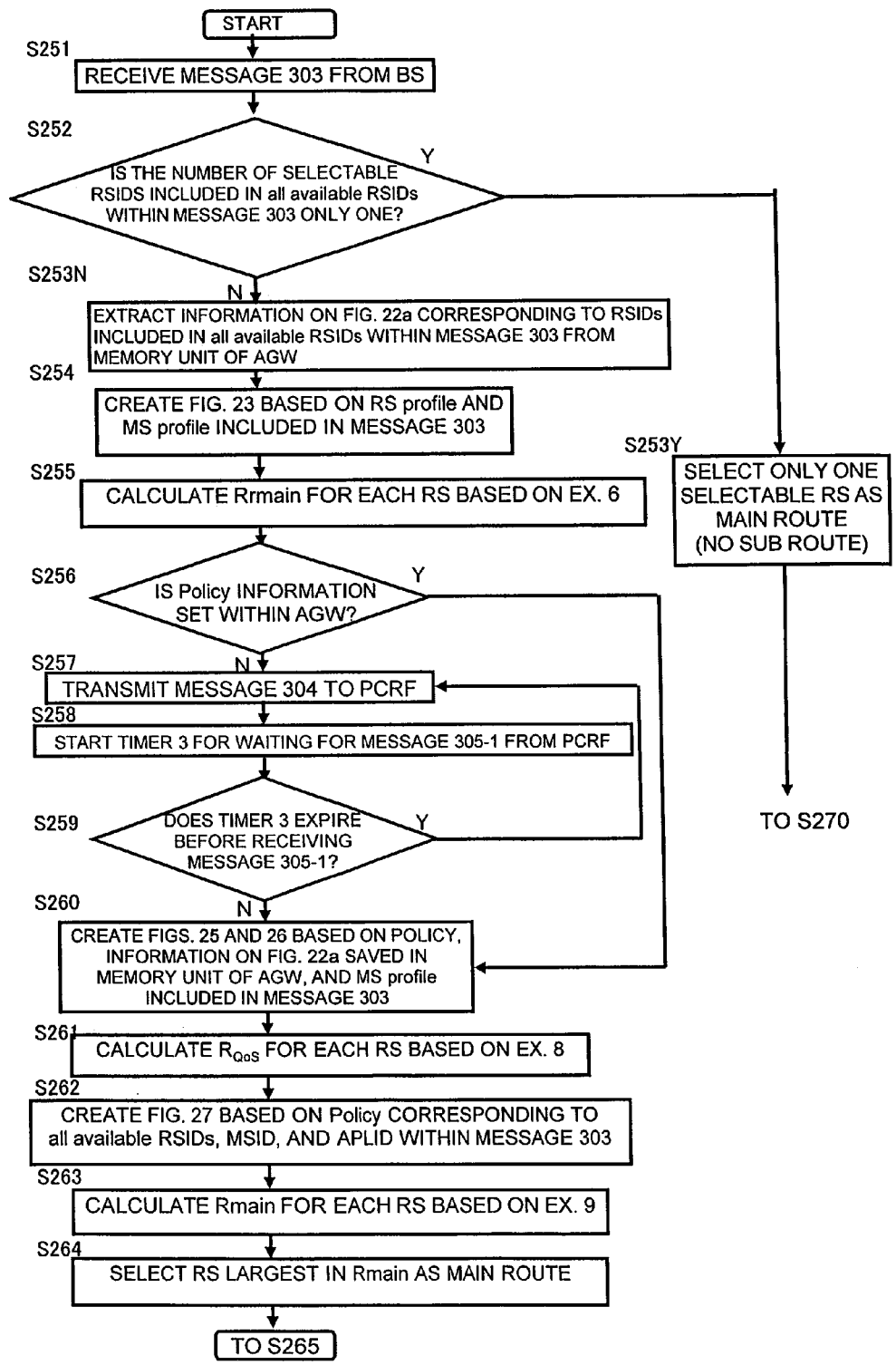
FIG. 59*a* illustrates an example of processing conducted by the gateway in setting the main route and the sub route in the case of the relay system.
Figure 59A:
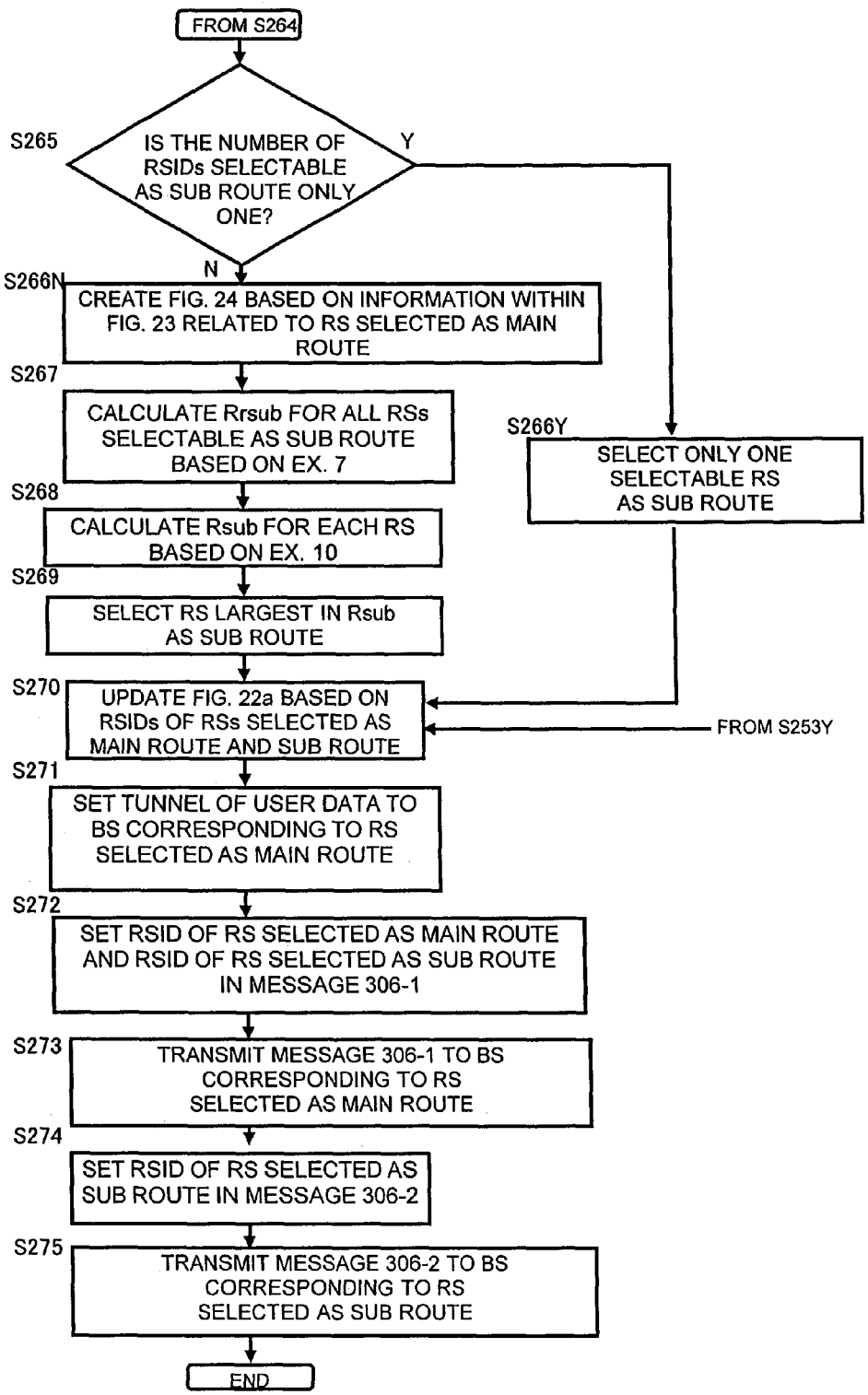

FIG. 59a illustrates an example of processing of the AGW in setting the main route and the sub route of the radio system.

In S251, the AGW receives the message 303 from the BS.

In S252, the AGW confirms the number of RSIDs selectable as the route included in all available RSIDs within the message 303.

If the number of RSIDs selectable as the route is one, in S253Y, the AGW selects only one selectable RS as the main route, selects no sub route, and is advanced to S270.

On the other hand, if the number of RSIDs selectable as the route is two or more, in S253N, the AGW extracts information on the RS corresponding to the RSID selectable as the route included in all available RSIDs within the message 303 from FIG. 22a saved in the memory unit. If there is no information on the corresponding RS within FIG. 22a, the AGW requests the RS that has transmitted the message 303 to transmit its own RS profile.

In S254, the AGW creates FIG. 23 on the basis of the information included in the RS profile of the RS extracted from the memory unit, and the information included in the MS profile within the message 303.

T121 (main RSID) is a RSID of the RS selectable as the main route, and included in all available RSIDs within the message 303.

T122 (MSID) is an MSID of the MS that has already used the RS having the RSID of the T121 as the main route, and included in the information on the RS which is extracted by the AGW from FIG. 22a saved in the memory unit of the AGW. If there is no MS that has already used the RS having the RSID of the T121 as the main route, the T122 is blank.

T123 (sub RSID) is a RSID of the RS selected as the sub route by the MS having the MSID of the T122, and included in the information on the RS extracted from the memory unit. If the MS having the MSID of the T122 has no sub route as with the MS 6-11, the T123 is blank.

T124 ($r_{MS}$) is an index of the radio resource amount requested by the MS having the MSID of the T122, and included in the information on the RS which is extracted by the AGW from FIG. 22a saved in the memory unit of the AGW.

T125 ($\Sigma r_{MSmain}$) is a total of the indexes of the radio resource amount requested by the MSs with respect to all of the MSs that have already selected the RS having the RSID of the T121 as the main route, and included in the information on the RS which is extracted by the AGW from FIG. 22a saved in the memory unit of the AGW.

T126 ($r_{RSmax}$) is an index of an upper limit of the radio resource amount that is acceptable by the RS having the RSID of the T121, and created by the AGW on the basis of the information on the RS which is extracted by the AGW from FIG. 22a saved in the memory unit of the AGW.

T127 ($R_{rmain}$) is an evaluation index as the main route based on the residual radio resource amount of the RS having the RSID of the T121. The T127 is calculated on the basis of Expression 6 in S255, by the aid of T125, T126, and T128 ($r_{MSnew}$) and the AGW saves the information in the memory unit. This shows that the larger a value of T127 is, the more room the residual radio resource amount of the RS has.

T128 ($r_{MSnew}$) is an index of the radio resource amount requested by the MS that requests the route setting, and included in the MS profile within the message 102.

In S255, the AGW assigns values in FIG. 23 to the respective parameters of Expression 6, and calculates the evaluation index $(R_{rmain})_n$ of the main route based on the residual resource amount of the RS with respect to all of the RSs having the RSID of the T121 in FIG. 23. The AGW may store the calculated values in FIG. 23 as the occasion demands.

$$(R_{rmain})_n = (r_{RSmax})/\{(\Sigma r_{MSmain})_n + r_{MSnew}\} \quad \text{(Ex. 6)}$$

In Expression 6, n is an index of the route.

$(R_{rmain})_n$ is an evaluation of the main route based on the residual resources of the RS, and shows that the larger the value is, the more room the residual resource of the RS has.

$(r_{RSmax})_n$ is an index of an upper limit of the radio resource amount acceptable by the RS, and depends on the performance of the RS per se. $r_{MSnew}$ is an index of the radio resource amount requested by the MS that requests the route setting.

$(\Sigma r_{MSmain})_n$ represents a total of the indexes of the radio resource amount requested by the MS with respect to all of the MSs that have already used the RS as the main route. Also, as the information in the memory unit of the AGW, a lower limit of $(R_{rmain})_n$ can be set.

If the lower limit of $(R_{rmain})_n$ is set for the AGW, the AGW can exclude the routes whose $(R_{rmain})_n$ is lower than the lower limit from the routes to be selected, or request a change in the sub route or the main route from the MS that has already selected the RS as the main route or the sub route.

If the quality is also taken into account for selection of the main route, in S256, the AGW determines whether Policy corresponding to the RS is set in the memory unit, or not. If the Policy corresponding to the RS is not set in the memory unit of the AGW, in Step S257, the AGW transmits the message 304 to the PCRF, and requests the PCRF to transmit the Policy of the RS.

In S258, the AGW starts a timer 3, and waits until the message 305-1 including the Policy of the RS is transmitted from the PCRF.

In S259, if the timer 3 expires before the AGW receives the message 305-1 from the PCRF, the AGW again returns to S257, and retransmits the message 304 to the PCRF.

If the AGW receives the message 305-1 from the PCRF before the timer 3 expires, the AGW creates FIGS. 25 and 26 on the basis of the Policy of the RS included within the message 305-1, the information included in the RS profile of the RS which is extracted from the memory unit, and the information included in the MS profile within the message 102.

On the other hand, if the Policy corresponding to the RS is set within the memory unit of the AGW, S257 to S259 are omitted. In S260, the AGW creates FIGS. 25 and 26 on the basis of the Policy of the RS extracted from the memory unit, the information included in the RS profile of the RS which is extracted from the memory unit, and the information included in the MS profile within the message 303. If FIGS. 25 and 26 have been already saved in the memory of the AGW, S260 can be omitted.

Also, if the quality is not taken into account for selection of the main route, S256 to S264 are omitted, and the RS whose $(R_{main})_n$ is the largest may be selected as the main route.

In S261, the AGW assigns values in FIGS. 25 and 26 to the respective parameters of Expression 8, and calculates the evaluation index $(R_{QoS})_n$ of the route based on the quality with respect to all of the RSs having the RSID of the T121 in FIG. 23. The AGW may store the calculated values in FIG. 23 as the occasion demands.

$$(R_{QoS})_n = P_{RSn}(w_{ERS}E_{RSn} + w_{TRS}T_{RSn} + w_{MRS}M_{RSn}) \quad \text{(Ex. 8)}$$

In Expression 8, n is an index of the route.

$(R_{QoS})_n$ is an evaluation based on the quality of the route, and shows that the quality of the route is higher as the value is larger.

$P_{RSn}$ represents the policy information (weight related to the use of the RS) indicative of the priority by which the RS is selected as the data route, and the priority can be made higher by making the value larger.

$E_{RSn}$ represents an effective data transfer rate from the MS to the BS through the RS. The $E_{RSn}$ depends on the radio signal reception intensity of the MS or the like.

$T_{RSn}$ is a communicatable time of the RS. The $T_{RSn}$ depends on a battery charge of the RS or service contract detail of the RS or the like.

$M_{RSn}$ is the mobility of the RS. The $M_{RSn}$ depends on whether the RS is fixed or movable or the like.

$w_{ERS}$ is a parameter of the weight for the $E_{RSn}$.
$w_{TRS}$ is a parameter of the weight for the $T_{RSn}$.
$w_{MRS}$ is a parameter of the weight for the $M_{RSn}$.

Also, the $T_{RSn}$ can be omitted if the communicatable time is not set in the RS, and the $M_{RSn}$ can be omitted if the RS is not movable.

In S262, the AGW creates FIG. 27 on the basis of the Policy of the RS extracted from the memory unit. If FIG. 27 has been already saved in the memory unit of the AGW, S262 can be omitted.

In S263, the AGW assigns values of FIGS. 22a, 25, and 27 to the respective parameters of Expression 4, and calculates an overall evaluation index $(R_{main})_n$ of the main route based on the residual resource amount of the RS and the quality of the route with respect to all of the RSs having the RSID of the T121 in FIG. 23. The AGW may store the calculated values in FIG. 23 as the occasion demands.

$$(R_{main})_n = (P_{main})_n(w_{QoS}(R_{QoS})_n + w_{rmain}(R_{rmain})_n) \quad \text{(Ex. 9)}$$

In Expression 9, n is an index of the route.

$(R_{main})_n$ is an overall evaluation of the main route based on the quality of the route and the residual resource amount of the RS.

$(P_{main})_n$ is the policy information (weight related to the use of the RS) indicative of the priority by which the RS is selected as the main route, and the priority can be made higher by making the value larger.

$(R_{QoS})_n$ is an evaluation of the route based on the quality of the route, and shows that the quality of the route is higher as the value is larger.

$(R_{rmain})_n$ is an evaluation of the main route based on the residual resource of the RS, and shows that the larger the value is, the more room the residual resource of the RS has.

$w_{QoS}$ is a parameter of the weight for $(R_{QoS})_n$.
$w_{rmain}$ is a parameter of the weight for $(R_{rmain})_n$.

In S264, the AGW selects the RS whose overall evaluation index $(R_{main})_n$ of the main route calculated in S263 is the largest as the main route.

Also, as the information in the memory unit of the AGW, a lower limit of the evaluation index $(R_{rmain})_n$ of the main route based on the residual resource index of the RS can be set. When the lower limit of $(R_{rmain})_n$ is set in the AGW, if $(R_{rmain})_n$ of the RS selected as the main route is lower than the lower limit, the AGW can refuse the setting of the main route, or request a change in the sub route or the main route from the MS that has already selected the RS as the sub route or the main route.

In S265, the AGW confirms the number of RSs as the residual sub route candidates obtained by excluding the RS selected as the main route from the RSs having the RSID of the T121 in FIG. 23. When the number of RSIDs selectable as the sub route is one, in S266Y, the AGW selects only one selectable RS as the sub route, and is advanced to S270.

On the other hand, if the number of RSIDs selectable as the sub route is two or more, in S266N, the AGW extracts information on the RS selected as the main route from FIG. 23, and creates FIG. 24 on the basis of the extracted information of the RS, and the information included in the MS profile within the message 303. FIG. 24 illustrates an example in which the RS7-1 is selected as the main route.

T131 (main RSID) is a RSID selected as the main route.

T132 (sub RSID) is an RSID of the RS selectable as the sub route, and created by the AGW with reference to all of the RSIDs except for the RS selected as the main route in S264 among the RSIDs of the RSs selectable as the main route in the T121 of FIG. 23.

T133 ($\Sigma r_{MSmain}$) is a total of the indexes of the radio resource amount requested by the MSs with respect to all of the MSs that have already selected the RS having the RSID of the T131 as the main route. When there is no MS that has already selected the RS having the RSID of the T131 as the main route, T133 becomes 0.

T134 ($\Sigma r_{MSsub}$) is a total of indexes of the radio resource amount requested by the MS with respect to all of the MSs that have already selected the RS having the RSID of the T131 as the main route, and already selected the RS having the RSID of the T132 as the sub route. The T134 is created by adding $r_{MS}$ of T14 in FIG. 5a by the processor of the AGW with respect to the MSs that have selected the RS having the RSID of the T131 as the main route, and already selected the RS having the RSID of the T132 as the sub route. If there is no MS that has already selected the RS having the RSID of the T131 as the main route, and already selected the RS having the RSID of the T132 as the sub route, the T134 becomes 0.

T135 ($r_{RSmax}$) is an index of an upper limit of the radio resource amount acceptable by the RS having the RSID of the T132.

T136 ($R_{rsub}$) is an evaluation index as the sub route based on the residual radio resource amount of the RS having the RSID of the T132. The T136 is calculated on the basis of Expression 7 in S267, by the aid of the T133, T134, T135, and T137 ($r_{MSnew}$) and the AGW saves the information in the memory unit. This shows that the larger the value of the T136 is, the more room the residual resource amount of the RS has.

T137 ($r_{MSnew}$) is an index of the radio resource amount requested by the MS that has requested the route setting, and included in the MS profile within the message 102.

In S267, the AGW assigns values of FIG. 24 to the respective parameters of Expression 7, and calculates an evaluation index $(R_{rsub})_n$ of the sub route based on the residual resource amount of the RS with respect to all of the RSs having the RSID of the T132 in FIG. 24. The AGW may store the calculated values in FIG. 24 as the occasion demands.

$$(R_{rsub})_n = (r_{RSmax})_n / \{(\Sigma r_{MSmain})_n + (\Sigma r_{MSsub})_n + r_{MSnew}\} \quad \text{(Ex. 7)}$$

In Expression 7, n is an index of the route.

$(R_{rsub})_n$ is an evaluation of the sub route based on the residual resource of the RS, and shows that the larger the value is, the more room the residual resource of the RS has when the RS of the main route is unavailable.

$(r_{Rsmax})_n$ is an index of the upper limit of the radio resource amount acceptable by the RS, and depends on the performance of the RS per se. $r_{MSnew}$ is an index of the radio resource amount requested by the MS that has requested the route setting.

$(\Sigma r_{MSmain})_n$ is a total of the indexes of the radio resource amount requested by the MSs with respect to all of the MSs that have already used the RS as the main route.

$(\Sigma r_{MSsub})_n$ is a total of the indexes of the radio resource amount requested by the MSs with respect to all of the MSs that have already used the RS as the main route selected as the main route by the MS that has made a route setting request, and also already selected the RS as the sub route.

Also, as the information in the memory unit of the AGW, a lower limit of $(R_{rsub})_n$ Can be set. If the lower limit of $(R_{rsub})_n$ is set for the AGW, the AGW can exclude the routes whose $(R_{rsub})_n$ is lower than the lower limit from the routes to be selected, or request a change in the sub route or the main route from the MS that has already selected the RS as the main route or the sub route.

When the quality is taken into account for selection of the sub route, in S268, the AGW assigns the calculation results of S261 and S267 and the values of FIG. 27 to the respective parameters of Expression 10, and calculates the overall evaluation index $(R_{sub})_n$ of the sub route based on the residual resource amount of the RS and the quality of the route with respect to all of the RSs having the RSID of the T132 in FIG. 24. The AGW may store the calculated values in FIG. 24 as the occasion demands.

$$(R_{sub})_n = (P_{sub})_n (w_{QoS}(R_{QoS})_n + w_{rsub}(R_{rsub})_n) \quad \text{(Ex. 10)}$$

In Expression 10, n is an index of the route.

$(R_{sub})_n$ is an overall evaluation of the sub route based on the quality of the route and the residual resource amount of the RS.

$(P_{sub})_n$ is the policy information (weight related to the use of the RS) indicative of the priority by which the RS is selected as the sub route, and the priority can be made higher by making the value larger.

$(R_{QoS})_n$ is an evaluation of the route based on the quality of the route, and shows that the quality of the route is higher as the value is larger.

$(R_{rsub})_n$ is an evaluation of the main route based on the residual resource of the RS, and shows that the larger the value is, the more room the residual resource of the RS has.

$w_{QoS}$ is a parameter of the weight for $(R_{QoS})_n$.

$w_{rsub}$ is a parameter of the weight for $(R_{sub})$.

When the quality is not taken into account for selection of the sub route, S268 to S269 are omitted, and the RS whose $(R_{rsub})_n$ is the largest may be selected as the sub route.

In S269, the AGW selects the RS whose overall evaluation index $(R_{sub})_n$ calculated in S268 is the largest as the sub route.

Also, as the information in the memory unit of the AGW, a lower limit of the evaluation index $(R_{rsub})_n$ of the sub route based on the residual resource index of the RS can be set. When the lower limit of $(R_{rsub})_n$ is set in the AGW, if $(R_{rsub})_n$ of the RS selected as the sub route is lower than the lower limit, the AGW can refuse the setting of the sub route, or request a change in the sub route or the main route from the MS that has already selected the RS as the sub route or the main route.

In S270, the AGW updates FIG. 5a on the basis of the RSIDs of the RSs selected as the main route and the sub route. Updated FIG. 22a is illustrated, for example, in FIG. 22b.

In S271, the AGW sets a tunnel of user data between the AGW and the BS corresponding to the RS selected as the main route.

In S272, the AGW sets the RSID of the RS selected as the main route and the RSID of the RS selected as the sub route in the message 306-1.

In S273, the AGW transmits the message 306-1 to the BS corresponding to the RS selected as the main route.

In S274, the AGW sets the RSID of the RS selected as the sub route in the message 306-2.

In S275, the AGW transmits the message 306-2 to the BS corresponding to the RS selected as the sub route.

When the main route and the sub route are set by a device other than the gateway, processing related to the route selection is omitted.

3-4-3. Switching from Main Route to Sub Route

Figure 60A:
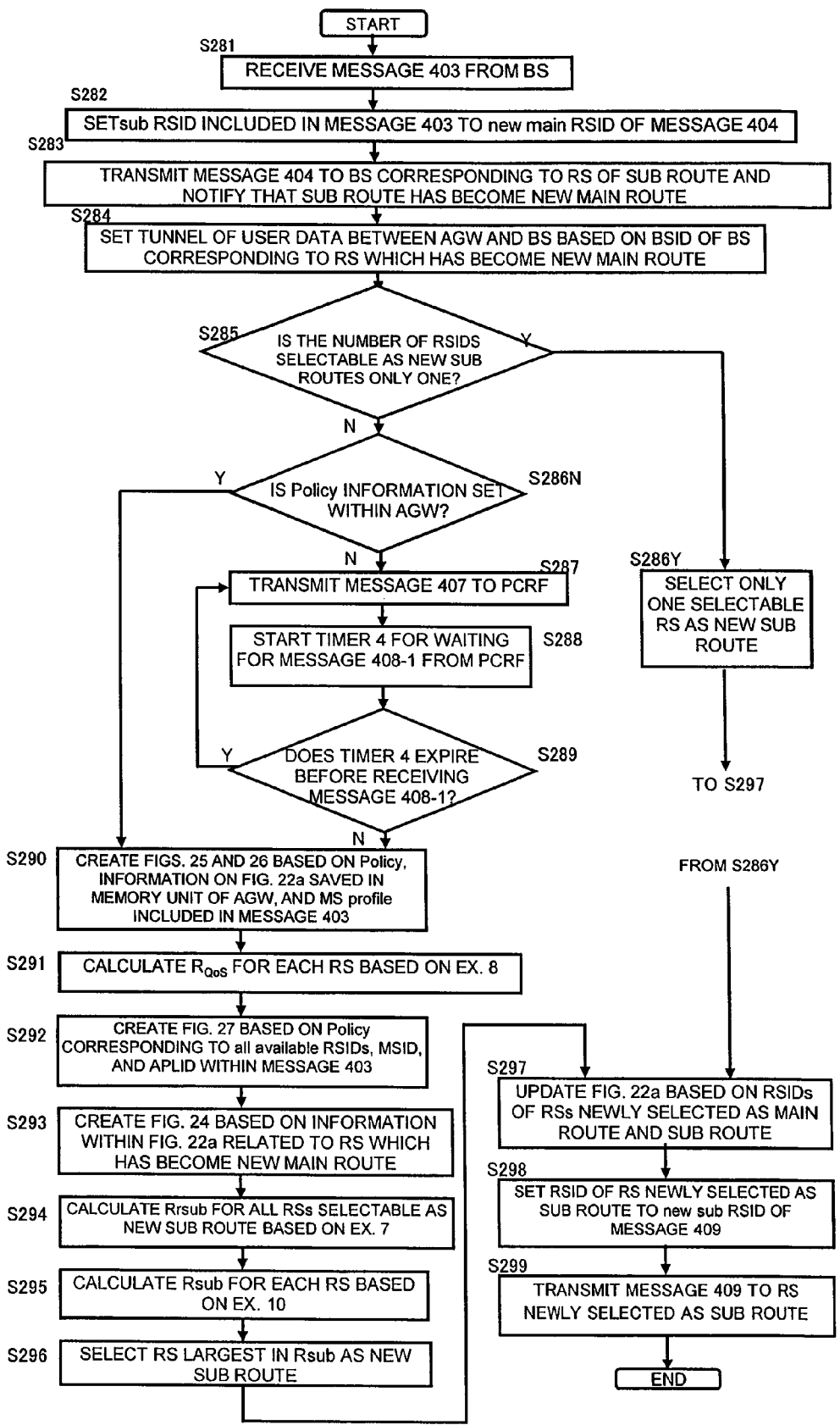
FIG. 60*a* illustrates an example of processing conducted by the gateway in switching from the main route to the sub route in the case of the relay system.

FIG. 60a illustrates an example of processing of the AGW in switching from the main route to the sub route in the radio system.

In S281, the AGW receives the message 403 from the BS. The AGW that has received the message 403 from the BS knows that the MS requests switching from the main route to the sub route, from the MSID and the sub RSID included in the message 403.

In S282, the AGW sets a value of the sub RSID to the new main RSID included in the message 404 as it is.

In S283, the AGW transmits the message 404 to the BS corresponding to the RS having the sub RSID included in the message 403.

In S284, the AGW sets the data route to the BS corresponding to the RS having the sub RSID included in the message 403.

In S285, the AGW confirms the number of RSs that are candidates for a new sub route with respect to the MS having the MSID included in the message 403 on the basis of FIG. 22a. If the number of RSIDs selectable as the new sub route is one, in S286Y, the AGW selects only one selectable RS as the sub route, and is advanced to S297.

On the other hand, if the number of RSIDs selectable as the new sub route is two or more, the AGW is advanced to S286N.

When the quality is also taken into account for selection of the new sub route, in S286N, the AGW determines whether the Policy corresponding to the RS is set in the memory unit, or not.

If the Policy corresponding to the RS is not set within the memory unit of the AGW, in S287, the AGW transmits the message 407 to the PCRF, and requests the PCRF to transmit the Policy of the RS.

On the other hand, if the Policy corresponding to the RS is set within the memory unit of the AGW, S287 to S289 are omitted, and the AGW creates FIGS. 25 and 26 on the basis of the Policy of the RS extracted from the memory unit, the information included in the RS profile of the RS extracted from the memory unit, and the information included in the MS profile within the message 403. When FIGS. 25 and 26 have been already saved in the memory of the AGW, S290 can be omitted.

Also, if the quality is not taken into account for selection of the main route, S286 to S292 are omitted, and the RS whose $(R_{rsub})_n$ is the largest may be selected as a new sub route.

In S288, the AGW starts a timer 4, and waits until the message 408-1 including the Policy of the RS is transmitted from the PCRF.

In S289, if the timer 4 expires before the AGW receives the message 408-1 from the PCRF, the AGW again returns to S287, and retransmits the message 407 to the PCRF.

In S290, if the AGW receives the message 408-1 from the PCRF before the timer 4 expires, the AGW creates FIGS. 25 and 26 on the basis of the Policy of the RS included within the message 408-1, the information included in the RS profile of the RS which is extracted from the memory unit, and the information included in the MS profile within the message 403.

In S291, the AGW assigns values of FIGS. 25 and 26 to the respective parameters of Expression 8, and calculates the evaluation index $(R_{QoS})_n$ of the route based on the quality with respect to all of the RSs having the RSID of the T121 in FIG. 23.

$$(R_{QoS})_n = P_{RSn}(w_{ERS}E_{RSn} + w_{TRS}T_{RSn} + w_{MRS}M_{RSn}) \quad \text{(Ex. 8)}$$

In Expression 8, n is an index of the route.

$(R_{QoS})_n$ is an evaluation based on the quality of the route, and shows that the quality of the route is higher as the value is larger.

$P_{RSn}$ represents the policy information (weight related to the use of the RS) indicative of the priority by which the RS is selected as the data route, and the priority can be made higher by making the value larger.

$E_{RSn}$ represents an effective data transfer rate between the MS and the RS. The $E_{RSn}$ depends on the radio signal reception intensity of the MS or the like.

$T_{RSn}$ is a communicatable time of the RS. The $T_{RSn}$ depends on a battery charge of the RS or service contract detail of the RS or the like.

$M_{RSn}$ is the mobility of the RS. The $M_{RSn}$ depends on whether the RS is fixed or movable or the like.

$w_{ERS}$ is a parameter of the weight for the $E_{RSn}$.
$w_{TRS}$ is a parameter of the weight for the $T_{RSn}$.
$w_{MRS}$ is a parameter of the weight for the $M_{RSn}$.

Also, the $T_{RSn}$ can be omitted if the communicatable time is not set in the RS, and the $M_{RSn}$ can be omitted if the RS is not movable.

In S292, the AGW creates FIG. 27 on the basis of the Policy of the RS extracted from the memory unit. If FIG. 27 has been already saved in the memory unit of the AGW, S292 can be omitted.

In S293, the AGW extracts the information on the RS newly selected as the main route from FIG. 22a, and creates FIG. 24 on the basis of the extracted information on the RS and the information included in the MS profile within the message 202. In this example, the RS7-2 is selected as the new main route whereas FIG. 24 illustrates an example in which the RS7-1 is selected as the main route, which is different from each other.

T131 (main RSID) is the RSID selected as the main route.

T132 (sub RSID) is the RSID of the RS selectable as the sub route, and created by the AGW with reference to all of the RSIDs except for the RS selected as the main route in S264 among the RSIDs of the RSs selectable as the main route in the T121 of FIG. 6.

T133 ($\Sigma r_{MSmain}$) is a total of the indexes of the radio resource amount requested by the MSs with respect to all of the MSs that have already selected the RS having the RSID of the T131 as the main route. When there is no MS that has already selected the RS having the RSID of the T131 as the main route, T133 becomes 0.

T134 ($\Sigma r_{MSsub}$) is a total of indexes of the radio resource amount requested by the MS with respect to all of the MSs that have already selected the RS having the RSID of the T131 as the main route, and already selected the RS having the RSID of the T132 as the sub route. The T134 is created by adding $r_{MS}$ of T14 in FIG. 5a by the processor of the AGW with respect to the MSs that have selected the RS having the RSID of the T131 as the main route, and already selected the RS having the RSID of the T132 as the sub route. If there is no MS that has already selected the RS having the RSID of the T131 as the main route, and already selected the RS having the RSID of the T132 as the sub route, the T134 becomes 0.

T135 ($r_{RSmax}$) is an index of an upper limit of the radio resource amount acceptable by the RS having the RSID of the T132.

T136 ($R_{rsub}$) is an evaluation index as the sub route based on the residual radio resource amount of the RS having the RSID of the T132. The T136 is calculated on the basis of Expression 2 in S294, by the aid of the T133, T134, T135, and T137 ($r_{MSnew}$) and the AGW saves the information in the memory unit. This shows that the larger the value of T136 is, the more room the residual radio resource amount of the RS has.

T137 ($r_{MSnew}$) is an index of the radio resource amount requested by the MS that has requested the route setting, and included in the MS profile within the message 202.

In S294, the AGW assigns values of FIG. 24 to the respective parameters of Expression 7, and calculates an evaluation index $(R_{rsub})_n$ of the sub route based on the residual resource amount of the RS with respect to all of the RSs having the RSID of the T132 in FIG. 7. The AGW may store the calculated values in FIG. 24 as the occasion demands.

$$(R_{rsub})_n = (r_{RSmax})_n / \{(\Sigma r_{MSmain})_n + (\Sigma r_{MSsub})_n + r_{MSnew}\} \quad \text{(Ex. 7)}$$

In Expression 7, n is an index of the route.

$(R_{rsub})_n$ is an evaluation of the sub route based on the residual resource of the RS, and shows that the larger the value is, the more room the residual resource of the RS has when the RS of the main route is unavailable.

$(r_{RSmax})_n$ is an index of the upper limit of the radio resource amount acceptable by the RS, and depends on the performance of the RS per se. $r_{MSnew}$ is an index of the radio resource amount requested by the MS that has requested the route setting.

$(\Sigma r_{MSmain})_n$ is a total of the indexes of the radio resource amount requested by the MSs with respect to all of the MSs that have already used the RS as the main route.

$(\Sigma r_{MSsub})_n$ is a total of the indexes of the radio resource amount requested by the MSs with respect to all of the MSs that have already used the RS as the main route selected as the main route by the MS that has made a route setting request, and also already selected the RS as the sub route.

Also, as the information in the memory unit of the AGW, a lower limit of $(R_{rsub})_n$ can be set. If the lower limit of $(R_{rsub})_n$ is set for the AGW, the AGW can exclude the routes whose $(R_{rsub})_n$ is lower than the lower limit from the routes to be selected, or request a change in the sub route or the main route from the MS that has already selected the RS as the main route or the sub route.

When the quality is also taken into account for selection of the sub route, in S295, the AGW assigns the values of FIG. 7 and the calculation results of S294 to the respective parameters of Expression 10, and calculates the overall evaluation index $(R_{sub})_n$ of the sub route based on the residual resource amount of the RS and the quality of the route with respect to all of the RSs having the RSID of the T132 in FIG. 24. The AGW may store the calculated values in FIG. 24 as the occasion demands.

$$(R_{sub})_n = (P_{sub})_n (w_{QoS}(R_{QoS})_n + w_{rsub}(R_{rsub})_n) \quad \text{(Ex. 10)}$$

In Expression 10, n is an index of the route.

$(R_{sub})_n$ is an overall evaluation of the main route based on the quality of the route and the residual resource amount of the RS.

$(P_{sub})_n$ is the policy information (weight related to the use of the RS) indicative of the priority by which the RS is selected as the sub route, and the priority can be made higher by making the value larger.

$(R_{QoS})_n$ is an evaluation of the route based on the quality of the route, and shows that the quality of the route is higher as the value is larger.

$(R_{rsub})_n$ is an evaluation of the sub route based on the residual resource of the RS, and shows that the larger the value is, the more room the residual resource of the RS has.

$w_{QoS}$ is a parameter of the weight for $(R_{QoS})_n$.

$w_{rsub}$ is a parameter of the weight for $(R_{rsub})_n$.

When the quality is not taken into account for selection of the sub route, S295 to S296 are omitted, and the RS whose $(R_{rsub})_n$ is the largest may be selected as the sub route.

In S296, the AGW selects the RS whose overall evaluation index $(R_{sub})_n$ of the sub route calculated in S295 is the largest as the sub route.

Also, as the information in the memory unit of the AGW, a lower limit of the evaluation index $(R_{rsub})_n$ of the sub route based on the residual resource index of the RS can be set. When the lower limit of $(R_{rsub})_n$ is set in the AGW, if $(R_{rsub})_n$ of the RS selected as the sub route is lower than the lower limit, the AGW can refuse the setting of the sub route, or request a change in the sub route or the main route from the MS that has already selected the RS as the sub route or the main route.

In S297, the AGW updates FIG. 5a on the basis of the RSIDs of the RSs newly selected as the main route and the sub route. Updated FIG. 22a is illustrated, for example, in FIG. 22b. However, the example of the call flow for switching is different from the example illustrated in FIG. 22b.

In S298, the AGW sets the MSID of the MS that has requested the setting of the route and the RSID of the RS newly selected as the sub route in the message 409 as the new sub RSIDs.

In S299, the AGW transmits the message 207 to the RS newly selected as the sub route.

If the RS selected as the route is different for each application, the AGW transmits the message 409 including the APLID to the RS, and notifies the RS selected as the sub route what kind of application is used to select the RS as the route.

When the main route and the sub route are set by a device other than the gateway, processing related to the route selection is omitted.

3-5. Other Devices

[One Example of PCRF According to this Embodiment]

FIG. 4b illustrates an example of a functional block diagram of the PCRF used in this embodiment.

The AGW interface unit 31 is an interface with the AGW. The AGW interface unit 31 allows the PCRF to transmit and receive the IP packet with respect to the AGW. The PCRF interface unit 23 allows the AGW to transmit and receive the IP packet with respect to the PCRF. The memory unit 32 manages information on an IP packet to be transmitted or received, RS profile ($r_{RSmax}$), MS profile ($r_{MS}$), QoS parameters ($E_{RS}$, $T_{RS}$, $M_{RS}$, $P_{RS}$), APLID, policy ($w_{ERS}$, $w_{TRS}$, $w_{MRS}$, $w_{QoS}$, $w_{rmain}$, $w_{rsub}$), and addresses of the AGW to be connected in association with the MSID, the RSID or the RSID selected as the main route or the sub route as the occasion demands.

The processor 33 conducts management of the information held in the memory unit 32, and IP packet transmission and reception processing such as creation and analysis of the IP packet.

[One Example of Processing of PCRF According to this Embodiment]

Figure 59B:
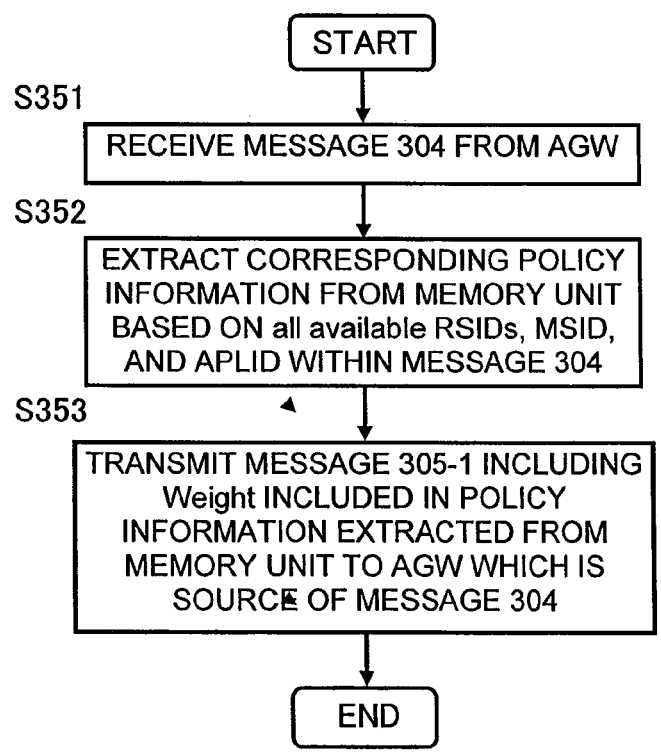
FIG. 59*b* illustrates an example of processing conducted by the policy management function in setting the main route and the sub route in the case of the relay system.

FIG. 59b illustrates an example of processing of the PCRF in setting the main route and the sub route.

In S351, the PCRF receives the message 304 from the AGW.

In S352, the PCRF extracts the policy information from the memory unit.

If the policy information is different for each MS, the PCRF extracts the corresponding policy information from the memory unit on the basis of the MSID included in the message 304.

Also, if the policy information is different for each application run by the MS, the PCRF extracts the corresponding policy information from the memory unit on the basis of the APLID included in the message 304.

Also, if the parameter different for each RS such as $P_{RS}$ or $M_{RS}$ is included in the policy information, the PCRF extracts the corresponding policy information from the memory unit on the basis of all available RSIDs included within the message 304. In S353, the PCRF that has received the message 304 from the AGW includes the policy information extracted from the memory unit in the message 305-1, and transmits the message 305-1 to the AGW that is a source of the message 304. The PCRF includes weight included in the policy information in the message 305-1. If the weight is different depending on the APLID or the MSID, the PCRF includes the weight corresponding to the APLID or the MSID included in the message 304 in the message 305-1.

Figure 60B:
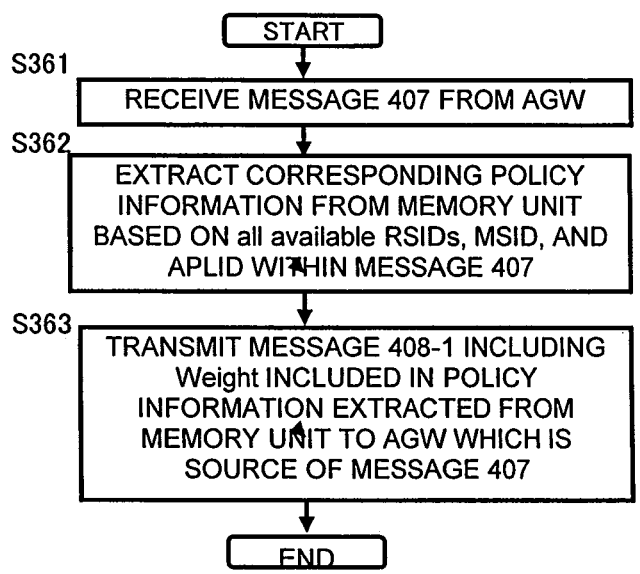
FIG. 60*b* illustrates an example of processing conducted by the policy management function in switching from the main route to the sub route in the case of the relay system.

FIG. 60b illustrates an example of processing of the PCRF in switching from the main route to the sub route.

In S361, the PCRF receives the message 407 from the AGW.

In S362, the PCRF extracts the policy information from the memory unit.

If the policy information is different for each MS, the PCRF extracts the corresponding policy information from the memory unit on the basis of the MSID included in the message 407.

Also, if the policy information is different for each application run by the MS, the PCRF extracts the corresponding policy information from the memory unit on the basis of the APLID included in the message 407.

Also, if the parameter different for each RS such as $P_{RS}$ or $M_{RS}$ is included in the policy information, the PCRF extracts the corresponding policy information from the memory unit on the basis of all available RSIDs included within the message 407. In S363, the PCRF that has received the message 407 from the AGW includes the policy information extracted from the memory unit in the message 408-1, and transmits the message 408-1 to the AGW that is a source of the message 407. The PCRF includes weight included in the policy information in the message 408-1. If the weight is different depending on the APLID or the MSID, the PCRF includes the weight corresponding to the APLID or the MSID included in the message 407 in the message 408-1.

[One Example of BS According to this Embodiment]

FIG. 4c illustrates an example of a functional block diagram of the BS used in this embodiment.

A radio interface unit 41 is a radio interface. The radio interface unit 41 allows the BS to transmit and receive the IP packet with respect to the RS.

An AGW interface unit 42 is an interface with the AGW. The AGW interface unit 42 allows the RS to transmit and receive the IP packet with respect to the AGW.

A memory unit 43 manages information on the IP packet to be transmitted or received, RS profile information ($r_{RSmax}$), QoS parameters ($E_{RS}$, $T_{RS}$, $M_{RS}$, $P_{AS}$), and addresses of the AGW and the MS or the RS to be connected in association with the MSID or the RSID selected as the main route and the sub route as the occasion demands. In the case in which the route is selected by the BS, information on FIGS. 22a, 25, 26, and 27 used for selection of the main route and the sub route is saved in the memory unit.

A processor 44 conducts management of the information held in the memory unit 43, and IP packet transmission and reception processing such as creation and analysis of the IP packet. When the routes are selected by the BS, a function such as calculation based on an expression given in selecting the main route and the sub route is added.

A battery unit 45 is a battery of the BS. When an electric power is always supplied to the BS, the battery unit 45 can be omitted.

[One Example of Processing of the BS According to this Embodiment]

Figure 59C:
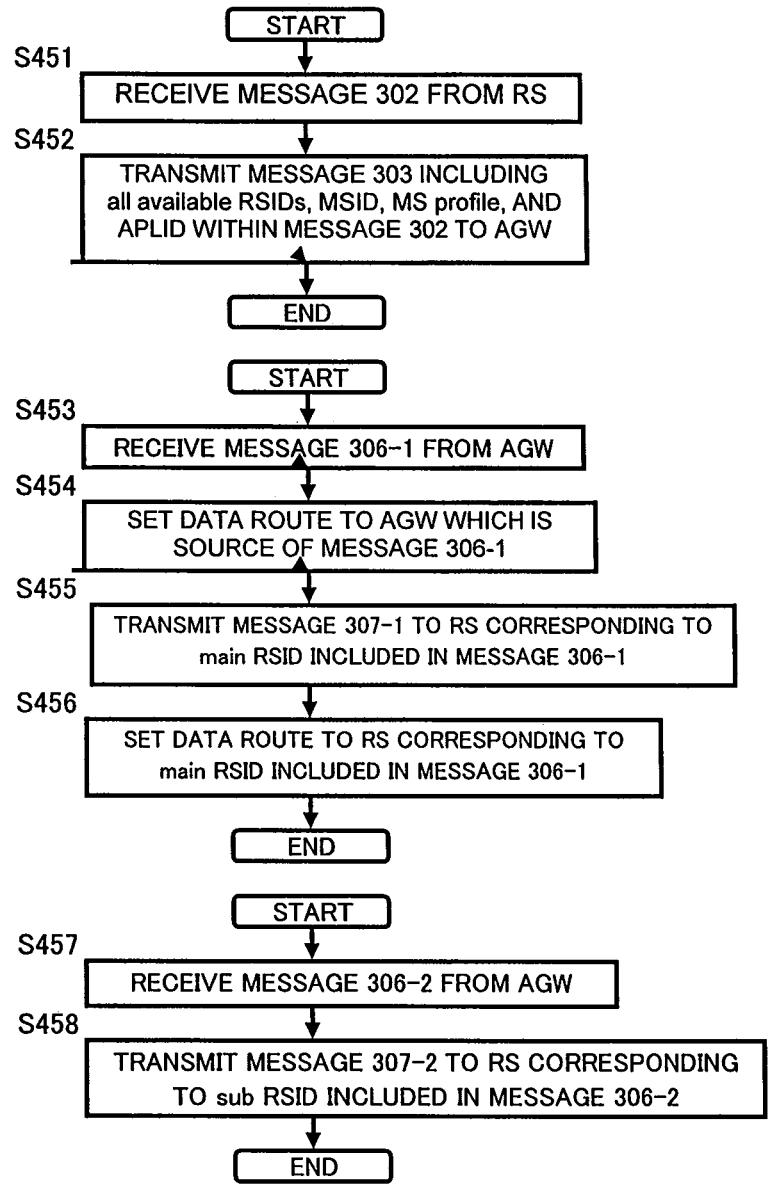
FIG. 59*c* illustrates an example of processing conducted by the base station in setting the main route and the sub route in the case of the relay system.

FIG. 59c illustrates an example of processing of the BS in setting the main route and the sub route.

In S451, the BS receives the message 302 from the RS. When the MS transmits the message 302 to the RS corresponding to another BS, S451 and S452 will be omitted.

In S452, the BS that has received the message 302 includes the MSID, the MS profile, and all available RSIDs which have been received by the message 302 in the message 303, and transmits the message 303 to the AGW.

Also, if the BS receives the APLID from the RS, the BS also includes the APLID in the message 303.

In setting the main route and the sub route, the BS corresponding to the RS selected as the sub route by the AGW receives the message 306-1 from the AGW in S453.

The BS that has received the message 306-1 from the AGW knows that the subject BS is the BS corresponding to the RS selected as the RS of the main route of the MS, from the MSID and the main RSID within the message in S454, and sets the data route to the AGW that has transmitted the message 306-1.

In S455, the BS transmits the message 307-1 to the RS corresponding to the main RSID included in the message 306-1.

In S456, the BS sets the data route to the RS.

In S457, on the other hand, in setting the main route and the sub route, the BS corresponding to the RS selected by the AGW as the sub route receives the message 306-2.

In S458, the BS knows that the subject BS is the BS corresponding to the RS selected as the RS of the sub route of the MS, from the MSID and the sub RSID within the message 306-2, and transmits the message 307-2 to the RS corresponding to the sub RSID in the message 306-2. When there is no need to be aware that the BS or the RS is selected as the sub route, this message can be omitted.

When the route is selected by the BS, the same processing as that in FIG. 59a is conducted by the BS.

Figure 60C:
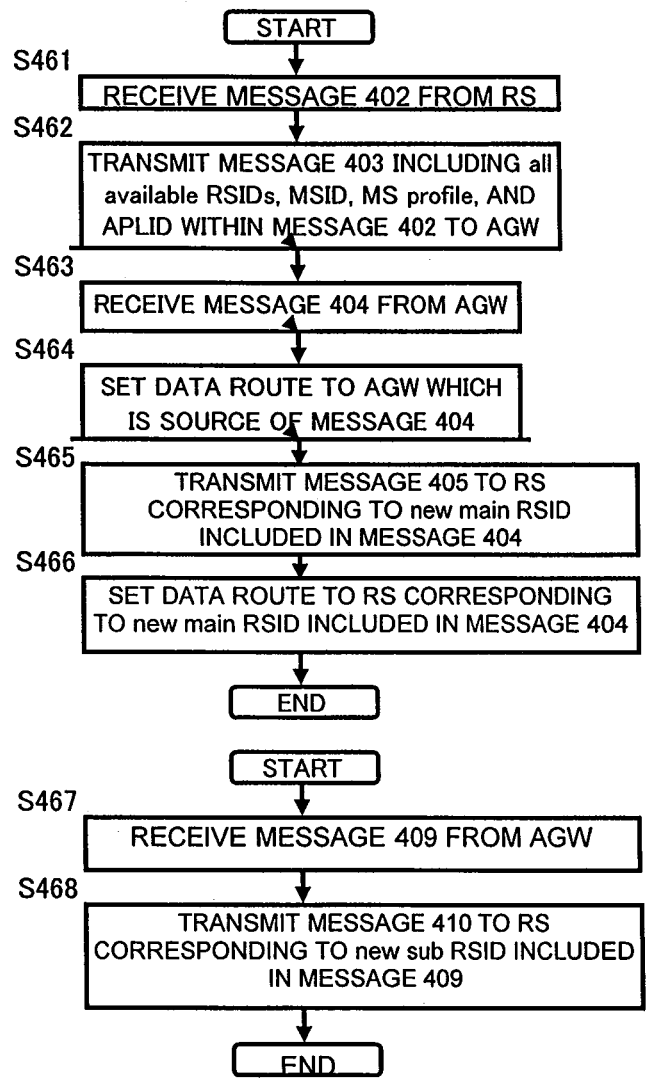
FIG. 60*c* illustrates an example of processing conducted by the base station in switching from the main route to the sub route in the case of the relay system.

FIG. 60c illustrates an example of processing of the BS in switching from the main route to the sub route.

In S461, the BS corresponding to the RS selected as the sub route of the MS that conducts switching receives the message 402 from the RS.

In S462, the BS that has received the message 402 includes the MSID, the MS profile, and all available RSIDs which have been received by the message 402 in the message 403, and transmits the message 403 to the AGW.

Also, if the BS receives the APLID from the RS, the BS also includes the APLID in the message 403.

The BS that has transmitted the message 403 receives the message 404 from the AGW in S463.

The BS that has received the message 404 from the AGW in S464, sets the data route to the AGW that has transmitted the message 404.

In S465, the BS transmits the message 405 to the RS corresponding to the new main RSID included in the message 404.

In S466, the BS sets the data route to the RS.

In S467, on the other hand, in switching from the main route to the sub route, the BS corresponding to the RS selected by the AGW as the new sub route receives the message 409, and knows that the subject BS is the BS corresponding to the RS selected as the RS of the sub route of the MS, from the MSID and the new sub RSID within the message.

In S468, the BS transmits the message 410 to the RS corresponding to the new sub RSID included in the message 409.

When the route is selected by the BS, the same processing as those in FIG. 60a is conducted in the BS.

[One Example of MS According to this Embodiment]

FIG. 4d illustrates an example of a functional block diagram of the MS used in this embodiment.

A radio interface unit 61 is a radio interface. The radio interface unit 61 allows the MS to transmit and receive the IP packet with respect to the BS or the RS.

A memory unit 62 manages information on the IP packet to be transmitted or received, MS profile ($r_{MS}$) QoS parameters ($E_{RS}$), an APLID, and addresses of the BS or the RS to be connected in association with the MSID or the BSID or the RSID selected as the main route or the sub route as the occasion demands. In case of an architecture in which the route is selected by the MS, information on FIGS. 22a, 25, 26, and 27 used for selection of the main route and the sub route is saved in the memory unit.

A processor 63 conducts management of the information held in the memory unit 43, and IP packet transmission and reception processing such as creation and analysis of the IP packet. In case of an architecture in which the routes are selected by the MS, a function such as calculation based on an expression given in selecting the main route and the sub route is added.

A battery unit 64 is a battery of the MS.

[One Example of Processing of the MS According to this Embodiment]

Figure 59D:
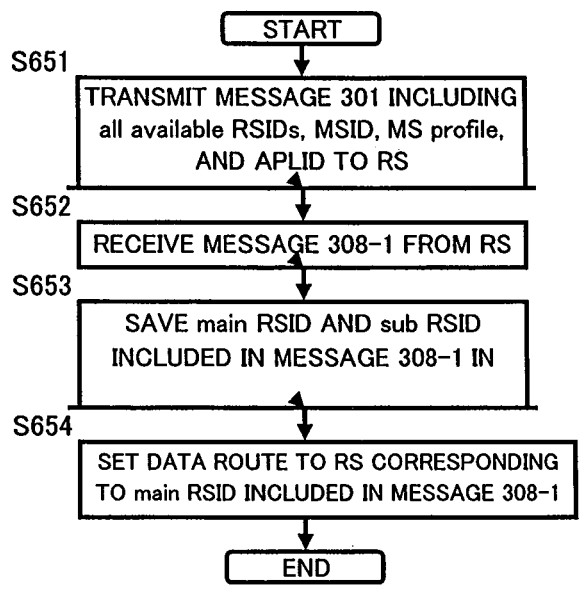
FIG. 59*d* illustrates an example of processing conducted by the mobile station in setting the main route and the sub route in the case of the relay system.

FIG. 59d illustrates an example of processing of the MS in setting the main route and the sub route.

In S651, the MS transmits the message 301 to one RS communicatable with the subject MS in order to request the setting of the main route and the sub route. The RS to which the MS transmits the message 301 may be the RS highest in the reception intensity of the signal among the RSs communicatable with the subject MS, or may be determined at random.

The MS includes its own MSID and MS profile and all available RSIDs in the message 301. The MS sets an index ($r_{MSnew}$) of the resource amount requested by the MS for the MS profile.

Also, the MS can set information such as the priority of the MS for the MS profile. The priority of the MS can be used when it is determined which MS route should be changed in conducting a route change request initiated by the AGW, or when the weight included in the policy information set within the AGW or the PCRF is determined.

Also, the MS can include the APLID in the message 301. When the policy information set in the AGW or the PCRF does not depend on an application, the APLID can be omitted.

In S652, the MS that has received the message 308-1 from the RS selected as the main route by the AGW knows the RS selected as the main route from the main RSID within the message 308-1, and knows the RS selected as the sub routine from the sub RSID within the message 308-1.

In S653, the MS that has received the message 308-1 saves the main RSID and the sub RSID within the message 308-1 in the memory unit.

In S654, the MS that has received the message 308-1 sets a data route to the RS selected as the main route, and uses the RS as the main route.

When the route is selected by the MS, the same processing as that in FIG. 59a is conducted by the MS.

Figure 60D:
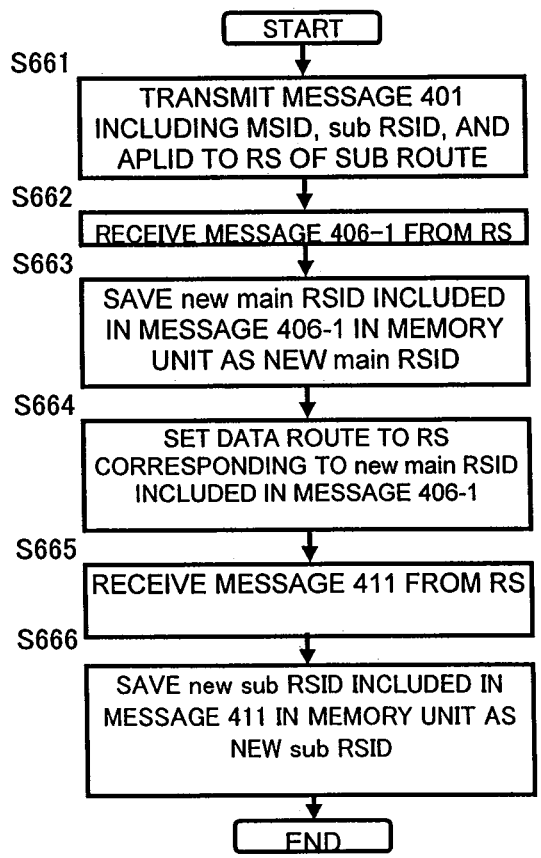
FIG. 60*d* illustrates an example of processing conducted by the mobile station in switching from the main route to the sub route in the case of the relay system.

FIG. 60d illustrates an example of processing of the MS in switching from the main route to the sub route.

In S661, the MS transmits the message 401 to the RS of the sub route with reference to the RSID of the sub route from the memory unit, in order to request switching from the main route to the sub route.

Also, the MS can include the APLID of an application run by the MS in the message 401. The APLID can be omitted if the RS selected as the route is not changed by the application.

In S662, the MS that has received the message 406-1 from the RS selected as the main route by the AGW knows that the RS of the sub route is newly selected as the main route from the new main RSID within the message 406-1.

In S663, the MS that has received the message 406-1 saves the new main RSID within the message 406-1 in the memory unit.

In S664, the MS that has received the message 406-1 sets the data route to the RS which becomes a new main route, and uses the RS as a new main route.

Also, the MS that has received the message 411 knows the RSID of the RS newly selected as the sub route from the new sub RSID within the message 411, and saves its RSID in the memory unit.

When the route is selected by the MS, the same processing as that in FIG. 60a is conducted by the MS.

[One Example of RS According to this Embodiment]

FIG. 4e illustrates an example of a functional block diagram of the RS used in this embodiment.

A radio interface unit 71 is a radio interface. The radio interface unit 71 allows the RS to transmit and receive the IP packet with respect to the MS and the BS.

A memory unit 72 manages information on an IP packet to be transmitted or received, RS profile information (index $r_{RSMax}$ of an upper limit of the radio resource amount acceptable by the RS), QoS parameters ($E_{RS}$, $T_{RS}$, $M_{RS}$, $P_{RS}$), and addresses of the MS and the BS to be connected in association with the MSID and the RSID selected as the main route or the sub route as the occasion demands.

A processor 73 conducts management of the information held in the memory unit 43, and IP packet transmission and reception processing such as creation and analysis of the IP packet.

A battery unit 74 is a battery of the RS. When an electric power is always supplied to the RS, the battery unit 45 can be omitted.

[One Example of Processing of RS According to this Embodiment]

Figure 59E:
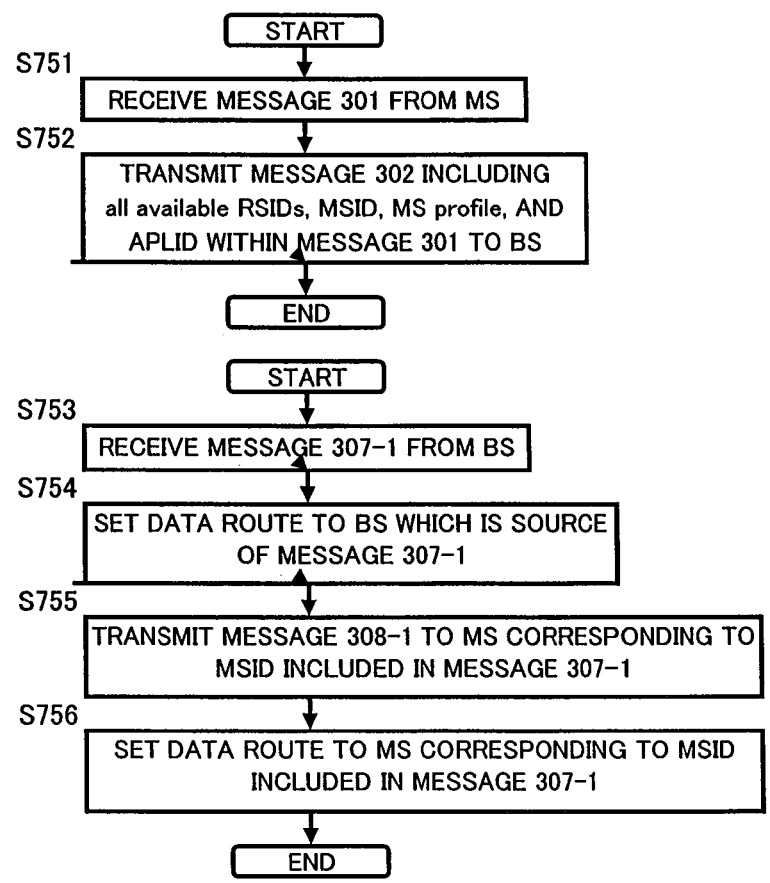
FIG. 59*e* illustrates an example of processing conducted by the relay station in setting the main route and the sub route in the case of the relay system.

FIG. 59e illustrates an example of processing of the RS in setting the main route and the sub route.

In S751, the RS receives a message 301 from the MS.

When the MS transmits the message 301 to another RS, S751 and S752 are omitted.

In S752, the RS that has received the message 301 includes the MSID, the MS profile, and all available RSIDs, which have been received in the message 301, in a message 302, and transmits the message 302 to the BS.

Also, when the RS receives the APLID from the MS, the RS also includes the APLID in the message 302.

In setting the main route and the sub route, the RS selected as the sub route by the AGW receives a message 307-1 from the BS in S753.

In S754, the RS that has received the message 307-1 from the AGW knows that the subject RS is selected as the main route of the MS, from the MSID and the main RSID within the message, and sets the data route to the BS that has transmitted the message 307-1.

In S755, the RS transmits a message 308-1 to the MS corresponding to the MSID included in the message 307-1.

In S756, the RS sets the data route to the MS.

On the other hand, in setting the main route and the sub route, the RS selected by the AGW as the sub route receives the message 307-2, and knows that the subject RS is selected as the sub route of the MS, from the MSID and the sub RSID within the message. When there is no need to be aware that the RS is selected as the sub route, this message can be omitted.

Figure 60E:
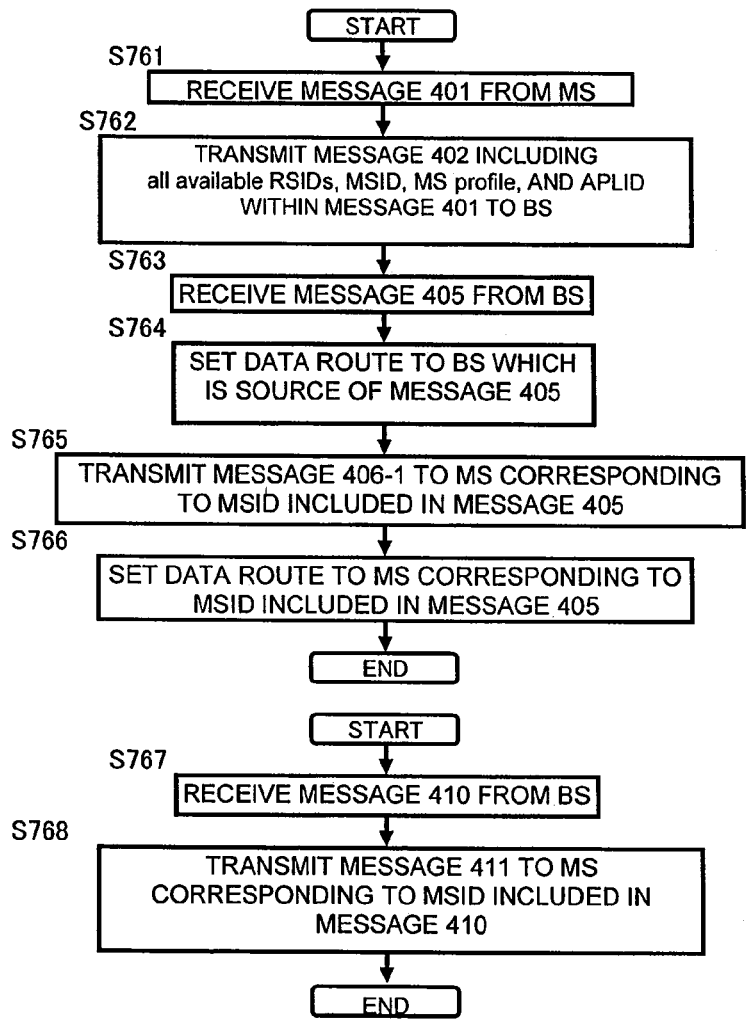
FIG. 60*e* illustrates an example of processing conducted by the relay station in switching from the main route to the sub route in the case of the relay system.

FIG. 60e illustrates an example of processing of the RS in switching from the main route to the sub route.

In S761, the RS that is selected as the sub route of the MS that conducts switching receives the message 401 from the MS.

In S762, the RS that has received the message 401 includes the MSID, the MS profile, and all available RSIDs, which have been received by the message 401, in the message 402, and transmits the message 402 to the BS.

Also, when the RS has received the APLID from the MS, the RS also includes the APLID in the message 402.

In S763, the RS that has transmitted the message 402 receives the message 405 from the BS.

In S764, the RS that has received the message 405 from the BS sets the data route to the BS that has transmitted the message 405.

In S765, the RS transmits the message 406 to the MS corresponding to the MSID included in the message 405.

In S766, the RS sets the data route to the MS.

On the other hand, in switching from the main route to the sub route, the RS selected by the AGW as the new sub route receives the message 410 in Step 767, and knows that the subject RS is selected as the RS of the sub route of the MS, from the MSID and the new sub RSID within the message.

In S768, the RS transmits the message 411 to the MS corresponding to the MSID included in the message 409.

[One Example of RSF According to this Embodiment]

FIG. 4f illustrates an example of a functional block diagram of the RSF used in this embodiment.

An AGW interface unit 91 is an interface with the AGW. The AGW interface unit 91 allows the RSF to transmit and receive the IP packet with respect to the AGW.

A memory unit 92 manages information on the IP packet to be transmitted or received, RS profile ($r_{RSMax}$) MS profile ($r_{MS}$) QoS parameters (E, T, M, P) APLID, weight ($w_E$, $w_T$, $w_M$, $w_{QoS}$, $w_{rmain}$, $w_{rsub}$), and addresses of the PCRF 3 and the RS 7 to be connected in association with the MSID or the RSID selected as the main route or the sub route as the occasion demands.

A processor 93 conducts management of the information held in the memory unit 25, IP packet transmission and reception processing such as creation and analysis of the IP packet, and calculation based on an expression given in selecting the main route and the sub route.

[One Example of Information Held by Memory Unit of RSF According to this Embodiment]

The RSF has information such as FIGS. 22*a*, 25, 26, and 27 as information necessary for route selection.

[One Example of Processing of RSF According to this Embodiment]

An example of processing of the RSF in setting the main route and the sub route is identical with that in FIG. 59*a*.

An example of processing of the RSF in switching from the main route to the sub route is identical with that in FIG. 60*a*.

3-6. Message Format

[One Example of Message Format to be Transmitted from MS to RS According to this Embodiment]

Figure 38:
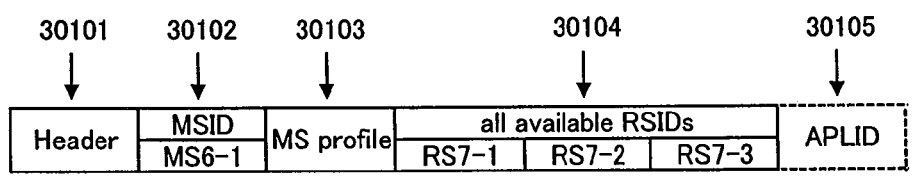
FIG. 38 illustrates an example of a message format used in setting the main route and the sub route in the case of the relay system.

FIG. 38 illustrates an example of a format of the message 301 to be transmitted from the MS to the RS in setting the main route and the sub route in the relay system according to this embodiment.

A header 30101 stores information on a layer 1 (L1), a MAC, a RLC, a PDCP, and an IP which are disclosed in FIG. 5.1.1.3-1 of Non Patent Literature 1.

An MSID field 30102 is a TLV format illustrated in FIG. 11, and sets the MSID in a value field 10003.

An MS profile field 30103 is the TLV format illustrated in FIG. 11, and sets profile information on the MS such as an index of the radio resource amount requested by the MS in the value field 10003. The profile information on the MS may include the priority of the MS.

An all available RSIDs field 30104 is the TLV format illustrated in FIG. 11, and sets the RSIDs of all the RSs which are candidates for the routes in the value field 10003.

An APLID field 30105 is the TLV format illustrated in FIG. 11, and sets the APLID of the application run by the MS.

Figure 48:
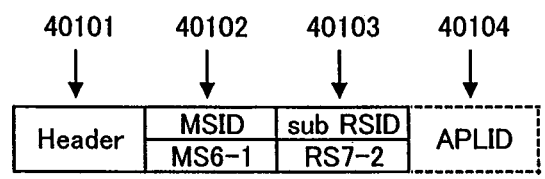
FIG. 48 illustrates an example of a message format used in setting the main route and the sub route in the case of the relay system.

FIG. 48 illustrates an example of the format of the message 401 to be transmitted from the MS to the RS in switching from the main route to the sub route in the relay system in this embodiment.

A header 40101 stores information on the L1, the MAC, the RLC, the PDCP, and the IP which are disclosed in FIG. 5.1.1.3-1 of Non Patent Literature 1.

An MSID field 40102 is the TLV format illustrated in FIG. 11, and sets the MSID in the value field 10003.

A sub RSID field 40103 is the TLV format illustrated in FIG. 11, and sets the RSID corresponding to the RS of the sub route, which is saved in the memory unit, in the value field 10003.

An APLID field 40104 is the TLV format illustrated in FIG. 11, and sets the APLID of the application run by the MS in the value field 10003.

[One Example of Message Format to be Transmitted from RS to BS According to this Embodiment]

Figure 39:
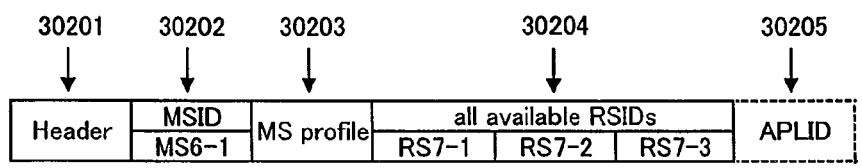
FIG. 39 illustrates an example of a message format used in setting the main route and the sub route in the case of the relay system.

FIG. 39 illustrates an example of a format of the message 302 to be transmitted from the RS to the BS in setting the main route and the sub route in the relay system according to this embodiment.

A header 30201 stores information on the L1, MAC, RLC, PDCP, and the IP which are disclosed in FIG. 5.1.1.3-1 of Non Patent Literature 1.

A value of the MSID field 30102 received by the message 301 is copied into an MSID field 30202.

A value of the MS profile field 30103 received by the message 301 is copied into an MS profile field 30203.

A value of the all available RSIDs field 30104 received by the message 301 is copied into an all available RSIDs field 30204.

A value of the APLID field 30105 received by the message 301 is copied into an APLID field 30205.

Figure 49:
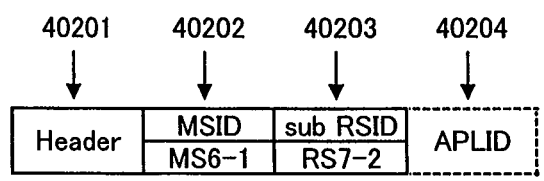
FIG. 49 illustrates an example of a message format used in setting the main route and the sub route in the case of the relay system.

FIG. 49 illustrates an example of the format of the message 402 to be transmitted from the BS to the AGW in switching from the main route to the sub route in the relay system according to this embodiment.

A header 40201 stores information on the L1, MAC, RLC, PDCP, and the IP which are disclosed in FIG. 5.1.1.3-1 of Non Patent Literature 1.

A value of the MSID field 40102 received by the message 401 is copied into an MSID field 40202.

A value of the sub BSID field 40103 received by the message 401 is copied into a sub BSID field 40203.

A value of the APLID field 40104 received by the message 401 is copied into an APLID field 40204.

[One Example of Message Format to be Transmitted from BS to AGW According to this Embodiment]

Figure 40:
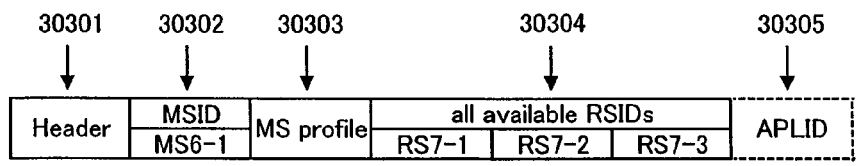
FIG. 40 illustrates an example of a message format used in setting the main route and the sub route in the case of the relay system.

FIG. 40 illustrates an example of a format of a message 303 to be transmitted from the BS to the AGW in setting the main route and the sub route in the relay system according to this embodiment.

A header 30301 stores information on the L1, the L2, and the IP which are disclosed in FIG. 5.1.1.2-1 of Non Patent Literature 1.

A value of an MSID field 30202 received by the message 302 is copied into an MSID field 30302.

A value of an MS profile field 30203 received by the message 302 is copied into an MS profile field 30303.

A value of an all available RSIDs field 30204 received by the message 302 is copied into an all available RSIDs field 30304.

A value of an APLID field 30205 received by the message 302 is copied into an APLID field 30305.

Figure 50:
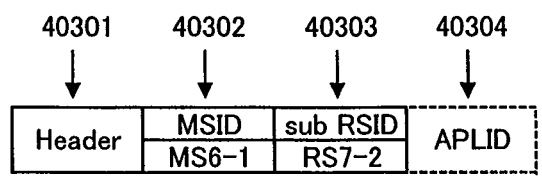
FIG. 50 illustrates an example of a message format used in setting the main route and the sub route in the case of the relay system.

FIG. 50 illustrates an example of a format of the message 403 to be transmitted from the BS to the AGW in switching from the main route to the sub route in the relay system according to this embodiment.

A header 40301 stores information on the L1, the L2, and the IP which are disclosed in FIG. 5.1.1.2-1 of Non Patent Literature 1.

A value of an MSID field 40202 received by the message 402 is copied into an MSID field 40302.

A value of a sub BSID field 40203 received by the message 402 is copied into a sub BSID field 40303.

A value of an APLID field 40204 received by the message 402 is copied into an APLID field 40304.

[One Example of Message Format to be Transmitted from AGW to PCRF According to this Embodiment]

Figure 41:
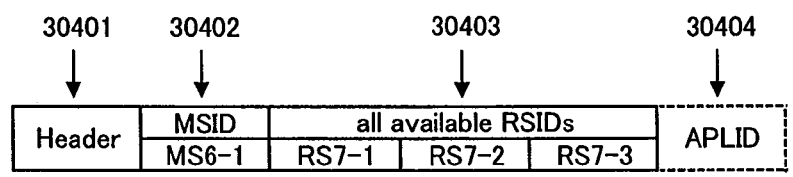
FIG. 41 illustrates an example of a message format used in setting the main route and the sub route in the case of the relay system.

FIG. 41 illustrates an example of a format of the message 304 to be transmitted from the AGW to the PCRF in setting the main route and the sub route in case of the relay system according to this embodiment.

A header 30401 stores information on the L1, the L2, and the IP which are disclosed in FIG. 5.1.1.2-1 of Non Patent Literature 1.

A value of the MSID field 30302 received by the message 303 is copied into an MSID field 30402.

A value of the all available RSIDs field 30304 received by the message 303 is copied into an all available RSIDs field 30403.

A value of the APLID field 30305 received by the message 303 is copied into an APLID field 30404.

Figure 54:
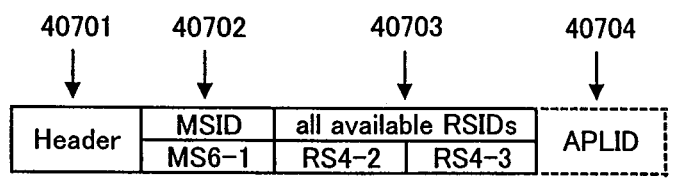
FIG. 54 illustrates an example of a message format used in setting the main route and the sub route in the case of the relay system.

FIG. 54 illustrates an example of the format of the message 407 to be transmitted from the AGW to the PCRF in switching from the main route to the sub route in case of the relay system in this embodiment.

A header 40701 stores information on the L1, the L2, and the IP which are disclosed in FIG. 5.1.1.2-1 of Non Patent Literature 1.

A value of the MSID field 40302 received by the message 403 is copied into an MSID field 40702.

A value of the all available RSIDs field 40304 received by the message 403 is copied into an all available RSIDs field 40703.

A value of the APLID field 40305 received by the message 403 is copied into an APLID field 40704.

[One Example of Message Format to be Transmitted from PCRF to AGW According to this Embodiment]

Figure 42:
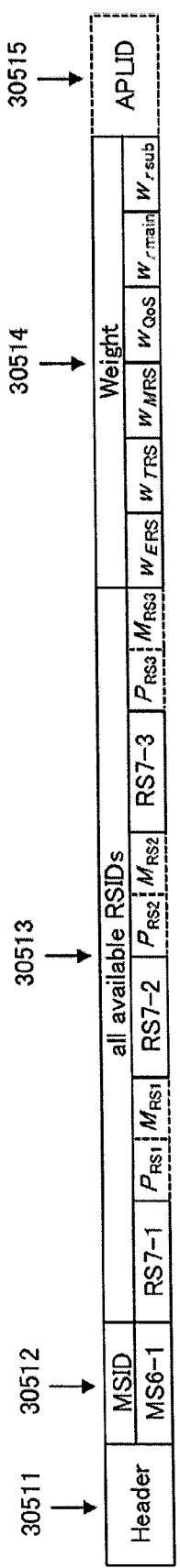
FIG. 42 illustrates an example of a message format used in setting the main route and the sub route in the case of the relay system.

FIG. 42 illustrates an example of a format of the message 305-1 to be transmitted from the PCRF to the AGW in setting the main route and the sub route in case of the relay system according to this embodiment.

A header 30511 stores information on the L1, the L2, and the IP which are disclosed in FIG. 5.1.1.2-1 of Non Patent Literature 1.

A value of the MSID field 30402 received by the message 304 is copied into an MSID field 30512.

A value of the all available RSIDs field 30403 received by the message 304 is copied into an all available RSIDs field 30513. When the quality is also taken into account in selection of the route, and $P_{RS}$ and $M_{RS}$ of the QoS parameters are included in the policy, the $P_{RS}$ and $M_{RS}$ corresponding to each RSID are extracted from the memory unit, and set in the all available RSIDs field 30513.

A value of corresponding weight ($w_{ERS}$, $w_{TRS}$, $w_{MRS}$, $w_{QoS}$, $w_{rmain}$, $w_{rsub}$) is extracted from the policy saved in the memory unit, and set in a weight field 30514.

A value of the APLID field 30404 received by the message 304 is copied into an APLID field 30515.

Figure 55:
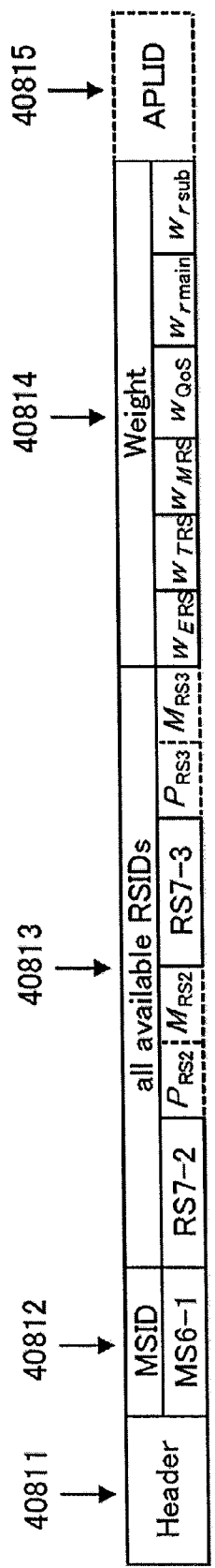
FIG. 55 illustrates an example of a message format used in setting the main route and the sub route in the case of the relay system.

FIG. 55 illustrates an example of the format of the message 408-1 to be transmitted from the PCRF to the AGW in switching from the main route to the sub route in case of the relay system in this embodiment.

A header 40811 stores information on the L1, the L2, and the IP which are disclosed in FIG. 5.1.1.2-1 of Non Patent Literature 1.

A value of the MSID field 40702 received by the message 407 is copied into an MSID field 40812.

A value of the all available RSIDs field 40703 received by the message 407 is copied into an all available RSIDs field 40813. When the quality is also taken into account in selection of the route, and $P_{RS}$ and $M_{RS}$ of the QoS parameters are included in the policy, the P and M corresponding to each RSID are extracted from the memory unit, and set in the all available RSIDs field 40813.

A value of corresponding weight ($w_{ERS}$, $w_{TRS}$, $w_{MRS}$, $w_{QoS}$, $w_{rmain}$, $w_{rsub}$) is extracted from the policy saved in the memory unit, and set in a weight field 40814.

A value of the APLID field 40704 received by the message 407 is copied into an APLID field 40815.

[One Example of Message Format to be Transmitted from AGW to RSF According to this Embodiment]

An example of a format of a message 309 to be transmitted from the AGW to the PCRF in setting the main route and the sub route and in switching from the main route to the sub route according to this embodiment is identical with that in FIG. 42 to which the MS profile is added.

[One Example of Message Format to be Transmitted from AGW to BS According to this Embodiment]

Figure 43:
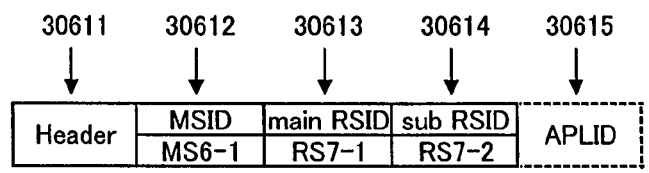
FIG. 43 illustrates an example of a message format used in setting the main route and the sub route in the case of the relay system.

FIG. 43 illustrates an example of a format of the message 306-1 to be transmitted from the AGW to the BS corresponding to the RS selected as the main route in setting the main route in case of the relay system and the sub route according to this embodiment.

A header 30611 stores information on the L1, the L2, and the IP which are disclosed in FIG. 5.1.1.2-1 of Non Patent Literature 1.

A value of the MSID field 30302 received by the message 303 is copied into an MSID field 30612.

A value of the RSID of the RS selected as the main route by the AGW is set in a main RSID field 30613.

A value of the RSID of the RS selected as the sub route by the AGW is set in a sub RSID field 30614.

A value of the APLID field 30305 received by the message 303 is copied into an APLID field 30615.

Figure 44:
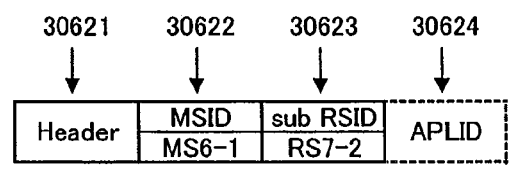
FIG. 44 illustrates an example of a message format used in setting the main route and the sub route in the case of the relay system.

FIG. 44 illustrates an example of a format of the message 306-2 to be transmitted from the AGW to the BS corresponding to the RS selected as the sub route in setting the main route and the sub route in case of the relay system according to this embodiment.

A header 30621 stores information on the L1, the L2, and the IP which are disclosed in FIG. 5.1.1.2-1 of Non Patent Literature 1.

A value of the MSID field 30302 received by the message 303 is copied into an MSID field 30622.

A value of the RSID of the RS selected as the sub route by the AGW is set in a sub RSID field 30623.

A value of the APLID field 30305 received by the message 303 is copied into an APLID field 30624.

Figure 51:
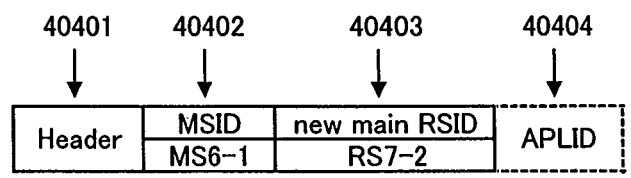
FIG. 51 illustrates an example of a message format used in setting the main route and the sub route in the case of the relay system.

FIG. 51 illustrates an example of the format of the message 404 to be transmitted from the AGW to the BS corresponding to the RS of the sub route newly used as the main route in switching from the main route to the sub route in case of the relay system in this embodiment.

A header 40401 stores information on the L1, the L2, and the IP which are disclosed in FIG. 5.1.1.2-1 of Non Patent Literature 1.

A value of the MSID field 40302 received by the message 403 is copied into an MSID field 40402.

A value of the sub RSID field 40302 received by the message 403 is set in a new main RSID field 40403.

A value of the APLID field 40304 received by the message 403 is copied into an APLID field 40404.

Figure 56:
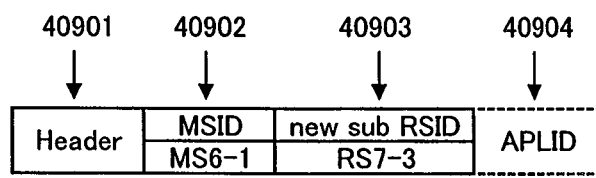
FIG. 56 illustrates an example of a message format used in setting the main route and the sub route in the case of the relay system.

FIG. 56 illustrates an example of the format of the message 409 to be transmitted from the AGW to the BS corresponding to the RS newly selected as the sub route in switching from the main route to the sub route in case of the relay system in this embodiment.

A header 40901 stores information on the L1, the L2, and the IP which are disclosed in FIG. 5.1.1.2-1 of Non Patent Literature 1.

A value of the MSID field 40302 received by the message 403 is copied into an MSID field 40902.

A value of the RSID of the RS newly selected as the sub route by the AGW is set into a new sub RSID field 40903.

A value of the APLID field 40304 received by the message 403 is copied into an APLID field 40904.

[One Example of Message Format to be Transmitted from BS to RS According to this Embodiment]

Figure 45:
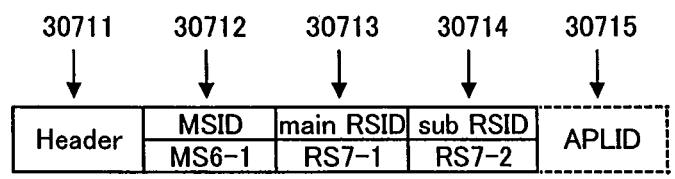
FIG. 45 illustrates an example of a message format used in setting the main route and the sub route in the case of the relay system.

FIG. 45 illustrates an example of a format of the message 307-1 to be transmitted from the BS to the RS selected as the main route in setting the main route and the sub route in case of the relay system according to this embodiment.

A header 30711 stores information on the L1, the MAC, the RLC, the PDCP, and the IP which are disclosed in FIG. 5.1.1.3-1 of Non Patent Literature 1.

A value of the MSID field 30612 received by the message 306-1 is copied into an MSID field 30712.

A value of the main RSID field 30613 received by the message 306-1 is copied into a main RSID field 30713.

A value of the sub RSID field 30614 received by the message 306-1 is copied into a sub RSID field 30714.

A value of the APLID field 30615 received by the message 306-1 is copied into an APLID field 30715.

Figure 46:
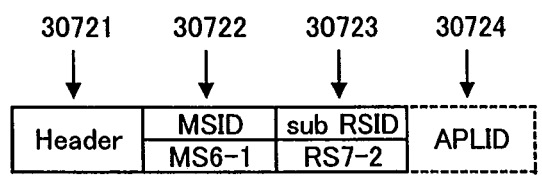
FIG. 46 illustrates an example of a message format used in setting the main route and the sub route in the case of the relay system.

FIG. 46 illustrates an example of the format of the message 307-2 to be transmitted from the BS to the RS selected as the sub route in setting the main route and the sub route in case of the relay system in this embodiment.

A header 30721 stores information on the L1, the MAC, the RLC, the PDCP, and the IP which are disclosed in FIG. 5.1.1.3-1 of Non Patent Literature 1.

A value of the MSID field 30622 received by the message 306-2 is copied into an MSID field 30722.

A value of the MSID field 30623 received by the message 306-2 is set in a sub RSID field 30723.

A value of the APLID field 30624 received by the message 306-2 is copied into an APLID field 30724.

Figure 52:
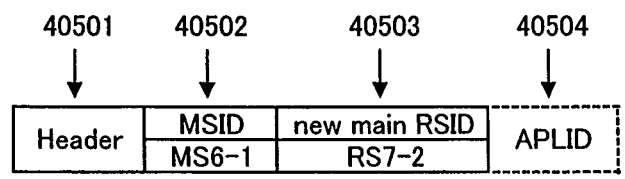
FIG. 52 illustrates an example of a message format used in setting the main route and the sub route in the case of the relay system.

FIG. 52 illustrates an example of the format of the message 405 to be transmitted from the BS to the RS of the sub route newly used as the main route in switching from the main route to the sub route in case of the relay system in this embodiment.

A header 40501 stores information on the L1, the MAC, the RLC, the PDCP, and the IP which are disclosed in FIG. 5.1.1.3-1 of Non Patent Literature 1.

A value of the MSID field 40402 received by the message 404 is copied into an MSID field 40502.

A value of the new main RSID field 40403 received by the message 404 is copied in a new main RSID field 40503.

A value of the APLID field 40404 received by the message 404 is copied into an APLID field 40504.

Figure 57:
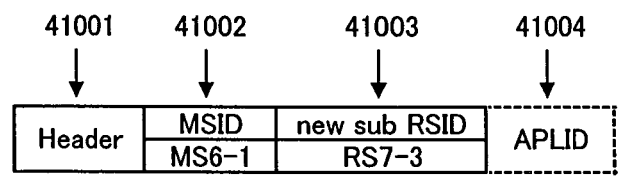
FIG. 57 illustrates an example of a message format used in setting the main route and the sub route in the case of the relay system.

FIG. 57 illustrates an example of a format of the message 410 to be transmitted from the BS to the RS newly selected as the sub route in switching from the main route to the sub route in the relay system according to this embodiment.

A header 41001 stores information on the L1, the MAC, the RLC, the PDCP, and the IP, which are disclosed in FIG. 5.1.1.3-1 of Non Patent Literature 1.

A value of an MSID field 40902 received by the message 409 is copied into an MSID field 41002.

A value of a new sub RSID field 40903 received by the message 409 is copied into a new sub RSID field 41003.

A value of an APLID field 40904 received by the message 409 is copied into an APLID field 41004.

[One Example of Message Format to be Transmitted from RS to MS According to this Embodiment]

Figure 47:
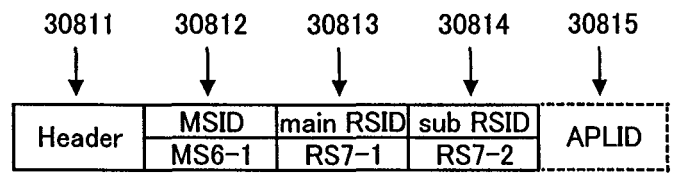
FIG. 47 illustrates an example of a message format used in setting the main route and the sub route in the case of the relay system.

FIG. 47 illustrates an example of a format of the message 308-1 to be transmitted from the RS selected as the main route to the MS in setting the main route and the sub route in the relay system according to this embodiment.

A header 30811 stores information on the L1, the MAC, the RLC, the PDCP, and the IP, which are disclosed in FIG. 5.1.1.3-1 of Non Patent Literature 1.

A value of an MSID field 30712 received by the message 307-1 is copied into an MSID field 30812.

A value of a main RSID field 30713 received by the message 307-1 is copied into a main RSID field 30813.

A value of a sub RSID field 30714 received by the message 307-1 is copied into a sub RSID field 30814.

A value of an APLID field 30715 received by the message 307-1 is copied into an APLID field 30815.

Figure 53:
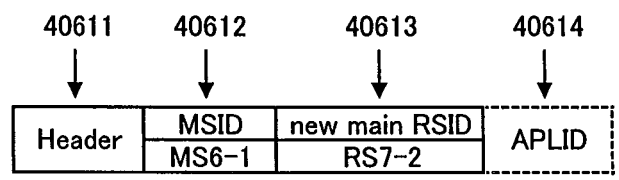
FIG. 53 illustrates an example of a message format used in setting the main route and the sub route in the case of the relay system.

FIG. 53 illustrates an example of a format of the message 406-1 to be transmitted from the RS newly used as the main route to the MS in switching from the main route to the sub route in the relay system according to this embodiment.

A header 40611 stores information on the L1, the MAC, the RLC, the PDCP, and the IP, which are disclosed in FIG. 5.1.1.3-1 of Non Patent Literature 1.

A value of an MSID field 40502 received by the message 405 is copied into an MSID field 40612.

A value of a new main RSID field 40503 received by the message 405 is set in a new main RSID field 40613.

A value of an APLID field 40504 received by the message 405 is copied into an APLID field 40614.

Figure 58:
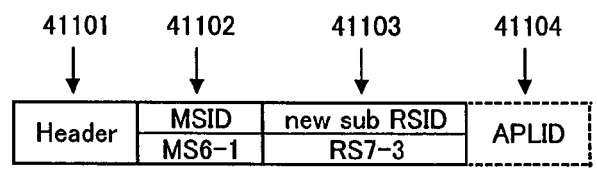
FIG. 58 illustrates an example of a message format used in setting the main route and the sub route in the case of the relay system.

FIG. 58 illustrates an example of a format of the message 411 to be transmitted from the RS newly used as the sub route to the MS in switching from the main route to the sub route in the relay system according to this embodiment.

A header 41101 stores information on the L1, the MAC, the RLC, the PDCP, and the IP, which are disclosed in FIG. 5.1.1.3-1 of Non Patent Literature 1.

A value of an MSID field 41002 received by the message 410 is copied into an MSID field 41102.

A value of a new sub RSID field 41003 received by the message 410 is copied into a new sub RSID field 41103.

A value of an APLID field 41004 received by the message 410 is copied into an APLID field 41104.

4. Third Embodiment (Base Station and Relay Station)

[Third Embodiment: One Example of Selection of Main Route and Sub Route Based on Residual Resource of Relay Station and Base Station in Mobile Radio Communication System Using Relay System having Relay Station between Mobile Station and Base Station]

[One Example of Architecture of Mobile Radio Communication System using Relay System According to this Embodiment]

Figure 2D:
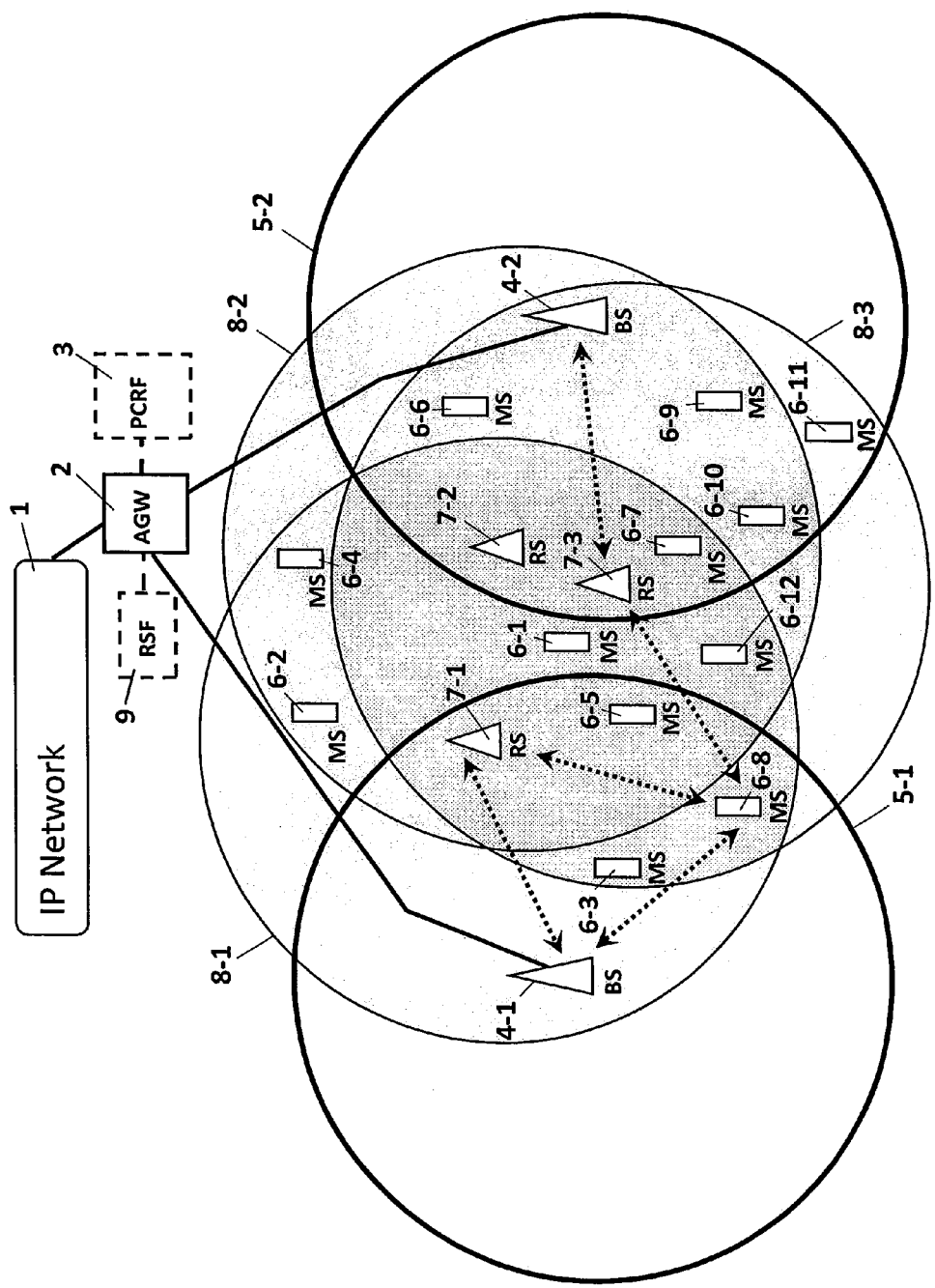
FIG. 2d illustrates an example of a mobile radio communication system using a relay system.

This embodiment is also applicable to the selection of the relay station and the base station in the relay system. FIG. 2*d* illustrates an example of architecture of the mobile radio communication system using the relay system according to this embodiment.

The AGW 2 is connected to the IP network 1, has a function of selecting the main route and the sub route based on the residual resources of the RS 7 and the BS 4, and exchanges the control signal and data with the BS 4. When the route is selected by a node other than the gateway, the function of selecting the main route and the sub route by the AGW 2 is omitted.

The PCRF 3 manages the information on the weight of the selection criterion as the policy information, and exchanges the control signal and the data with the AGW 2. When the policy information is set within the AGW 2 in advance, the PCRF 3 can be omitted.

The BS 4 exchanges the control signal and the data with the RS 7 existing within the radio communication range 5 of the BS 4 and the MS 6 existing within the radio communication range 5 of the BS 4. In the case of FIG. 2*d*, for example, the BS4-1 can exchange the data with the AGW 2 and the RS 7-1, the MS 6-3, the MS 6-5, and the MS 6-8 existing within the ratio communication range 5-1. When the route is selected in the BS 4, the BS 4 has a function of selecting the main route and the sub route based on the residual resources of the RS 7 and the subject BS 4.

The MS 6 exchanges the control signal and the data with the radio communicatable BS 4 and the radio communicatable RS 7. In the case of FIG. 2*d*, for example, the MS 6-8 can exchange the data with the BS 4-1, the RS 7-1, and the RS 7-3. When the route is selected in the MS 6, the MS 6 has a function of selecting the main route and the sub route based on the residual resources of the RS 7 and BS 4.

The RS 7 exchanges the control signal and the data with the BS 4 existing within the radio communication range 8 of the RS 7, and the MS 6 existing within the radio communication range 8 of the RS 7. In the case of FIG. 2d, for example, the RS 7-1 can exchange the data with the BS 4-1, the MS 6-1, the MS 6-2, the MS 6-3, the MS 6-4, the MS 6-5, the MS 6-7, the MS 6-8, and the MS 6-12, which exist within a radio communication range 8-1. This embodiment is also applicable to a case allowing a route that passes through plural RS 7 in the route used for communication between the BS 4 and the MS 6.

The RSF 9 is an external device having a function of selecting the main route and the sub route based on the residual resources of the RS 7 and the BS 4, and transmits and receives the control signal and the data with respect to the AGW 2. When the main route and the sub route are selected by a node other than the external device, the RSF 9 can be omitted.

[One Example of Method of Acquiring Identifier of Relay Station Selectable as Route by Mobile Station According to this Embodiment]

This method is the same as that of the second embodiment.

[One Example of Method of Notifying Device having Route Selection Function of Profile Information on Relay Station and Base Station provided in Relay Station According to this Embodiment]

A method of notifying a profile of the relay station is the same as that in the second embodiment.

A method of notifying a profile of the base station is the same as that in the first embodiment.

[One Example of Call Flow of Setting Main Route and Sub Route in Radio System using Relay System According to this Embodiment]

This call flow is the same as that in the second embodiment. The third embodiment is different from the second embodiment in both of the information elements of the first embodiment and the information elements of the second embodiment are included in the respective messages.

[One Example of Call Flow of Switching from Main Route to Sub Route in Radio System using Relay System According to this Embodiment]

Figure 2E:
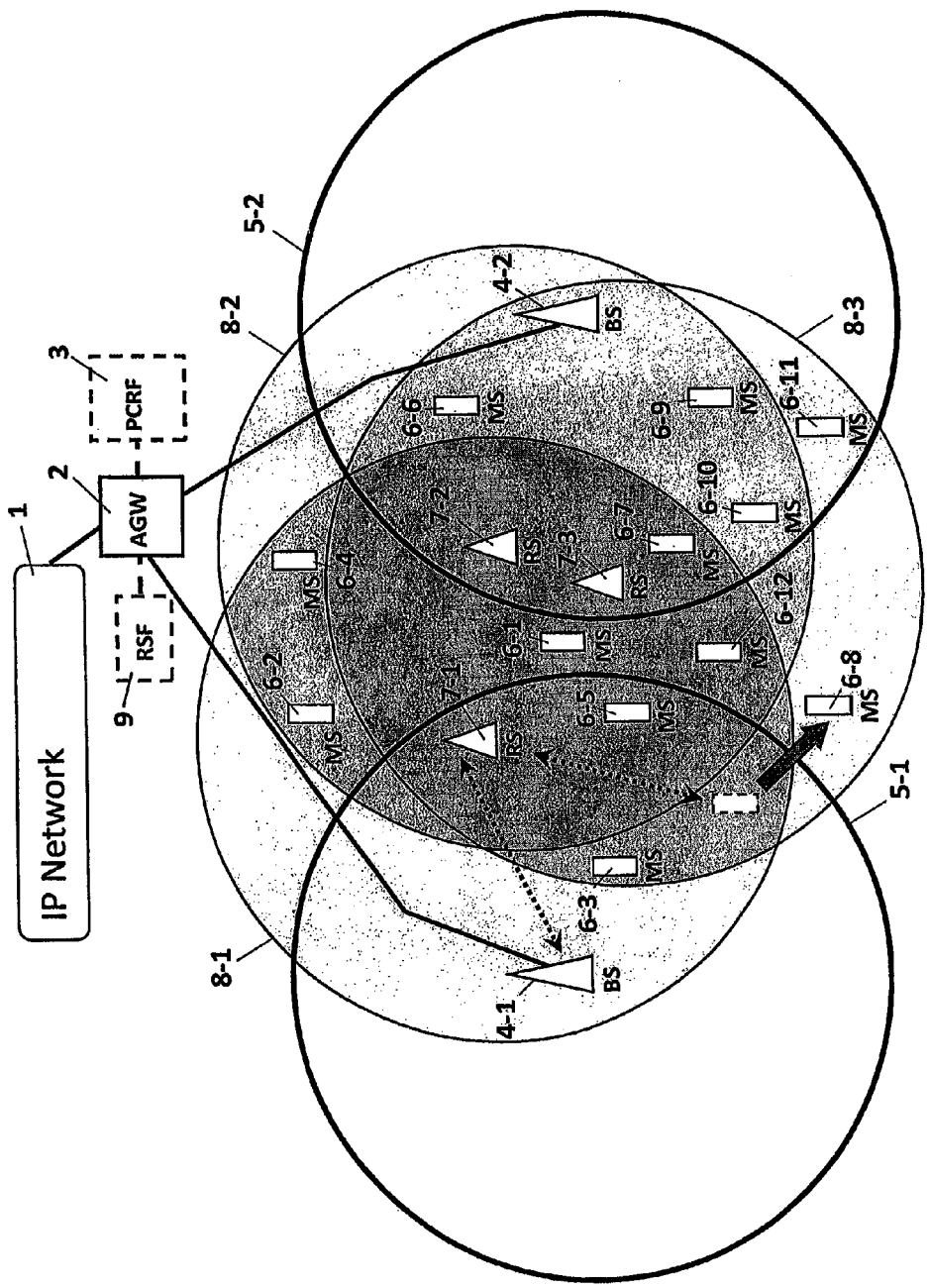
FIG. 2e illustrates an example of a mobile radio communication system using a relay system.
Figure 2F:
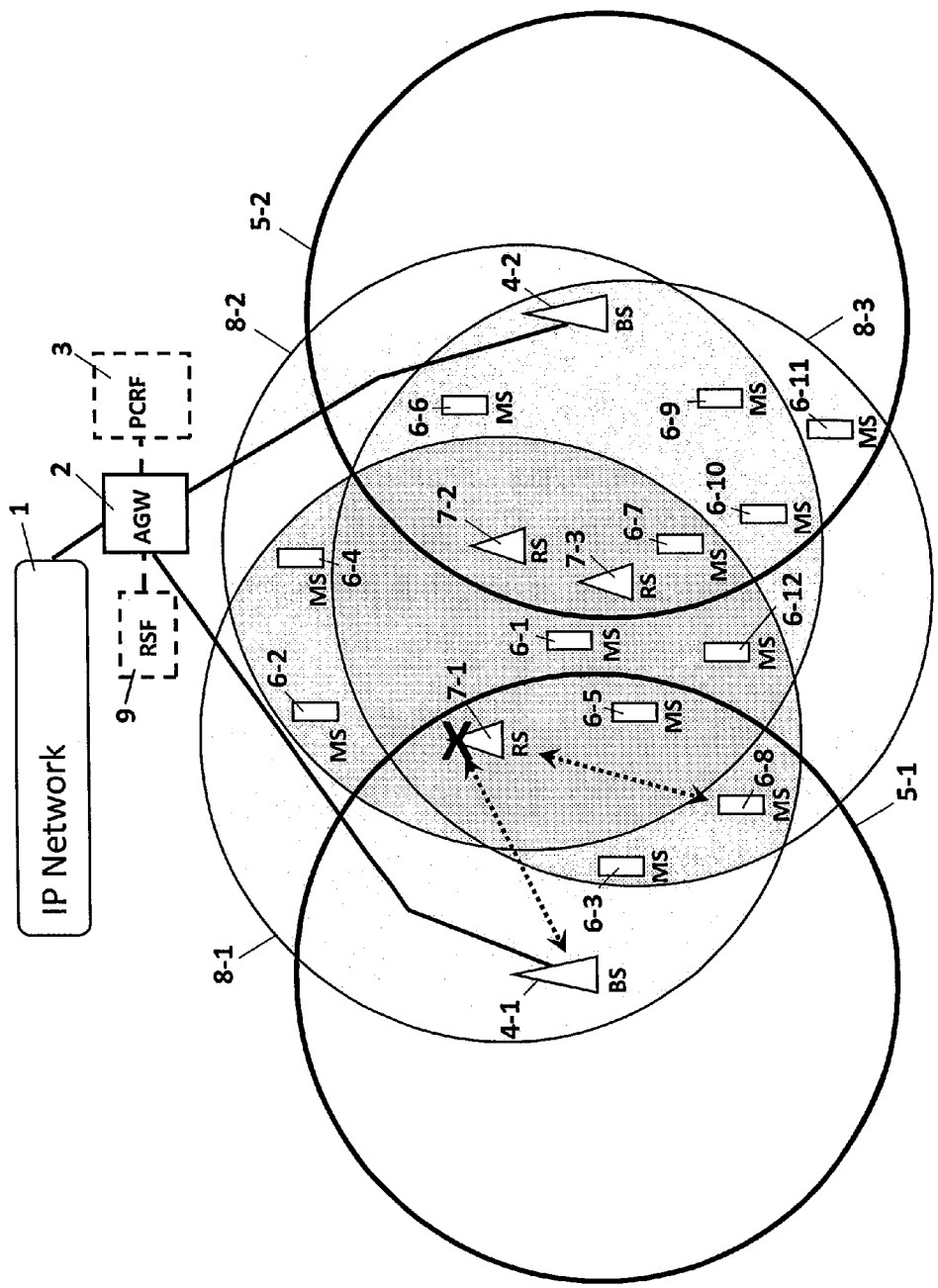
FIG. 2f illustrates an example of a mobile radio communication system using a relay system.

This call flow is the same as that in the second embodiment. It is conceivable that switching from the main route to the sub route occurs, for example, when the MS moves out of the radio communication range of the RS or the BS selected as the main route (FIG. 2e), or when the RS or the BS selected as the main route becomes unavailable (FIG. 2f). For example, there is a case in which the MS 6-8 in FIG. 2f is disconnected from the RS 7-1 used as the main route, the BS 4-1 selected as the sub route is connected as a new main route, and the RS 7-3 is selected as a new sub route. The third embodiment is different from the second embodiment in both of the information elements of the first embodiment and the information elements of the second embodiment are included in the respective messages.

[One Example of AGW According to this Embodiment]

The AGW is the same as that in the second embodiment.

[One Example of Information Held by Memory Unit of AGW According to this Embodiment]

Information elements of a union of the information elements of the first embodiment and the information elements of the second embodiment are saved.

[One Example of Processing of AGW According to this Embodiment]

Both of the examples of the processing of the AGW in setting the main route and the sub route in the radio system according to the first embodiment and the second embodiment are executed.

Further, the AGW assigns values to the respective parameters of Expression 11, and calculates the overall evaluation index $(R_{main})_n$ of the main route with respect to all of the selectable routes.

$$(R_{main})_n = (P_{main})_n [w_{mainaverage}[w_{mainBS}(R_{mainBS})_n + \{(\Sigma_i (w_{mainRS})_i (R_{mainRS})_i\}_n]/(N+1) + w_{mainresource\_min}(R_{rmain\_min})_n] \quad \text{(Ex. 11)}$$

In Expression 11, n is an index of the route.

N is the number of relay stations through which the route passes.

$(R_{main})_n$ is an overall evaluation of the main route based on the quality of the route, and the residual resource amounts of the RS and the BS.

$(P_{main})_n$ is policy information (weight related to the use of the route) indicative of the priority by which the route is selected as the main route, and the route is selected preferentially when the value is increased.

$(R_{mainBS})_n$ is an overall evaluation of the BS as the main route based on the quality of the route and the residual resource amount of the BS, and calculated on the basis of Expression 4 as in the first embodiment.

$(R_{mainRS})_n$ is an overall evaluation of the RS as the main route based on the quality of the route and the residual resource amount of the RS, and calculated on the basis of Expression 9 as in the second embodiment.

$(R_{rmain\_min})_n$ is a minimum value of $R_{rmain}$ in an evaluation $R_{rmain}$ as the main route based on the residual resource amount of the BS in the route, which is calculated on the basis of Expression 1 as in the first embodiment, and an evaluation $R_{rmain}$ as the main route based on the residual resource amount of the RS in the route, which is calculated on the basis of Expression 6 as in the second embodiment.

$w_{mainBS}$ is a parameter of the weight for $(R_{mainBS})_n$.

$w_{mainRS}$ is a parameter of the weight for $(R_{mainRS})_n$ corresponding to each RS in the route.

$w_{mainavarage}$ is a parameter of the weight for an average value of the evaluation indexes of the BS and the RS in the route as the main route.

$w_{mainresource\_min}$ is a parameter of the weight for $(R_{rmain\_min})_n$ corresponding to the BS and the RS in the route.

Also, the AGW assigns values to the respective parameters of Expression 12, and calculates the overall evaluation index $(R_{sub})_n$ of the sub route with respect to all of the selectable routes.

$$(R_{sub})_n = (P_{sub})_n [w_{subaverage}[w_{subBS}(R_{subBS})_n + \{(\Sigma_i (w_{subRS})_i (R_{subRS})_i\}_n]/(N+1) + w_{subresource\_min}(R_{rsub\_min})_n] \quad \text{(Ex. 12)}$$

In Expression 12, n is an index of the route.

N is the number of relay stations through which the route passes.

$(R_{sub})_n$ is an overall evaluation of the sub route based on the quality of the route, and the residual resource amounts of the RS and the BS.

$(P_{sub})_n$ is policy information (weight related to the use of the route) indicative of the priority by which the route is selected as the sub route, and the route is selected preferentially when the value is increased.

$(R_{subRS})_n$ is an overall evaluation of the RS as the sub route based on the quality of the route and the residual resource amount of the RS, and calculated on the basis of Expression 10 as in the second embodiment.

$(R_{subBS})_n$ is an overall evaluation of the BS as the sub route based on the quality of the route and the residual resource amount of the BS, and calculated on the basis of Expression 5 as in the first embodiment.

$(R_{rsub\_min})_n$ is a minimum value of $R_{rsub}$ in an evaluation $R_{rsub}$ as the sub route based on the residual resource amount of the BS in the route, which is calculated on the basis of Expression 2 as in the first embodiment, and an evaluation $R_{rsub}$ as the main route based on the residual resource amount of the RS in the route, which is calculated on the basis of Expression 7 as in the second embodiment.

$w_{mainRS}$ is a parameter of the weight for $(R_{mainRS})_n$ corresponding to each RS in the route.

$w_{mainVS}$ is a parameter of the weight for $(R_{mainRS})_n$.

$w_{subaverage}$ is a parameter of the weight for an average value of the evaluation indexes of the BS and the RS in the route as the sub route.

$w_{subresource\_min}$ is a parameter of the weight for $(R_{rsub\_min})_n$ corresponding to the BS and the RS in the route.

When the main route and the sub route are set by a node other than the gateway, processing related to the route selection is omitted.

Both of the examples of processing of the AGW in switching from the main route to the sub route in the radio system according to the first embodiment and the second embodiment are executed.

In setting the new sub route, processing of the route selection based on Expression 12 is conducted.

When the main route and the sub route are set by a node other than the gateway, processing related to the route selection is omitted.

[One Example of PCRF According to this Embodiment]

This embodiment is similar to the first embodiment and the second embodiment, but different from each other in that both of the route selection information related to the BS and the route selection information related to the RS are treated by the memory unit and the processor.

[One Example of BS According to this Embodiment]

This embodiment is similar to the first embodiment and the second embodiment, but different from each other in that both of the route selection information related to the BS and the route selection information related to the RS are treated by the memory unit and the processor.

[One Example of MS According to this Embodiment]

This embodiment is similar to the first embodiment and the second embodiment, but different from each other in that both of the route selection information related to the BS and the route selection information related to the RS are treated by the memory unit and the processor.

[One Example of RS According to this Embodiment]

This embodiment is similar to the second embodiment, but different from each other in that both of the route selection information related to the BS and the route selection information related to the RS are treated by the memory unit and the processor.

[One Example of RSF According to this Embodiment]

This embodiment is similar to the first embodiment and the second embodiment, but different from each other in that both of the route selection information related to the BS and the route selection information related to the RS are treated by the memory unit and the processor.

[One Example of Message Format According to this Embodiment]

This embodiment is similar to the first embodiment and the second embodiment, but different from each other in that both of the route selection information related to the BS and the route selection information related to the RS are added to the information elements.

Reference Signs List 1 an IP network
2 a gateway
21 to 26 functional block diagrams of the gateway
S201 to S225 Steps in a processing flow by the gateway in setting a main route and a sub route
S231 to S249 Steps in a processing flow by the gateway in switching from the main route to the sub route
S251 to S275 Steps in a processing flow by the gateway in setting the main route and the sub route using a relay system
S281 to S299 Steps in a processing flow by the gateway in switching from the main route to the sub route using the relay system
3 a policy management function
31 to 33 functional block diagrams of a policy management function
S301 to S303 Steps in a processing flow by the policy management function in setting the main route and the sub route
S311 to S313 Steps in a processing flow by the policy management function in switching from the main route to the sub route
S351 to S353 Steps in a processing flow by the policy management function in setting the main route and the sub route using the relay system
S361 to S363 Steps in a processing flow by the policy management function in switching from the main route to the sub route using the relay system
4 a base station
41 to 45 functional block diagrams of the base station
S401 to S406 Steps in a processing flow by the base station in setting the main route and the sub route
S411 to S418 Steps in a processing flow by the base station in switching from the main route to the sub route
S451 to S458 Steps in a processing flow by the base station in setting the main route and the sub route using the relay system
S461 to S468 Steps in a processing flow by the base station in switching from the main route to the sub route using the relay system
5 a radio communication range of the base station
6 a mobile station
61 to 64 functional block diagrams of the mobile station
S601 to S604 Steps in a processing flow by the mobile station in setting the main route and the sub route
S611 to S616 Steps in a processing flow by the mobile station in switching from the main route to the sub route
S651 to S654 Steps in a processing flow by the mobile station in setting the main route and the sub route using the relay system
S661 to S666 Steps in a processing flow by the mobile station in switching from the main route to the sub route using the relay system
7 a relay station
71 to 74 functional block diagrams of the relay station
S751 to S756 Steps in a processing flow by the relay station in setting the main route and the sub route using the relay system
S761 to S766 Steps in a processing flow by the relay station in switching from the main route to the sub route using the relay system
8 a radio communication range of the relay station
9 an external device having a route selection function 91 to 93 functional block diagrams of the external device having the route selection function
T11 to T65 information managed by a memory unit T111 to T165 information managed by the memory unit
100 to 106 messages or steps in setting the main route and the sub route
200 to 208 messages or steps in switching from the main route to the sub route
300 to 309 messages or steps in setting the main route and the sub route in the relay system
400 to 411 messages or steps in switching from the main route to the sub route in the relay system
10001 to 10003 fields of a TLV format of the message
10101 to 10615 fields of a message format used in setting the main route and the sub route
20101 to 20804 fields of a message format used in switching from the main route to the sub route
30101 to 30815 fields of a message format used in setting the main route and the sub route in the relay system
40101 to 41104 fields of a message format used in switching from the main route to the sub route in the relay system

The invention claimed is:

1. A route selecting device, comprising:
a first memory that stores profile information including, with respect to an identifier "main BSID" of a base station BS, an identifier "MSID" of a mobile station MS that has already selected the BS having the main BSID as a main route, an identifier "sub BSID" of the BS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the BS having the main BSID as the main route, an index $r_{BSmax}$ of an upper limit of the radio resource amount acceptable by the BS having the main BSID, and an evaluation index $R_{rmain}$ based on a residual radio resource amount of the BS having the main BSID as the main route;
a second memory that stores the profile information on the BS selectable as the main route in association with an index $r_{MSnew}$ of the radio resource amount requested by the MS that requests route setting; and
a processor that calculates an evaluation index of the route, and selects the route on the basis of the evaluation index, wherein
the processor receives, from the BS, a first message including the MSID of the mobile station, the index $r_{MSnew}$ of the radio resource amount requested by the MS, and an identifier "available BSIDs" of the BSIDs of the BS communicatable with the subject mobile station, within requests for the route setting which are transmitted from the MS,
the processor extracts, from the first memory, the profile information of the BSs corresponding to a plurality of BSIDs selectable as the route, which are included in the available BSIDs within the first message, and creates the second memory on the basis of the profile information on the BS and $r_{MSnew}$, and
the processor calculates an index $(R_{rmain})_n$ of a first residual resource amount on the basis of a ratio of $(r_{BSmax})_n$ to a sum of $(\Sigma r_{MSmain})_n$ and $r_{MSnew}$ for a route n according to the information stored in the second memory when selecting the main route, to calculate an evaluation index $(R_{main})_n$ of the main route based on the first residual resource amount of the BS with respect to the BSs having the main BSIDs stored in the second memory where n is an index of a route, and
the processor selects the BS that is the largest in the calculated evaluation index $(R_{main})_n$ of the main route as the main route.

2. The route selecting device according to claim 1, comprising:
a quality information memory that stores quality information on the MSID and the BSID of the communicatable BS having the MSID, and a parameter of weight for the MSID and an identifier APLID of an application which is executed by the route,
wherein
the first message further includes the APLID included in the setting request of the route which is transmitted from the MS, and the processor obtains the quality information and the parameter of weight from the quality information memory with respect to the BSID of the available BSID within the second memory on the basis of the MSID and the APLID,
the processor multiplies the quality information by the parameter of the weight to calculate the evaluation index $(R_{QoS})_n$ of the route based on the quality of each route n with respect to the BSs having the main BSIDs in the second memory,
the processor calculates the evaluation index $(R_{main})_n$ of the main route based on the residual resource amount of the BS and the quality of the route, according to a weighted addition value of the evaluation index $(R_{QoS})_n$ of the route based on the quality of each route n and the evaluation index $(R_{rmain})_n$ of the first residual resource amount, for each route n, with respect to the BSs having the main BSIDs within the second memory, and
the processor selects the BS that is the largest in the calculated evaluation index $(R_{main})_n$ of the main route as the main route.

3. The route selecting device according to claim 1, wherein the evaluation index $(R_{main})_n$ of the main route is obtained by the following expression:

$$(R_{main})_n = (P_{main})_n (W_{QoS}(R_{QoS})_n + W_{rmain}(R_{rmain})_n)$$

where
n is an index of the route,
$(P_{main})_n$ is policy information (weight related to the use of the BS) indicative of priority by which the BS is selected as the main route,
$(R_{rmain})_n$ is an evaluation of the main route based on the residual resource of the BS,
$W_{QoS}$ is a parameter of the weight for $(R_{QoS})_n$, and
$W_{rmain}$ is a parameter of the weight for $(R_{rmain})_n$.

4. The route selecting device according to claim 1, further comprising:
a policy control device having a policy memory that stores quality information on the MSID and the BSID of the communicatable BS having the MSID, and a parameter of weight for the MSID and an APLID which is an identifier of an application which is executed by the route, wherein
if the route selecting device does not set the quality information in the quality information memory, the processor transmits, to the policy control device, a message including the MSID, the available BSID, and the APLID included in the setting request of the route which is transmitted from the MS, and requests the quality information on the BS and the weight parameter, and
when receiving the quality information from the policy control device, the processor stores the quality information and the weight parameter in the quality information memory.

5. The route selecting device according to claim 1, further comprising:
- a third memory that stores an identifier "sub BSID" of the BS selectable BS as the sub route, a total $\Sigma r_{MSmain}$ of the indexes of the radio resource amount requested by the MS with respect to the MS that has already selected the BS having the main BSID as the main route, a total $\Sigma r_{MSsub}$ of the indexes of the radio resource amount requested by the MS with respect to the MS that has already selected the BS having the main BSID as the main route and has already selected the BS having the sub BSID as the sub route, an index $r_{BSmax}$ of an upper limit of the radio resource amount acceptable by the BS having the sub BSID, an evaluation index $R_{rsub}$ based on the residual radio resource amount of the BS having the sub BSID as the sub route, and an index $r_{MSnew}$ of the radio resource amount requested by the MS that requests the route setting, in association with the main BSID selected as the main route,
- the processor extracts information on the BS selected as the main route from the first memory or the second memory, and creates the third memory on the basis of the extracted information on the BS and $r_{MSnew}$ within the first message,
- the processor calculates an index $(R_{rsub})_n$ of a second residual resource amount according to a ratio of $(r_{BSmax})_n$ to a sum of $(\Sigma r_{MSmain})_n$, $(\Sigma r_{MSsub})_n$, and $r_{MSnew}$ for the route n on the basis of the information stored in the third memory, when selecting the sub route, to calculate an evaluation index $(R_{sub})_n$ of the sub route based on the second residual resource amount of the BS with respect to the BSs having the sub BSIDs in the third memory, and
- the processor selects the BS that is the largest in the calculated evaluation index $(R_{sub})_n$ of the sub route as the sub route.

6. The route selecting device according to claim 5, wherein the processor calculates the overall evaluation index $(R_{sub})_n$ of the sub route based on the residual resource amount of the BS and the quality of the route, according to a weighted addition value of the evaluation index $(R_{QoS})_n$ of the route based on the quality of each route and the index $(R_{rsub})_n$ of the second residual resource amount, with respect to the BSs having the main BSIDs within the third memory, and
the processor selects the BS that is the largest in the calculated evaluation index $(R_{sub})_n$ of the sub route as the sub route.

7. The route selecting device according to claim 5, wherein the processor calculates the overall evaluation index $(R_{sub})_n$ of the sub route based on the residual resource amount of the BS and the quality of the route with respect to the BSs having the BSIDs stored within the third memory according to the following expression:

$$(R_{sub})_n = (P_{sub})_n (W_{QoS}(R_{QoS})_n + W_{rsub}(R_{rsub})_n)$$

where
n is an index of the route,
$(P_{sub})_n$ is policy information (weight related to the use of the BS) indicative of priority by which the BS is selected as the sub route,
$(R_{QoS})_n$ is an evaluation of the route based on the quality of the route,
$(R_{rsub})_n$ is an evaluation of the sub route based on the residual resource of the BS,
$W_{QoS}$ is a parameter of the weight for $(R_{QoS})_n$, and
$W_{rsub}$ is a parameter of the weight for $(R_{rsub})_n$.

8. The route selecting device according to claim 1, wherein
the processor receives a second message including the MSID and the sub BSID within a switching request transmitted from the mobile station from the BS, and the processor determines that the MS requests switching from the main route to the sub route, according to the second message,
the processor sets a value of the sub BSID to a new main BSID, transmits a message to the BS corresponding to the sub BSID included in the second message, and sets a data route to the BS corresponding to the sub BSID,
the processor extracts the profile information on the BS newly selected as the main route from the first memory with respect to the MS having the MSID included in the second message, and creates the third memory according to the extracted information and $r_{MSnew}$ within the second message,
the processor calculates an index $(R_{rsub})_n$ of a second residual resource amount according to a ratio of $(r_{BSmax})_n$ to a sum of $(\Sigma r_{MSmain})_n$, $(\Sigma r_{MSsub})_n$, and $r_{MSnew}$ on the basis of the information stored in the third memory, when selecting the sub route, to calculate an evaluation index $(R_{sub})_n$ of the sub route based on the second residual resource amount of the BS with respect to the BSs having the sub BSIDs within the third memory, and
the processor selects the BS that is the largest in the calculated evaluation index $(R_{sub})_n$ of the sub route as the sub route.

9. The route selecting device according to claim 8, wherein
the processor calculates the overall evaluation index $(R_{sub})_n$ of the sub route based on the residual resource amount of the BS and the quality of the route according to a weighted addition value of the evaluation index $(R_{QoS})_n$ of the route based on the quality of each route and the index $(R_{rsub})_n$ of the second residual resource amount, with respect to the BSs having the main BSIDs within the third memory, and
the processor selects the BS that is the largest in the calculated evaluation index $(R_{sub})_n$ of the sub route as the sub route.

10. The route selecting device according to claim 1, further comprising:
a third memory that stores profile information including, with respect to an identifier "main RSID" of a relay station RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route;
a fourth memory that stores the profile information on the RS selectable as the main route in association with an index $r_{MSnew}$ of the radio resource amount requested by the MS that requests route setting; and
a processor that calculates an evaluation index of the route, and selects the route on the basis of the evaluation index,
wherein
the processor receives, from the RS, a first message including the MSID of the mobile station, the index $r_{MSnew}$ of the radio resource amount requested by the MS, and an identifier "available RSIDs" of the RSIDs of the RS communicatable with the subject mobile station, within requests for the route setting which are transmitted from the MS, the processor extracts, from the third memory, the profile information of the RSs corresponding to a plurality of RSIDs selectable as the route, which are included in the available RSIDs within the first message, and creates the fourth memory on the basis of the profile information on the RS and $r_{MSnew}$, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the fourth memory when selecting the main route, to calculate the evaluation index $(R_{main})_n$ of the main route based on the first residual resource amount of the RS with respect to the RSs having the main RSIDs stored in the fourth memory, and the processor selects the RS that is the largest in the calculated evaluation index $(R_{main})_n$ of the main route as the main route, wherein the processor calculates an overall evaluation index $(R_{main})_n$ of the main route with respect to the selectable routes according to the following expression:

$$(R_{main})_n = (P_{main})_n [W_{mainaverage}[W_{mainBS}(R_{mainBS})_n + \{(\Sigma_i(W_{mainRS})_i(R_{mainRS})_i\}n]/(N+1) + W_{mainresource\_min}(R_{rmain\_min})_n]$$

where n is an index of the route,

N is the number of relay stations through which the route passes, $(R_{main})_n$ is an overall evaluation of the main route based on the quality of the route, and the residual resource amounts of the RS and the BS, $(P_{main})_n$ is policy information (weight related to the use of the route) indicative of the priority by which the route is selected as the main route, $(R_{mainBS})_n$ is an overall evaluation of the BS as the main route based on the quality of the route and the residual resource amount of the BS, $R_{mainRS}$ is an overall evaluation of the RS as the main route based on the quality of the route and the residual resource amount of the RS, $(R_{rmain\_min})_n$ is a minimum value in an evaluation of the BS as the main route based on the residual resource amount of the BS in the route, and an evaluation of the RS as the main route based on the residual resource amount of the RS in the route, $W_{mainBS}$ is a parameter of the weight for $(R_{mainBS})_n$, $W_{mainRS}$ is a parameter of the weight for $R_{mainRS}$ corresponding to each RS in the route, $W_{mainavarage}$ is a parameter of the weight for an average value of the evaluation indexes of the BS and the RS in the route as the main route, and $W_{mainresource\_min}$ is a parameter of the weight for $(R_{rmain\_min})_n$ corresponding to the BS and the RS in the route.

11. The route selecting device according to claim 1, further comprising:

a third memory that stores profile information including, with respect to an identifier "main RSID" of a relay station RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route;

a fourth memory that stores the profile information on the RS selectable as the main route in association with an index $r_{MSnew}$ of the radio resource amount requested by the MS that requests route setting; and a processor that calculates an evaluation index of the route, and selects the route on the basis of the evaluation index, wherein the processor receives, from the RS, a first message including the MSID of the mobile station, the index $r_{MSnew}$ of the radio resource amount requested by the MS, and an identifier "available RSIDs" of the RSIDs of the RS communicatable with the subject mobile station, within requests for the route setting which are transmitted from the MS, the processor extracts, from the third memory, the profile information of the RSs corresponding to a plurality of RSIDs selectable as the route, which are included in the available RSIDs within the first message, and creates the fourth memory on the basis of the profile information on the RS and $r_{MSnew}$, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the fourth memory when selecting the main route, to calculate the evaluation index $(R_{main})_n$ of the main route based on the first residual resource amount of the RS with respect to the RSs having the main RSIDs stored in the fourth memory, and the processor selects the RS that is the largest in the calculated evaluation index $(R_{main})_n$ of the main route as the main route, wherein the processor calculates an overall evaluation index $(R_{sub})_n$ of the sub route with respect to the selectable routes according to the following expression:

$$(R_{sub})_n = (P_{sub})_n [W_{subaverage}[W_{subBS}(R_{subBS})_n + \{(\Sigma_i(W_{subRS})_i(R_{subRS})_i\}n]/(N+1) + W_{subresource\_min}(R_{rsub\_min})_n]$$

where n is an index of the route,

N is the number of relay stations through which the route passes, $(R_{sub})_n$ is an overall evaluation of the sub route based on the quality of the route, and the residual resource amounts of the RS and the BS, $(P_{sub})_n$ is policy information (weight related to the use of the route) indicative of the priority by which the route is selected as the sub route, $R_{subRS}$ is an overall evaluation of the RS as the sub route based on the quality of the route and the residual resource amount of the RS, $(R_{subBS})_n$ is an overall evaluation of the BS as the sub route based on the quality of the route and the residual resource amount of the BS, $(R_{rsub\_min})_n$ is a minimum value in an evaluation of the BS as the sub route based on the residual resource amount of the BS in the route, and an evaluation of the RS as the sub route based on the residual resource amount of the RS in the route, $W_{mainRS}$ is a parameter of the weight for $R_{mainRS}$ corresponding to each RS in the route, $W_{mainBS}$ is a parameter of the weight for $(R_{mainBS})_n$, $W_{subavarage}$ is a parameter of the weight for an average value of the evaluation indexes of the BS and the RS in the route as the sub route, and $W_{subresource\_min}$ is a parameter of the weight for $(R_{rsub\_min})_n$ corresponding to the BS and the RS in the route.

12. A mobile radio communication system having a mobile station, a relay station and/or a base station that relays a radio communication between the mobile station and the base station, and a gateway, the mobile radio communication system comprising a route selecting device that selects a main route and a sub route which are used for communication between the mobile station and the gateway on the basis of a residual resource of the relay station or the base station through which the main route or the sub route pass,
wherein
any of the gateway, the base station, the relay station, and an another device includes the route selecting device according to claim 1.

13. The mobile radio communication system according to claim 12, wherein the base station that communicates with the mobile station and the gateway, or the relay station that relays radio communication with the mobile station and the base station includes means for notifying the route selecting device that selects the main route and the sub route used for communication between the mobile station and the gateway, of an index of a radio resource amount acceptable by the base station or the relay station, and an index of a radio resource amount already used by the base station or the relay station.

14. A route selecting device, comprising:
a first memory that stores profile information including, with respect to an identifier "main RSID" of a relay station RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route;

a second memory that stores the profile information on the RS selectable as the main route in association with an index $r_{MSnew}$ of the radio resource amount requested by the MS that requests route setting; and a processor that calculates an evaluation index of the route, and selects the route on the basis of the evaluation index, wherein the processor receives, from the RS, a first message including the MSID of the mobile station, the index $r_{MSnew}$ of the radio resource amount requested by the MS, and an identifier "available RSIDs" of the RSIDs of the RS communicatable with the subject mobile station, within requests for the route setting which are transmitted from the MS, the processor extracts, from the first memory, the profile information of the RSs corresponding to a plurality of RSIDs selectable as the route, which are included in the available RSIDs within the first message, and creates the second memory on the basis of the profile information on the RS and $r_{MSnew}$, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the second memory when selecting the main route, to calculate an evaluation index $(R_{main})_n$ of the main route based on the first residual resource amount of the RS with respect to the RSs having the main RSIDs stored in the second memory, where n is an index of a route, and the processor selects the RS that is the largest in the calculated evaluation index $(R_{main})_n$ of the main route as the main route.

15. The route selecting device according to claim 14, further comprising:
a third memory that stores an identifier "sub RSID" of the RS selectable RS as the sub route, a total $\Sigma r_{MSmain}$ of the indexes of the radio resource amount requested by the MS with respect to the MS that has already selected the RS having the main RSID as the main route, a total $\Sigma r_{MSsub}$ of the indexes of the radio resource amount requested by the MS with respect to the MS that has already selected the RS having the main RSID as the main route and has already selected the RS having the sub RSID as the sub route, an index $r_{RSmax}$ of an upper limit of the radio resource amount acceptable by the RS having the sub RSID, an evaluation index $R_{rsub}$ based on the residual radio resource amount of the RS having the sub RSID as the sub route, and an index $r_{MSnew}$ of the radio resource amount requested by the MS that requests the route setting, in association with the main RSID selected as the main route, the processor extracts information on the RS selected as the main route from the first memory or the second memory, and creates the third memory on the basis of the extracted information on the RS and $r_{MSnew}$ within the first message, the processor calculates an index $(R_{rsub})_n$ of a second residual resource amount according to a ratio of $(r_{RSmax})_n$ to a sum of $(\Sigma r_{MSmain}(\Sigma r_{MSsub})_n$, and $r_{MSnew}$ for the route n on the basis of the information stored in the third memory, when selecting the sub route, to calculate an evaluation index $(R_{sub})_n$ of the sub route based on the second residual resource amount of the RS with respect to the RSs having the sub RSIDs in the third memory, and the processor selects the RS that is the largest in the calculated evaluation index $(R_{sub})_n$ of the sub route as the sub route.

16. The route selecting device according to claim 14, wherein the processor receives a second message including the MSID and the sub BSID within a switching request transmitted from the mobile station from the RS, and the processor determines that the MS requests switching from the main route to the sub route, according to the second message, the processor sets a value of the sub RSID to a new main RSID, transmits a message to the RS corresponding to the sub RSID included in the second message, and sets a data route to the RS corresponding to the sub RSID, the processor extracts the profile information on the RS newly selected as the main route from the first memory with respect to the MS having the MSID included in the second message, and creates the third memory according to the extracted information and $r_{MSnew}$ within the second message, the processor calculates an index $(R_{rsub})_n$ of a second residual resource amount according to a ratio of $(r_{RSmax})_n$ to a sum of $(\Sigma r_{MSmain})_n$, $(\Sigma r_{MSsub})_n$, and $r_{MSnew}$ on the basis of the information stored in the third memory, when selecting the sub route, to calculate an evaluation index $(R_{sub})_n$ of the sub route based on the second residual resource amount of the RS with respect to the RSs having the sub RSIDs within the third memory, and the processor selects the RS that is the largest in the calculated evaluation index $(R_{sub})_n$ of the sub route as the sub route.

17. A mobile radio communication system having a mobile station, a relay station and/or a base station that relays a radio communication between the mobile station and the base station, and a gateway, the mobile radio communication system comprising a route selecting device that selects a main route and a sub route which are used for communication between the mobile station and the gateway on the basis of a residual resource of the relay station or the base station through which the main route or the sub route pass, wherein
any of the gateway, the base station, the relay station, and an another device includes the route selecting device according to claim 14.

18. A route selecting device, comprising:
a first memory that, concerning a relay station RS selectable as a main route, stores profile information including, with respect to an identifier "main RSID" of the RS, an identifier "MSID" of a mobile station MS that has already selected the RS having the main RSID as a main route, an identifier "sub RSID" of the RS selected as a sub route by the MS having the MSID, an index $r_{MS}$ of a radio resource amount requested by the MS having the MSID, a total $\Sigma r_{MSmain}$ of the indexes of the radio resource amount requested by the MS with respect to the MS that has already selected the RS having the main RSID as the main route, an index $r_{RSmax}$ of an upper limit of the radio resource amount acceptable by the RS having the main RSID, and an evaluation index $R_{rmain}$ based on a residual radio resource amount of the RS having the main RSID as the main route, in association with an index $r_{MSnew}$ of the radio resource amount requested by the MS that requests route setting; and a processor that calculates an evaluation index of the route, and selects the route on the basis of the evaluation index, wherein the processor of the MS sends requests for the route setting including the MSID of the mobile station, the index $r_{MSnew}$ of the radio resource amount requested by the MS, and an identifier "available RSIDs" of the RSIDs of the RS communicatable with the subject mobile station, the processor receives, the profile information of the RSs corresponding to a plurality of RSIDs selectable as the route, which are included in the available RSIDs, and creates the first memory on the basis of the profile information on the RS and $r_{MSnew}$, by response of a gateway, a BS, a RS or an another device for the request for the route setting, and the processor calculates an index $(R_{rmain})_n$ of a first residual resource amount on the basis of a ratio of $(r_{RSmax})_n$ to a sum of $(\Sigma r_{MSmain})_n$ and $r_{MSnew}$ for a route n according to the information stored in the first memory when selecting the main route, to calculate an evaluation index $(R_{main})_n$ of the main route based on the first residual resource amount of the RS with respect to the RSs having the main RSIDs stored in the first memory where n is an index of a route, and the processor selects the RS that is the largest in the calculated evaluation index $(R_{main})_n$ of the main route as the main route.

19. A mobile radio communication system having a mobile station, a relay station and/or a base station that relays a radio communication between the mobile station and the base station, and a gateway, the mobile radio communication system comprising a route selecting device that selects a main route and a sub route which are used for communication between the mobile station and the gateway on the basis of a residual resource of the relay station or the base station through which the main route or the sub route pass, wherein
the mobile station includes the route selecting device according to claim 18, and
the route selecting device of the mobile station receives the profile information on the RS from the gateway, the BS, the RS, or an another device, and stores the profile information on the RS in the first memory.

20. The mobile radio communication system according to claim 19, wherein the mobile station that conducts radio communication with the base station or the relay station includes means for notifying the route selecting device that selects the main route and the sub route used for communication between the mobile station and the gateway, of an index of a radio resource amount requested by the mobile station.

* * * * *